United States Patent
Huber et al.

(10) Patent No.: US 6,618,452 B1
(45) Date of Patent: Sep. 9, 2003

(54) BURST CARRIER FREQUENCY SYNCHRONIZATION AND ITERATIVE FREQUENCY-DOMAIN FRAME SYNCHRONIZATION FOR OFDM

(75) Inventors: Johannes Huber, Langensendelbach (DE); Stefan Müller-Weinfurtner, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/300,282

(22) Filed: Apr. 27, 1999

Related U.S. Application Data
(60) Provisional application No. 60/088,438, filed on Jun. 8, 1998.

(51) Int. Cl.[7] ............................. H03D 1/00; H04L 27/06
(52) U.S. Cl. ...................... 375/343; 375/364; 375/369; 370/512
(58) Field of Search ................................. 375/343, 362, 375/364–366, 368–371, 344; 370/509–514, 516

(56) References Cited

U.S. PATENT DOCUMENTS

| | | | | |
|---|---|---|---|---|
| 5,550,831 A | * | 8/1996 | Tanahashi | 370/321 |
| 5,602,835 A | * | 2/1997 | Seki et al. | 370/206 |
| 6,137,847 A | * | 10/2000 | Stott et al. | 375/344 |
| 6,160,821 A | * | 12/2000 | Dolle et al. | 370/509 |
| 6,314,083 B1 | * | 11/2001 | Kishimoto et al. | 370/210 |

OTHER PUBLICATIONS

Pierre R. Chevillat, Dietrich Maiwald, and Gottfried Ungerboeck, "Rapid Training of a Voiceband Data–Modem Receiver Employing an Equalizer with Fractional–T Spaced Coefficients", *IEEE Transactions on Communications*, vol. 35, No. 9, pp. 869–876, 1987.

Stefan A. Fechtel and Heinrich Meyr, "Fast Frame Synchronization, Frequency Offset Estimation and Channel Acquisition for Spontaneous Transmission over Unknown Frequency–Selective Radio Channels", *Proceedings of the International Symposium on Personal, Indoor and Mobile Radio Communications (PIMRC'93)*, pp. 229–233, Yokohama, Japan, 1993.

Stefan A. Fechtel and Heinrich Meyr, "Improved Frame Synchronization for Spontaneous Packet Transmission over Frequency–Selective Radio Channels", *Proceedings of the International Symposium on Personal, Indoor and Mobile Radio Communications (PIMRC'94)*, pp. 353–357, The Hague, Netherlands, 1994.

Uwe Lambrette, Michael Speth, and Heinrich Meyr, "OFDM Burst Frequency Synchronization by Single Carrier Training Data", *IEEE Communications Letters*, vol. 1, No. 2, pp. 46–48, 1997.

(List continued on next page.)

*Primary Examiner*—Phoung Phu

(57) ABSTRACT

Carrier frequency and frames are synchronized in bursty data transmissions over unknown channels that cause intersymbol interference. The synchronization procedure comprises two stages. The first stage performs a time-domain processing of samples to exploit a periodic signal repetition and to extract the coarse timing, the frequency offset and also to resolve frequency ambiguities. The second stage estimates the fine time offset of a received modulation signal. A coarse estimate of a frame start position of a received sequence of desired data samples may be improved by using the coarse timing estimate to generate frequency-domain received samples. A frequency-domain correlation is then determined between the frequency-domain received samples and noiseless samples. When using a fixed number of training samples, a "sandwich" preamble ("sandamble") is utilized to achieve greater efficiency than a conventional repetition preamble.

64 Claims, 34 Drawing Sheets

OTHER PUBLICATIONS

Jan–Jaap van de Beek, Magnus Sandell, Mikael Isaksson and Per Ola Börjesson, "Low–Complex Frame Synchronization OFDM Systems", *Proceedings of the International Conference on Universal Personal Communication (ICUPC'95)*, pp. 982–986, Tokyo, Japan, 1995.

Magnus Sandell, Jan–Jaap van de Beek, and Per Ola Börjesson, "Timing and Frequency Synchronization in OFDM Systems Using the Cyclic Prefix", *Proceedings of the International Symposium on Synchronization*, pp. 16–19, Essen, Germany, 1995.

Timothy M. Schmidl and Donald C. Cox, "Low–Overhead, Low–Complexity [Burst] Synchronization for OFDM", *Proceedings of the International Conference on Communications (ICC'96)*, pp. 1301–1306, Dallas, Texas, USA, 1996.

Jan–Jaap van de Beek, Magnus Sandell, and Per Ola Börjesson, *ML Estimation of Timing and Frequency Offset in Multicarrier Systems*, Research report, Div. of Signal Processing, Luleå University of Technology, Sweden, 1996 (henceforth,.

Stefan Müller and Johannes Huber, "A Novel Peak Power Reduction Scheme for OFDM", *Proceedings of the International Symposium on Personal, Indoor and Mobile Radio Communications (PIMRC'97)* pp. 1090–1094, Helsinki, Finland, Sep. 1997.

T. Keller and L. Hanzo, "Orthogonal Frequency Division Multiplex Synchronisation Techniques for Wireless Local Area Networks", *Proceedings of the International Symposium on Personal, Indoor and Mobile Radio Communications (PIMRC'96)*, pp. 963–967, Taipei, Taiwan, 1996.

Markku Kiviranta and Aarne Mämmelä, "Coarse Frame Synchronisation Structures in OFDM", *ACTS Mobile Telecommunications Summit*, pp. 464–470, Granada Spain, 1996.

S.U. Zaman and K.W. Yates, "Multitone Synchronization for Fading Channels", *Proceedings of the International Conference on Communications (ICC'94)*, pp. 946–949, New Orleans, USA, 1994.

* cited by examiner

| Δf | -4 | -3 | -2 | -1 | +1 | +2 | +3 | +4 | $\frac{D}{k_0}$ |
|---|---|---|---|---|---|---|---|---|---|
| D=64, Dsync=32 | -0.143 | +0.143 | +0.429 | -0.286 | +0.286 | -0.429 | -0.143 | +0.143 | $\frac{4}{7}=0.571$ |
| D=64, Dsync=64 | +0.222 | -0.333 | +0.111 | -0.444 | +0.444 | -0.111 | +0.333 | -0.222 | $\frac{4}{9}=0.444$ |
| D=256, Dsync=64 | +0.238 | +0.429 | -0.381 | -0.191 | +0.191 | +0.381 | -0.429 | -0.238 | $\frac{16}{21}=0.762$ |

FIG. 9

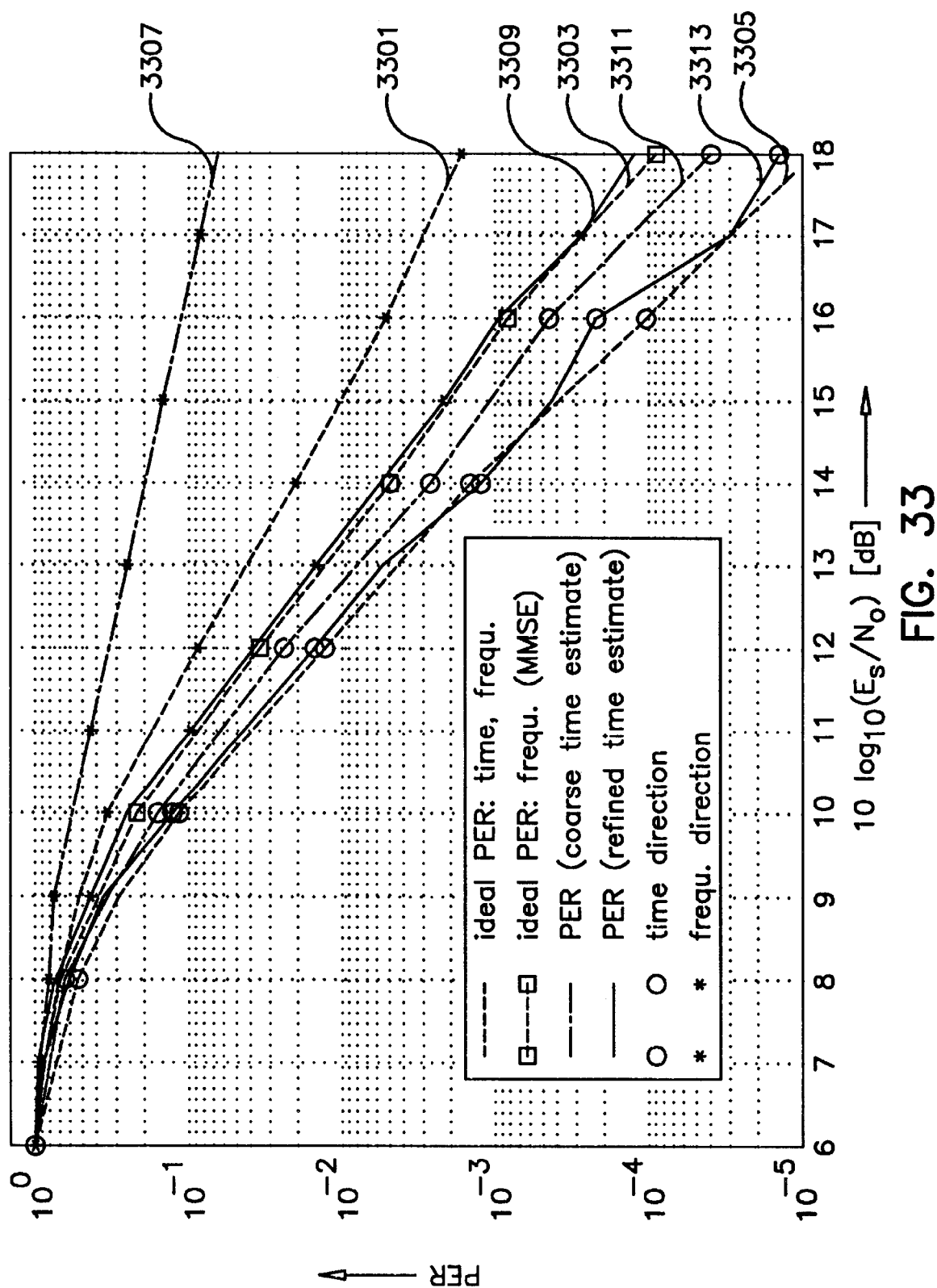

BURST CARRIER FREQUENCY SYNCHRONIZATION AND ITERATIVE FREQUENCY-DOMAIN FRAME SYNCHRONIZATION FOR OFDM

CROSS-REFERENCE TO COPENDING APPLICATION

This application claims the benefit of U.S. Provisional Application No. 60/088,438, filed Jun. 8, 1998, the entire disclosure of which is hereby incorporated herein by reference.

BACKGROUND

The present invention generally relates to radio communications systems, and more particularly to frame and frequency synchronization of bursts received via a dispersive channel.

Performing frame and frequency synchronization of transmissions that have been received over unknown frequency-selective channels (i.e., dispersive channels that cause Inter-Symbol Interference (ISI)) is a problem that calls for different solutions than are used when the transmission takes place over a non-selective channel. For time synchronization on frequency-flat (i.e., non-selective) channels, time synchronization via peak detection in the receiver is usually performed by a correlation filter that detects a specific correlation sequence that is inserted by the transmitter. But this procedure will not produce a distinct peak for transmission over unknown frequency-selective (ISI) channels. In other words, the formerly good (optimized) correlation properties are destroyed by the convolution of the originally transmitted signal (including the specific correlation sequence) with the unknown channel impulse response. Apart from this problem, this preamble is not useful for performing carrier frequency synchronization.

For continuous transmission, such as in broadcast applications, the receiver can average the synchronization parameters like frame start position and frequency offset over several preambles in order to obtain a very accurate and reliable frame and carrier frequency synchronization result.

A severe problem in other systems, such as in wireless Asynchronous Transfer Mode (ATM) scenarios, arises as a result of the packet-oriented transmission and the mostly non-continuous traffic. This requires mostly burst synchronization schemes that allow a reliable single-shot frame- and carrier frequency synchronization to be performed.

For frame and carrier frequency synchronization of spontaneous transmissions taking place over unknown frequency-selective fading channels, a special preamble structure has been proposed which consists of some channel symbol sequence that is repeated one or more times, so that periodicity is introduced into the transmitted signal. This is described, for example, in Pierre R. Chevillat, Dietrich Maiwald, and Gottfried Ungerboeck, "Rapid Training of a Voiceband Data-Modem Receiver Employing an Equalizer with Fractional-T Spaced Coefficients", *IEEE Transactions on Communications*, vol. 35, no. 9, pp. 869–876, 1987 (henceforth "[CMU87]"); Stefan A. Fechtel and Heinrich Meyr, "Fast Frame Synchronization, Frequency Offset Estimation and Channel Acquisition for Spontaneous Transmission over Unknown Frequency-Selective Radio Channels", *Proceedings of the International Symposium on Personal, Indoor and Mobile Radio Communications (PIMRC'93)*, PP. 229–233, Yokohama, Japan, 1993 (henceforth "[FM93]"); Stefan A. Fechtel and Heinrich Meyr, "Improved Frame Synchronization for Spontaneous Packet Transmission over Frequency-Selective Radio Channels", *Proceedings of the International Symposium on Personal, Indoor and Mobile Radio Communications (PIMRC'94)*, pages 353–357, The Hague, Netherlands, 1994 (henceforth "[FM94]"); and Uwe Lambrette, Michael Speth, and Heinrich Meyr, "OFDM Burst Frequency Synchronization by Single Carrier Training Data", *IEEE Communications Letters*, vol. 1, no. 2, pp. 46–48, 1997 (henceforth "[LSM97]"). This type of preamble is referred to herein as a "repetition preamble". Examples of these conventional repetition preamble structures are given in FIGS. 1a and 1b. In the conventional repetition preamble depicted in FIG. 1a, the transmitted signal is replicated in the regions designated A and B, and the guard region, G, is usually a copy of the rightmost part of the A region. The conventional repetition preamble depicted in FIG. 1b is similar, but here the transmitted signal is replicated more than once; that is, the signal is identical in each of the regions A, B and C, with the guard region, G, again usually being a copy of the rightmost part of the A region. In each case, the replicated regions (i.e., A and B, or A, B and C) are contiguous to one another. The data to be transmitted in the frame is arranged so that it follows all of the replicated preamble regions.

After convolution of the periodic signal part with the (finite) impulse response of the unknown frequency-selective (ISI) channel, the received signal in the regions A and B (or A, B and C for the case of FIG. 1b) will again exhibit some similarity, assuming that the preamble part G is chosen to be sufficiently long. This is true, even though the shape of the received signal in these regions can be completely different from the transmitted one due to the frequency selectivity (time dispersivity) of the channel. The only difference between the received signal in regions A and B (and B and C) will be a phase shift that is proportional to the carrier frequency offset.

Thus, the receiver can detect the correct starting position of the received signal by processing the received samples, including performing a signal correlation, given that the preamble samples are spaced apart by the discrete periodicity interval $k_0$. This is described in Jan-Jaap van de Beek, Magnus Sandell, Mikael Isaksson and Per Ola Börjesson, "Low-Complex Frame Synchronization in OFDM Systems", *Proceedings of the International Conference on Universal Personal Communication (ICUPC'95)*, pp. 982–986, Tokyo, Japan, 1995 (henceforth "[vdBSIB95]"); Magnus Sandell, Jan-Jaap van de Beek, and Per Ola B örjesson, "Timing and Frequency Synchronization in OFDM Systems Using the Cyclic Prefix", *Proceedings of the International Symposium on Synchronization*, pp. 16–19, Essen, Germany, 1995 (henceforth "[SvdBB95]"); Timothy M. Schmidl and Donald C. Cox, "Low-Overhead, Low-Complexity [Burst] Synchronization for OFDM", *Proceedings of the international Conference on Communications (ICC'96)*, pp. 1301–1306, Dallas, Tex., USA, 1996 (henceforth "[SC96]"); and [LSM97].

To utilize the conventional repetition preambles of FIGS. 1a and 1b, the signal parts in regions A and B (and B and C and eventually A and C) are processed to obtain the desired synchronization parameters time and carrier frequency. The exploitable periodicity interval(s) is (are) illustrated by the lines 101, 103 and 105. A minimum (or maximum) value of the timing metric occurs not only at the correct time position, but also in a wide range around it. Hence, these conventional preambles suffer from the same ambiguity problem as the correlation-sequence technique in ISI channels. (In this context, ambiguity should be understood as a blurred extreme point of the timing metric.) If additionally a high noise power is present at the receiver input, the probability of an error in time synchronization is high, resulting in a very high variance of the timing estimate. It should be noted that, as explained in [SvdBB95] and [SC96], the argument of the correlation result between A and B at the correct timing instant offers an estimate for the frequency offset. Thus, it can be exploited for frequency synchronization purposes. With respect to this point, the repetition preamble offers at least one advantage over the correlation sequence preamble.

SUMMARY

It is therefore an object of the present invention to provide apparatuses and methods for performing frequency synchronization of received signals.

It is a further object of the present invention to provide apparatuses and methods for performing frame synchronization of received signals.

The foregoing and other objects are achieved in methods and apparatuses for transmitting and receiving a sequence of data samples. In accordance with one aspect of the invention, a sequence of data samples is transmitted by initially transmitting a first preamble comprising a sequence of preamble samples, then transmitting the sequence of data samples, and then subsequently transmitting a second preamble comprising the sequence of preamble samples, whereby the sequence of data samples is transmitted after the step of initially transmitting the first preamble, and before the step of subsequently transmitting the second preamble.

In another aspect of the invention, the first preamble comprises a first guard region and a symbol sequence; the first guard region comprises a first subset of the symbol sequence; the second preamble comprises a second guard region and the symbol sequence; and the second guard region comprises a second subset of the symbol sequence.

In yet another aspect of the invention, the first subset of the symbol sequence may be a larger subset of the symbol sequence than the second subset of the symbol sequence. In alternative embodiments, the second subset of the symbol sequence may be a larger subset of the symbol sequence than the first subset of the symbol sequence.

In still another aspect of the invention, a sequence of desired data samples is received by receiving a signal sequence that includes a first preamble followed by the sequence of desired data samples followed by a second preamble, wherein the first preamble comprises a symbol sequence, and the second preamble comprises the symbol sequence. A plurality of locations of the first preamble in the received plurality of data samples are then hypothesized. For each of the hypothesized locations, a hypothesized first preamble and a corresponding hypothesized second preamble are determined. For each of the hypothesized locations, a correlation between the hypothesized first preamble and the corresponding hypothesized second preamble is determined. The correlations are used to determine locations of a most likely hypothesized first preamble and of a most likely second preamble.

In yet another aspect of the invention, the locations of the most likely hypothesized first and second preambles are used to determine a first frequency offset of the received signal sequence.

In still another aspect of the invention, the first preamble may comprise a first guard region and a symbol sequence; the first guard region may comprise a first subset of the symbol sequence and a second subset of the symbol sequence; the second preamble may comprise a second guard region and the symbol sequence. Furthermore, receiving the sequence of desired data samples further involves using the first frequency offset to make a first frequency correction of the received signal sequence. A frequency corrected first guard region is then determined in the first frequency corrected received signal sequence, and a frequency corrected first preamble is determined in the first frequency corrected received signal sequence. The second subset of the symbol sequence from the frequency corrected first guard region is then correlated with the second subset of the symbol sequence from the frequency corrected first preamble, thereby generating a correlation result. The correlation result is then used to detect a second frequency offset.

In yet another aspect of the invention, using the correlation result to detect the second frequency offset comprises using a priori knowledge of probabilities of possible frequency offset intervals to detect the second frequency offset.

In an alternative embodiment, in which the first preamble comprises a first guard region and a symbol sequence; the first guard region comprises a first subset of the symbol sequence and a second subset of the symbol sequence; and the second preamble comprises a second guard region and the symbol sequence, receiving the sequence of desired data symbols further includes correlating the second subset of the symbol sequence from the first guard region with the second subset of the symbol sequence from the first preamble, thereby generating a correlation result; using the first frequency offset to correct the correlation result; and using the corrected correlation result to estimate a second frequency offset.

In still another aspect of the invention, the first preamble comprises a first guard region and a symbol sequence; the first guard region comprises a first subset of the symbol sequence and a second subset of the symbol sequence; the second preamble comprises a second guard region and the symbol sequence. Receiving the sequence of desired data symbols further includes using the first frequency offset to make a first frequency correction of the received signal sequence; determining a frequency corrected first guard region in the first frequency corrected received signal sequence; determining a frequency corrected second preamble in the first frequency corrected received signal sequence; correlating the second subset of the symbol sequence from the frequency corrected first guard region with the second subset of the symbol sequence from the frequency corrected second preamble, thereby generating a correlation result; and using the correlation result to detect a second frequency offset.

In yet another aspect of the invention, using the correlation result to detect the second frequency offset comprises using a priori knowledge of probabilities of possible frequency offset intervals to detect the second frequency offset.

In an alternative embodiment, in which the first preamble comprises a first guard region and a symbol sequence; the first guard region comprises a first subset of the symbol sequence and a second subset of the symbol sequence; and the second preamble comprises a second guard region and the symbol sequence, receiving the sequence of desired data symbols further includes correlating the second subset of the symbol sequence from the first guard region with the second subset of the symbol sequence from the second preamble, thereby generating a correlation result; using the first frequency offset to correct the correlation result; and using the corrected correlation result to estimate a second frequency offset.

In still another aspect of the invention, the first preamble comprises a first guard region and a symbol sequence; the first guard region comprises a first subset of the symbol sequence and a second subset of the symbol sequence; and the second preamble comprises a second guard region and the symbol sequence. Here, the technique for receiving the sequence of desired data symbols further includes using the first frequency offset to make a first frequency correction of the received signal sequence. A frequency corrected first guard region is determined in the first frequency corrected received signal sequence, and a frequency corrected first preamble is determined in the first frequency corrected received signal sequence. Also, a corrected second preamble is determined in the first frequency corrected received signal sequence. The second subset of the symbol sequence from the frequency corrected first guard region is correlated with the second subset of the symbol sequence from the frequency corrected first preamble, thereby generating a first correlation result. Also, the second subset of the symbol sequence from the frequency corrected first guard region is correlated with the second subset of the symbol sequence from the frequency corrected second preamble, thereby generating a second correlation result. The first and second correlation results are then combined, thereby generating a combined correlation result. The combined correlation result is used to detect a second frequency offset.

In yet another aspect of the invention, the step of using the combined correlation result to detect the second frequency offset comprises using a priori knowledge of probabilities of possible frequency offset intervals to detect the second frequency offset.

In an alternative embodiment, in which the first preamble comprises a first guard region and a symbol sequence; the first guard region comprises a first subset of the symbol sequence and a second subset of the symbol sequence; and the second preamble comprises a second guard region and the symbol sequence, the technique for receiving the sequence of desired data symbols further includes correlating the second subset of the symbol sequence from the first guard region with the second subset of the symbol sequence from the first preamble, thereby generating a first correlation result; correlating the second subset of the symbol sequence from the first guard region with the second subset of the symbol sequence from the second preamble, thereby generating a second correlation result; using the first frequency offset to correct the first correlation result; using the first frequency offset to correct the second correlation result; combining the first and second corrected correlation results, thereby generating a combined corrected correlation result; and using the combined corrected correlation result to estimate a second frequency offset.

In still another aspect of the invention, the received signal sequence includes the first preamble, followed by a cyclic prefix guard interval, followed by the sequence of desired data samples, followed by a cyclic postfix guard interval, followed by a second preamble. Furthermore, receiving the sequence of desired data symbols further comprises using the location of the most likely hypothesized first preamble to determine a coarse estimate of a starting position of the sequence of desired samples in the received signal sequence. An improved estimate of the starting position of the sequence of desired samples in the received signal sequence is then generated by: using a time domain to frequency domain transformation technique and the coarse estimate of the starting position of the sequence of desired samples in the received signal sequence to generate frequency-domain received samples; determining a frequency-domain correlation between the frequency-domain received samples and noiseless samples; and generating the improved estimate of the starting position of the sequence of desired samples in the received signal sequence based on an argument of the frequency-domain correlation between the frequency-domain received samples and the noiseless samples.

In yet another aspect of the invention, the cyclic prefix guard interval comprises an ending subset of the sequence of desired data samples; and the cyclic postfix guard interval comprises a beginning subset of the sequence of desired data samples.

In still another aspect of the invention, the number of samples in the cyclic prefix guard interval and the number of samples in the cyclic postfix guard interval are optimally adapted to an expected channel power delay profile.

In yet another aspect of the invention, receiving the sequence of desired data symbols further includes generating a further improved estimate of the starting position of the sequence of desired samples in the received signal sequence by: using the improved estimate of the starting position of the sequence of desired samples in the received signal sequence to generate improved frequency-domain received samples; determining a second frequency-domain correlation between the improved frequency-domain received samples and the noiseless samples; and generating the further improved estimate of the starting position of the sequence of desired samples in the received signal sequence based on an argument of the second frequency-domain correlation between the frequency-domain received samples and the noiseless samples.

In still another aspect of the invention, the noiseless samples may be generated by demodulating symbols contained in the received signal sequence. This may include generating the noiseless samples by demodulating symbols contained in the sequence of desired samples. In alternative embodiments, the noiseless samples may be generated from pilot symbols that have been multiplexed into the sequence of received samples.

In yet another aspect of the invention, receiving a sequence of desired data samples is accomplished by receiving a signal sequence that includes a cyclic prefix guard interval followed by the sequence of desired data samples, followed by a cyclic postfix guard interval. A coarse estimate of a starting position of the sequence of desired samples in the received signal sequence is determined, and an improved estimate of the starting position of the sequence of desired samples in the received signal sequence is generated by: using the coarse estimate of the starting position of the sequence of desired samples in the received signal sequence to generate frequency-domain received samples; determining a frequency-domain correlation between the frequency-domain received samples and noiseless samples; and generating the improved estimate of the starting position of the sequence of desired samples in the received signal sequence based on an argument of the frequency-domain correlation between the frequency-domain received samples and the noiseless samples.

In still another aspect of the invention, the cyclic prefix guard interval comprises an ending subset of the sequence of desired data samples; and the cyclic postfix guard interval comprises a beginning subset of the sequence of desired data samples.

In yet another aspect of the invention, the number of samples in the cyclic prefix guard interval and the number of samples in the cyclic postfix guard interval are optimally adapted to an expected channel power delay profile.

In yet another aspect of the invention, receiving the sequence of desired data symbols further includes generating a further improved estimate of the starting position of the sequence of desired samples in the received signal sequence by: using the improved estimate of the starting position of the sequence of desired samples in the received signal sequence to generate improved frequency-domain received samples; determining a second frequency-domain correlation between the improved frequency-domain received samples and the noiseless samples; and generating the further improved estimate of the starting position of the sequence of desired samples in the received signal sequence based on an argument of the second frequency domain correlation between the frequency-domain received samples and the noiseless samples.

In still another aspect of the invention, receiving the sequence of desired data symbols further includes using the further improved estimate of the starting position of the sequence of desired samples in the received signal sequence to adjust a measurement of frequency offset associated with the sequence of desired samples in the received signal sequence.

In yet another aspect of the invention, the noiseless samples may be generated by demodulating symbols contained in the received signal sequence. This may include generating the noiseless samples by demodulating symbols contained in the sequence of desired samples.

In alternative embodiments, the noiseless samples may be generated from pilot symbols that have been multiplexed into the sequence of received samples.

In still another aspect of the invention, receiving the sequence of desired data symbols further includes using the improved estimate of the starting position of the sequence of desired samples in the received signal sequence to adjust a measurement of frequency offset associated with the sequence of desired samples in the received signal sequence.

In yet another aspect of the invention, receiving the sequence of desired data symbols further includes iteratively generating a final improved estimate of the starting position of the sequence of desired samples in the received signal sequence by performing a sequence of iterative steps for a number of times. Each sequence of iterative steps comprises using a previously generated estimate of the starting position of the sequence of desired samples in the received signal sequence to generate current frequency-domain received samples; determining a current frequency-domain correlation between the current frequency-domain received samples and the noiseless samples; and generating a next estimate of the starting position of the sequence of desired samples in the received signal sequence based on an argument of the current frequency-domain correlation between the frequency-domain received samples and the noiseless samples.

In still another aspect of the invention, receiving the sequence of desired data symbols further includes using the final improved estimate of the starting position of the sequence of desired samples in the received signal sequence to adjust a measurement of frequency offset associated with the sequence of desired samples in the received signal sequence.

BRIEF DESCRIPTION OF THE DRAWINGS

The objects and advantages of the invention will be understood by reading the following detailed description in conjunction with the drawings in which:

FIG. 2a depicts a temporal structure of the discrete-time transmitter output samples s[k] during a preamble structure that includes regions G, A and B in correspondence with those regions shown in FIG. 1a;

FIG. 9 is a table that presents an overview of the phase angle values associated with the frequency offset centroid in the interval $\Delta_f$ for various OFDM parameter values;

FIG. 33 is a graph showing a comparison between differential modulation in the frequency direction and in the time direction wherein for each, PERs are plotted as a function of SNR for ideal synchronization and operational burst synchronization before and after the frame synchronization refinement in accordance with the invention.

DETAILED DESCRIPTION

Figure 1A:
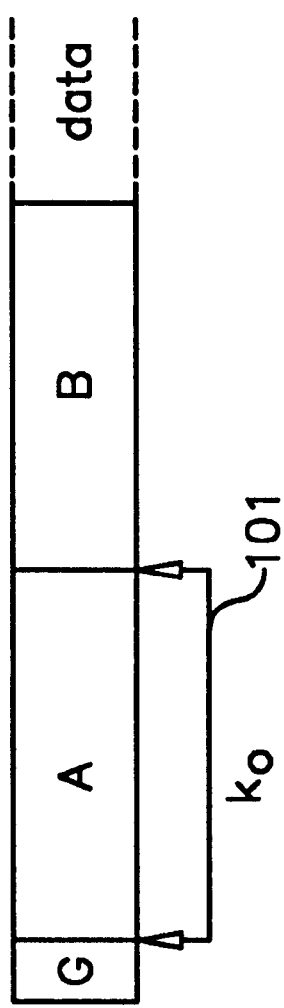
FIGS. 1a and 1b depict conventional repetition preamble structures.

The various features of the invention will now be described with respect to the figures, in which like parts are identified with the same reference characters.

The various embodiments of the invention offer solutions for the problem of performing carrier frequency synchronization and frame synchronization (i.e., with respect to time) of bursty (i.e., spontaneous, single-shot) data transmissions received over unknown frequency-selective channels. The invention is well-suited for use with radio channels, but may also be applied to any other type of channel that exhibits similar characteristics. In the following discussion, an overview of the invention is first presented. This is followed by a more detailed description of the various aspects of the invention.

In one aspect of the invention, the synchronization procedure comprises two stages, with the first stage itself comprising two steps. In the first step of the first stage, a coarse timing estimate and a (low-variance) frequency offset estimate are extracted. The latter can be corrected even though a frequency ambiguity may occur. The second step in the first stage aims to resolve this frequency ambiguity so that the actual carrier frequency offset can be estimated over a wide range.

The second synchronization stage is finally dedicated to improve the initial timing estimate. Depending on the specific synchronization problem setting, each of the two stages can be used in a stand-alone mode or, alternatively, they can be applied jointly.

The first stage performs a time-domain processing (e.g., correlation) of samples to exploit a periodic signal repetition and to extract the coarse timing, frequency offset and to resolve frequency ambiguities. Here, another aspect of the invention divides a preamble portion of the transmitted signal into two widely spaced signal parts. For example, a data signal (or other type of signal) may be embedded in-between the "preamble" parts to form what is referred to herein as a Sandwich Preamble (SP), also referred to herein as a "sandamble". The use of the inventive sandamble is very advantageous in terms of frequency accuracy.

The second stage estimates the fine time offset of the received modulation signal. A frequency-domain approach is chosen that operates on some frame of signal samples that has been identified as the Orthogonal Frequency Division Multiplexing (OFDM) symbol of interest by some coarse time estimator. The initial timing estimate may stem from the first synchronization stage or it may alternatively be the result from relatively fixed periodic communication protocol structures in the specific transmission system. For this second synchronization stage, the synchronization preamble is required to be an OFDM symbol. From the spectrum of this signal part, an improved time offset estimate can be obtained by a correlation technique across the subcarrier amplitudes. If the OFDM parameters (e.g., number of carriers, type of subcarrier modulation) permit, a decision-directed version of the algorithm can even estimate the time offset from any information-carrying OFDM symbol in the burst, so that no additional redundancy is required to estimate the offset up to a maximum value given by the specific parameter set. That is, the modulation scheme for data transmission in the burst need not generally be restricted to the use of OFDM, but it is advantageous to do so to permit the second synchronization stage to use a decision-directed algorithm to estimate the time offset from an information-carrying symbol in the burst.

Consequently, data-aided as well as decision-directed estimation can be used in the second stage, wherein data-aided estimation requires additional redundancy but offers more robustness. Based on the steadily improved estimate of the time offset, the time window may be iteratively realigned until the estimate converges to an optimum estimate with minimum variance. The coarse initial time offset estimate need only be reliable enough to ensure convergence.

For operation over a multipath (ISI) channel, the guard interval is advantageously split into prefix and postfix parts, as the time synchronization from the proposed estimator is systematically delayed by the center of power gravity time of the respective power delay channel profile. Hence, the estimated synchronization positions of the estimator are usually shifted to positive values.

Having presented an overview of various aspects of the invention, a more detailed description of these and other aspects will now be presented.

Because the invention uses a new type of repetition preamble to perform both time (frame) and frequency synchronization of a bursty OFDM transmission over unknown frequency-selective channels, this will first be discussed.

Signal Repetition

As mentioned in the BACKGROUND section, a repetition preamble is commonly proposed as a burst training sequence in order to allow frame- and carrier frequency synchronization in digital transmission over unknown and severely dispersive channels. The general principle of exploiting a cyclic training signal for frame synchronization and carrier frequency offset estimation was originally suggested for single-carrier transmission in [CMU87]. Linear as well as memoryless non-linear channel distortions will have negligible effect on the synchronization performance. Thus, the core of the investigated coarse frame and carrier frequency algorithm is to exploit two regions of signal repetition, each consisting of a useful synchronization length of $D_{sync}$ modulation intervals. The two regions are spaced $k_0$ samples apart. The parameter $k_0$ is denoted as the correlation basis.

There are several possibilities of how the OFDM transmitter can introduce the signal repetition:

- Extended guard interval: This possibility applies for very large OFDM symbols (e.g., D=512), so that the "natural" periodicity due to the guard interval is slightly extended by some (e.g., 20) additional guard samples to allow for synchronization. In this example, we would have a synchronization length of $D_{sync}=20$ and a correlation basis of $k_0=D=512$.
- OFDM symbol repetition: This possibility is preferable for small OFDM symbols (D≤128) and this means that an entire OFDM symbol of dimension $D_{sync}$ is repeated to allow for synchronization. The value for the correlation basis $k_0$ can be varied.
  The OFDM symbol that is repeated to form the preamble is used to carry data, too. Hence, the preamble structure itself is—apart from the periodicity—random and only one half of the preamble samples represent training overhead, even though this additionally provides a time diversity factor of 2 for data demodulation.

Mathematical Description

For the mathematical notation we assume a non-oversampled OFDM transmitter and receiver. Furthermore, we assume a perfect match of sampling frequencies in both the transmitter and the receiver, resulting in $T_T=T_R=T$.

The exploitable time-domain property in the transmitted synchronization structure is the repetition property $$s[k+k_0]=s[k] \forall k\in[-D_g, D_{sync}-1] \quad (1)$$

Note that without restriction on generality, the beginning of the first useful synchronization symbol was chosen to be k=0. For negative k, the guard interval of the synchronization sequence is transmitted.

For the continuous-time transmit signal, one obtains $$s(t) = \left(\sum_{k'=-\infty}^{+\infty} s[k'] \cdot \delta_0(t-k'T)\right) * h_T(t). \quad (2)$$

After being subjected to a dispersive channel, additive noise, a receive filter characterized by $h_R(t)$, and a carrier frequency offset is $$r_f(t) = e^{+j2\pi\Delta f_{co}t} \cdot \left(\sum_{k'=-\infty}^{+\infty} s[k']h(t-k'T) + n_0(t) * h_R(t)\right) \quad (3)$$

with h(t) being the overall impulse response defined as $h(t)=h_T(t)*h_c(t)*h_R(t)$, where $h_T(t)$ is the impulse response of the transmit filter and is the impulse response of the channel, and "*" is the convolution operator.

The noiseless received signal clearly is $$\tilde{r}_f(t) = e^{+j2\pi\Delta f_{co}t} \cdot \sum_{k'=-\infty}^{+\infty} s[k']h(t-k'T). \quad (4)$$

The noiseless signal is sampled so as to yield $$\tilde{r}(k) = e^{+j2\pi\Delta f_{co}(kT+\Delta t_{so})} \cdot \sum_{k'=-\infty}^{+\infty} s[k']h(kT+\Delta t_{so}-k'T) \quad (5)$$

where we assume that $|\Delta t_{so}|<<T$ and that the number $D_e$ of sample indices k, where h(kT) is significantly non-zero does not exceed the guard interval of length $D_g$. Hence, we obtain a received sample sequence exhibiting the signal property $$\tilde{r}[k+k_0]=e^{+j2\pi\Delta f_{co}k_0T} \cdot \tilde{r}[k] \forall k\in[-(D_g-D_e), D_{syn}-1] \quad (6)$$

at least in the mentioned interval. This is true if the guard interval is not shorter than the channel impulse response, i.e., $D_g \geq D_e$ is valid. Clearly, the phase relation between $k_0$-spaced samples is independent of $\Delta t_{so}$.

The systematic phase increment of $2\pi\Delta f_{co}Tk_0$ over an interval of $k_0$ samples expressed in Eq. (6) can be exploited to estimate the frequency error at the receiver site. This will be discussed in further detail later in this disclosure.

With the OFDM subcarrier spacing $\Delta f_{sub}=1/(D7)$ and the Normalized Carrier Frequency Offset (NCFO) $\xi_f=(\Delta f_{co})/(\Delta f_{sub})$ we may write $2\pi\Delta f_{co}T=(2\pi/D)\xi_f$ and hence we can rewrite Eq. (6) to yield $$\tilde{r}[k+k_0] = e^{+j\frac{2\pi}{D}\xi_f k_0} \cdot \tilde{r}[k] \; \forall \, k \in [-(D_g-D_e), D_{sync}-1] \quad (7)$$

Properties of the Received Signal

Apart from a phase rotation, the received noiseless signal exhibits a repetition with the periodicity interval $k_0$ within a region of at least $D_{sync}$ samples. Thus, a metric that reflects the similarity of the signal spaced $k_0$ samples apart can be applied in the receiver to reliably detect the presence of a synchronization sequence. Suitable metrics are discussed later in this disclosure.

If $D_e<D_g$ a portion of $D_g-D_e$ samples of the guard interval will be unconsumed. (If $h_c(t)$ has only small magnitude values towards the end of the impulse response, a corresponding portion of samples will not be identical, but will nevertheless be "very similar" so that the "unconsumed" part seems to be even longer.) The awareness of this property is important for understanding the arising problem of uncertainty in the time synchronization. The position of the symbol start cannot be detected with absolute exactness by the maximum metric detection proposed in [SC96]. Hence, only a coarse estimate for the timing offset is obtained.

The robustness for detecting the presence of the synchronization structure and the accuracy of the frequency estimate is dependent on the parameter $D_{sync}$ because this one determines a "processing gain" and thus the noise resistance of the approach. Furthermore, $k_0$ influences the frequency estimation accuracy and the permissible frequency range. By variation of $D_{sync}$ and $k_0$, the synchronization approach with signal repetition becomes scalable in the achievable accuracy.

Requirements for Applying This Synchronization Structure

Clearly, the duration of the exploited synchronization sequence may not exceed the coherence time of the channel. This is usually not a critical requirement in intended applications.

It must be provided that the maximally occurring frequency offset does not exceed the number of virtual carriers on either side of the transmit bandwidth. In other words, the received signal must "hit" with all active subcarriers into the passband of the receive filter $H_R(f)$ without prior frequency control. Thus, all desirable receive signal information is contained in the Equivalent Complex Baseband (ECB) domain. After the frequency offset has been sufficiently corrected, it is possible to demodulate the frequency multiplex via a Discrete Fourier Transform (DFT) without suffering from excessive interference from other subcarriers; the frequency correction must approximately restore the mutual subcarrier orthogonality.

Conventional Repetition Preamble

For these examples, it will be assumed that the number of carriers in the system is relatively small, so that the discussion will focus on the repetition of a full OFDM symbol of dimension $D_{sync}$. Thus it will be assumed, for the purpose of example, that the preamble comprises one repeated data-carrying (and therefore random) OFDM symbol. (Of course, the preamble may alternatively comprise known data.) Several conventional repetition preambles were discussed in the BACKGROUND section of this disclosure, and illustrated in FIGS. 1a and 1b. Examining the conventional preamble structure of, say, FIG. 1a more closely, it can be seen that $k_0 = D_{sync}$ and that $D_g^{(2)} = 0$. We arrive at two identical and directly successive OFDM signal parts that we call the P structure. Such a synchronization structure consists of $2D_{sync}$ time-domain samples plus $D_g$ samples in a guard interval. As usual, the guard interval consists of a cyclic prefix so that one small part of the transmit sequence occurs three times in the synchronization sequence. The $D_g$ last samples of the first $D_{sync}$-carrier synchronization OFDM symbol simultaneously represent the "guard" interval for the second OFDM symbol because both subsequent symbols are identical. That is the reason why we were allowed to set $D_g^{(2)} = 0$. This decisive property of the P structure is depicted schematically in FIG. 2a. In particular FIG. 2a depicts a temporal structure of the discrete-time transmitter output s[k] (each transmitted sample being a complex value) during the preamble structure P that includes regions G, A and B in correspondence with those regions shown in FIG. 1a. In each region of this and all subsequent figures in this disclosure, the triangular shape is chosen to illustrate the sequence of samples in one region (e.g., the A region) and its repetition in other regions (either complete repetition as in the B region's repetition of the samples first transmitted in the A region, or partial repetition as in the G region). The triangular shape is not intended to mean that the power of the samples decreases towards the end. For example, by the triangular shape, one can see that the set of samples in the B region are identical to those transmitted in the A region, and that the set of samples in the G region are identical to a rightmost part of each of the A and B regions, thereby providing cyclic repetition.

Figure 2A:
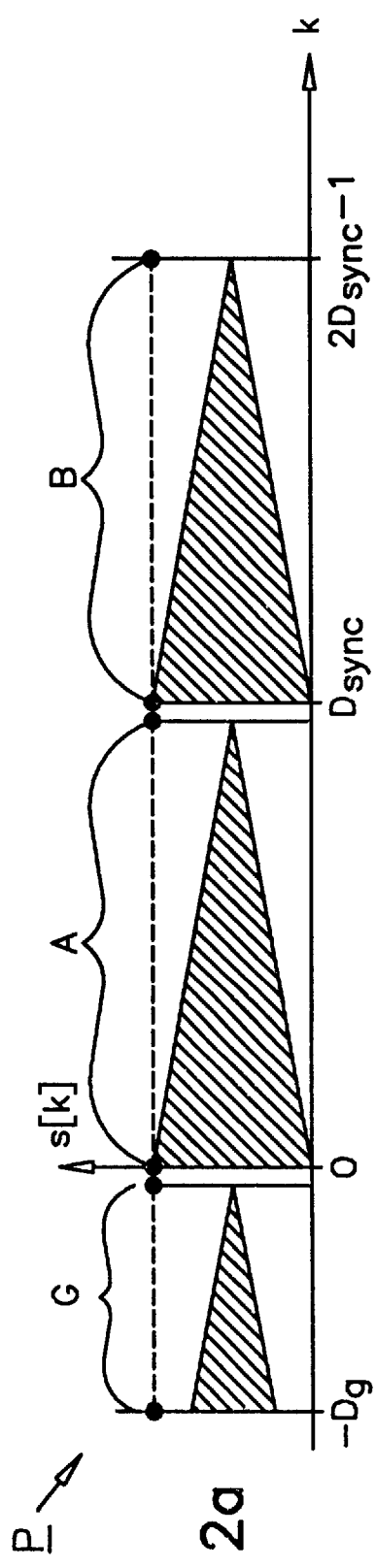
Figure 2B:
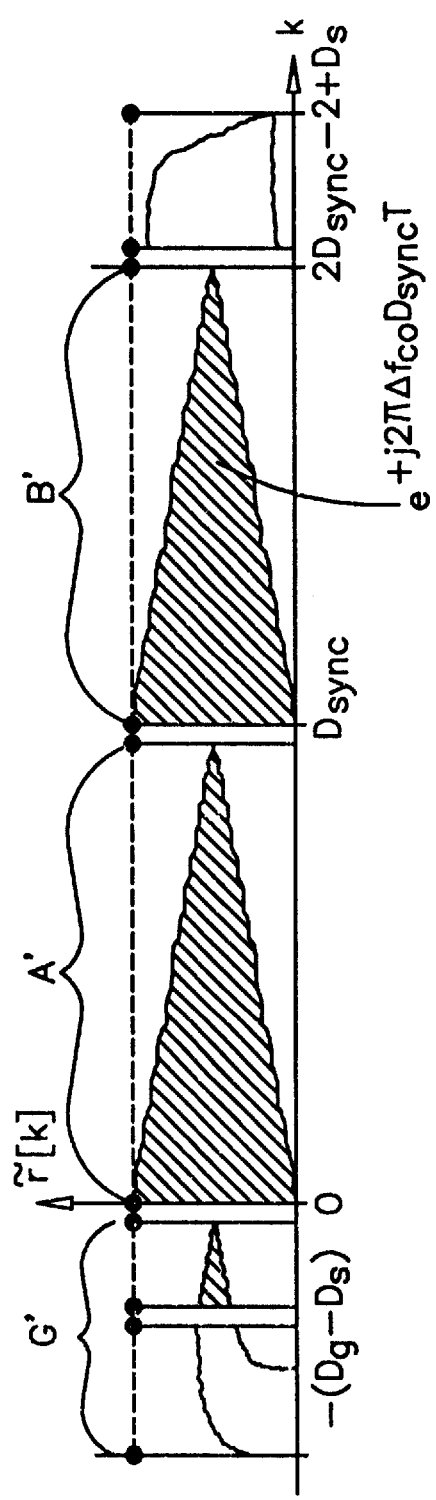
FIG. 2b illustrates samples received in a receiver after the transmitted samples have been transmitted through a noiseless dispersive channel.

FIG. 2b illustrates the received samples, $\tilde{r}[k]$, in the receiver after the transmitted samples, s[k] have been transmitted through a noiseless dispersive channel with either linear or nonlinear distortion and frequency offset $\Delta f_{co}$. Synchronization is based on these received samples r[k]. It can be seen that the received guard interval, G', is not entirely consumed by the channel. With this conventional repetition preamble, choosing $D_{sync} = D/2$ is favorable from a hardware design point of view because this permits the OFDM symbol structure of the transmission system to be the same for all symbols.

Sandwich Preamble (Sandamble) Structure

Figure 3:
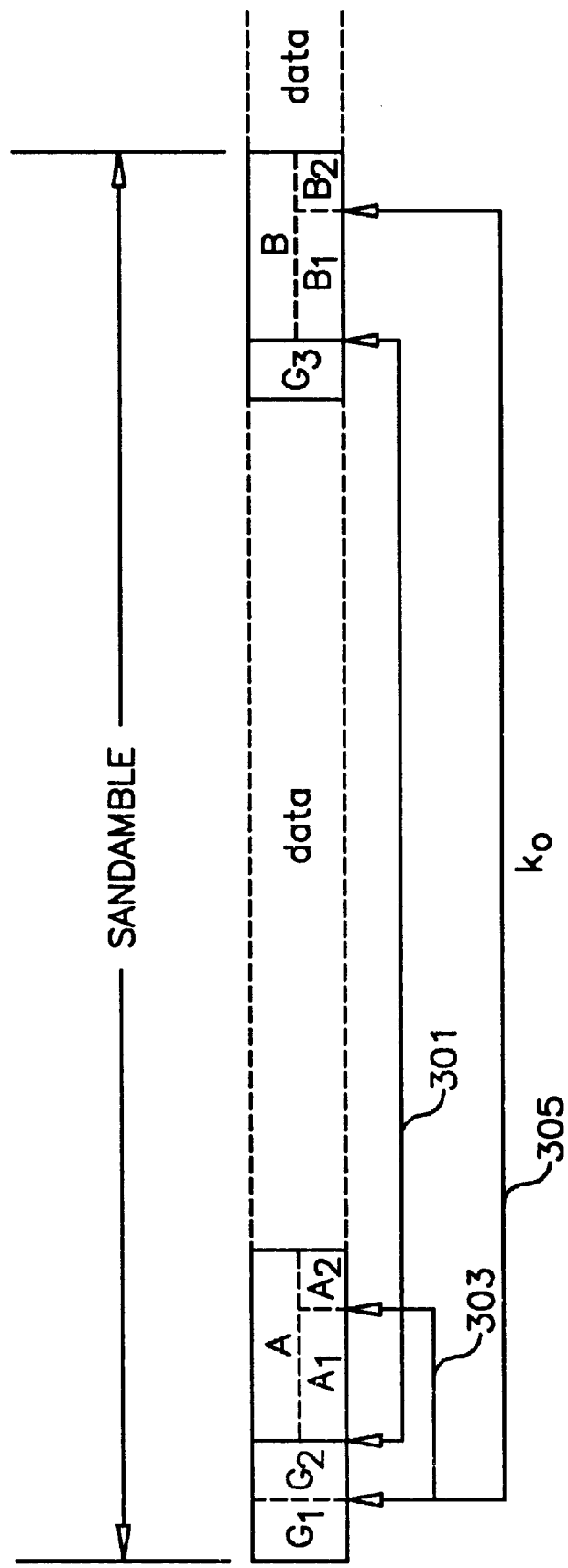
FIG. 3 is a diagram of an exemplary sandamble in accordance with one aspect of the invention.

In accordance with one aspect of the invention, a novel type of repetition preamble structure, called a Sandwich Preamble (henceforth, "Sandamble"), is utilized. An exemplary sandamble is depicted in FIG. 3. The exploitable periodicity intervals are illustrated by the lines 301, 303 and 305. The synchronization structure has the following form: two identical and repeated signal parts that are separated from one another by one or more regular OFDM symbols of the burst. In the exemplary embodiment of FIG. 3, the set of samples contained in the B region are identical to those contained in the A region. Moreover, three guard regions are provided, here designated ($G_1$, $G_2$) and $G_3$. The notation in which parentheses enclose the designations of $G_1$ and $G_2$ is used to indicate that the first and second guard regions together comprise an extended guard region. The guard regions $G_1$ and $G_2$ are contiguous to one another, and together precede, and are adjacent to, the A region. The third guard region, $G_3$, precedes and is adjacent to the B region. The third guard region $G_3$ is separated from the A region by one or more regular OFDM symbols of the burst.

The signal in each of the extended and third guard regions, ($G_1$, $G_2$) and $G_3$ is a copy of a rightmost part of the signal included in the A region (i.e., the part of region A designated A2 in FIG. 3). (Of course, the signal in each of the guard regions ($G_1$, $G_2$) and $G_3$ may also be considered a copy of the rightmost part of the signal included in the B region, since the signal in the B region is, itself, a complete copy of the signal in the A region.) Since the length of the extended guard region, ($G_1$, $G_2$), need not be the same as the length of the third guard region, $G_3$, different length copies of rightmost parts of the signal in the A region are used.

In the sandamble, the first guard region $G_1$ serves the same purpose as the guard region G found in the conventional repetition preamble depicted in FIG. 1a. The second guard region $G_2$ serves to extend the guard region beyond $G_1$. The third guard region $G_3$ is additionally necessary for use as a prefix for the repeated part B due to the split-up (i.e., separation) of the preamble components.

Figure 4:
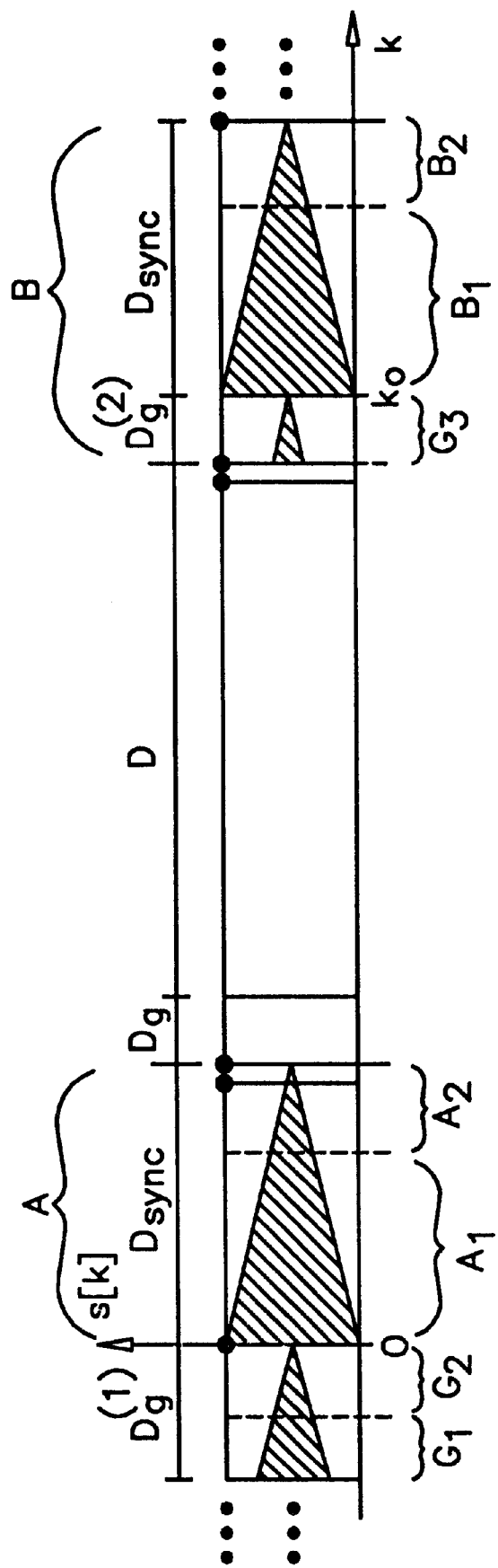
FIG. 4 is a depiction of the temporal structure of a sandamble in accordance with the invention.

FIG. 4 is another depiction of the temporal structure of a sandamble. Here, the triangular shape is useful for depicting which portions of the signal are replicated in various parts of the sandamble. It can be seen from FIG. 4 that the burst frame starts with the synchronization OFDM symbol having a sample length of $D_{sync}$, preceded by an extended guard interval of length $D_g^{(1)}$. Then, regular (i.e., information-carrying) OFDM symbols with D carriers together with regular guard intervals of $D_g$ samples may follow. Finally, the second synchronization OFDM symbol (identical to the first) of length $D_{sync}$ together with a guard interval of length $D_g^{(2)}$, not necessarily equal to $D_g^{(1)}$, marks the end of the sample frame (partly) used for synchronization parameter estimation. Thereafter, the remaining regular (information-carrying) OFDM symbols follow in the burst.

By splitting up and enclosing regular OFDM symbols, the correlation basis $k_0$ is enlarged. This quadratically reduces the estimation variance of the carrier frequency estimate, while also linearly reducing the lock-in range. A specified maximum tolerable estimation variance can be achieved with significantly reduced synchronization overhead (dedicated training samples), when $k_0$ is large.

In the following, the sandamble is presumed to have just one embedded regular OFDM symbol.

Conventional Preamble vs. New Sandamble

A first disadvantage of the sandamble is the reduced frequency carrier offset lock-in range. However, in practice the frequency carrier lock-in range usually does not need to be very large. Thus, in accordance with another aspect of the invention, two methods to circumvent ambiguity by a second operation step on a slightly enlarged guard interval $D_g^{(1)}$ of the first synchronization OFDM symbol will be described later in this description. For two of the presented frequency offset ambiguity resolution algorithms, $D_g^{(1)} > D_g$ is required.

A second disadvantage of the sandamble is that in comparison to the conventional repetition preamble, the second part of the synchronization preamble requires an own guard interval, so that the total "preamble length" is slightly increased from $D_g + 2D_{sync}$ in the conventional repetition preamble to $D_g^{(1)} + D_g^{(2)} + 2D_{sync}$ in the sandamble. If it is assumed that the usual choice will be $D_g^{(2)} \approx D_g$, then the number of additionally required modulation intervals for synchronization is $D_g^{(1)}$. The sandamble structure suggests greater efficiency than the conventional repetition preamble when the achievable frequency estimation variance $\sigma_{\xi_f}^2$ is compared with the transmission overhead. That is, the sandamble structure achieves the best accuracy (low variance) if the number of training samples (overhead) is fixed.

FIRST STAGE: COARSE TIME AND FINE FREQUENCY SYNCHRONIZATION

As mentioned earlier, the synchronization procedure in accordance with the invention comprises two stages, with the first stage itself comprising two steps. In the first step of the first stage, a coarse timing estimate and a low-variance frequency offset estimate are extracted. The latter can be corrected even though a frequency ambiguity may occur. The second step in the first stage aims to resolve this frequency ambiguity so that the actual carrier frequency offset can be estimated over a wide range.

Figure 5A:
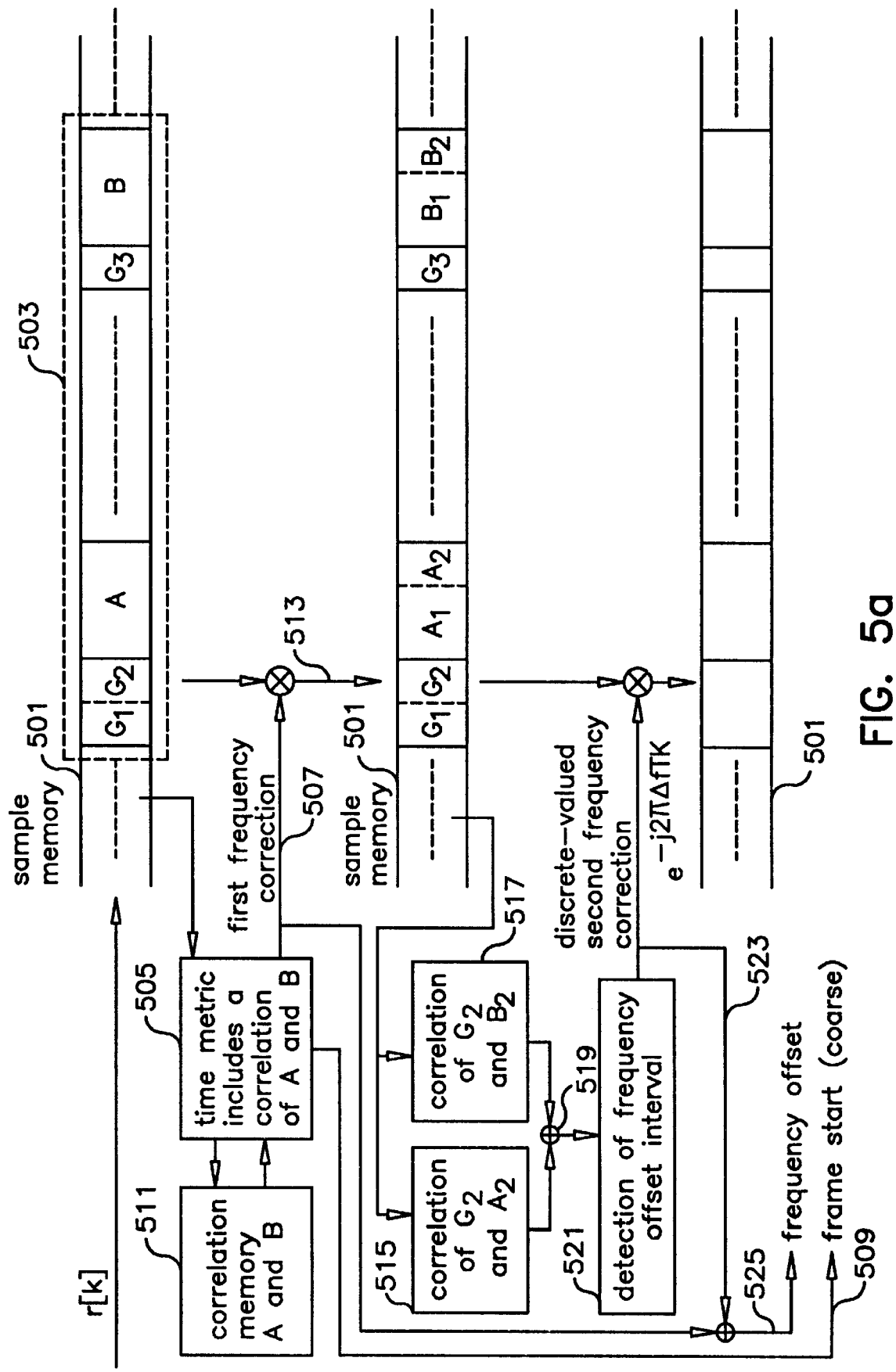
FIG. 5a is a diagram depicting hardware components and flow of signals and order of operations in a first exemplary embodiment of a first stage unit that performs coarse frame synchronization and fine frequency synchronization in accordance with one aspect of the invention.

A block diagram of a first exemplary embodiment of the first stage is depicted in FIG. 5a. This figure depicts not only the hardware components used in the exemplary embodiment, but also the flow of signals and order of operations, and as such also serves as a flowchart of the various steps performed in the embodiment. In order to depict this flow of operation, the same hardware component, such as the sample memory 501, may in some cases be depicted in several places in the figure. Notwithstanding this multiple depiction, only one of any such unit is required. The functions of the various units described in this and subsequent figures may be implemented in any of a number of ways. For example, programmable processing logic may perform the herein-described functions by executing program instructions that have been stored in a suitable computer-readable storage medium (e.g., Random Access Memory (RAM), magnetic storage medium, optical storage medium, and the like). Alternatively, hardwired logic may be designed and built to perform some or all of the various functions. Each of these alternatives, as well as their equivalents, are intended to be considered within the scope of the invention. It will further be understood that the segregation of the various functions into the illustrated blocks is for the purpose of facilitating a description of the invention. In practice, it is possible for some or all of the illustrated blocks to be combined into a single unit that performs all of the combined functions.

Turning now to a discussion of FIG. 5a, this first stage does not restrict the type of modulation used in the preamble symbol. Single-carrier modulation as well as OFDM symbols can be used as a preamble.

Received (noisy) samples r[k] are supplied to a sample memory 501. It is known that the stored received samples r[k] will include a sandamble structure 503. In a first step of the first stage, the received samples r[k] are supplied to a first correlation unit 505 that generates a coarse frame start (time) estimate 509 as well as a first frequency correction 507 that is applied to the received samples r[k]. These are generated by determining similarity metrics from the received samples r[k], and using information obtained from the generated metrics to detect the sandamble 503. From the detected sandamble 503, both the first frequency correction 507 and the coarse frame start (time) estimate 509 may be determined. Alternative embodiments of the invention may be derived by using different types of similarity metrics. Suitable metrics will now be described.

Minimum-Mean-Squared-Error (MMSE) Criterion

To approach the problem of frame and frequency synchronization, a sequence of $D_{sync}$ contiguous noisy received samples is collected in the vector $$r_k = (r[k], \ldots, r[k+D_{sync}-1])^T. \tag{8}$$

The (fictive, and therefore non-observable) noiseless received samples are collected in $$\tilde{r}_k = (\tilde{r}[k], \ldots, \tilde{r}[k+D_{sync}-1])^T. \tag{9}$$

Finally, with the definition of the noise vector $$n_k = (n[k], \ldots, n[k+D_{sync}-1])^T \tag{10}$$

we have the relation $r_k = \tilde{r}_k + n_k$.

The synchronization is based on maximizing the similarity probability of sample sequences. A valid time and frequency synchronization is achieved if the synchronization tuple $(k, \xi_f)$ is contained in the valid synchronization tuple set (valid region)

$$R_{\tilde{k},\tilde{\xi}} \equiv \left\{ (k', \xi_f') \Big| \tilde{r}_{k'+k_0} = e^{+j2\pi \frac{k_0}{D}\xi_f'} \tilde{r}_{k'} \right\}. \tag{11}$$

All time positions k' that exhibit the periodicity property, i.e., the identity between $\tilde{r}_{k'+k_0}$ and $$e^{+j2\pi \frac{k_0}{D}\xi_f'} \tilde{r}_{k'}$$

are valid. In the presence of an unconsumed guard interval the valid k' will form contiguous intervals. Apart from that, the NCFO $\xi_f'$ is a valid estimate for all $$\xi_f = \xi_f' + x \frac{D}{k_0}$$

with $x \in \mathbb{Z}$, i.e., there is an NCFO ambiguity interval of $D/k_0$. An unambiguous NCFO estimate is a priori impossible if the frequency parameter to be estimated is not restricted in range. Consequently, there may exist a multiplicity of valid synchronization tuples, so that the cardinality of $R_{\tilde{k},\tilde{\xi}_f}$ is larger than one.

For periodicity detection we introduce the decision vector $$d_{\tilde{k},\tilde{\xi}_f} \equiv r_{\tilde{k}+k_0} - e^{+j2\pi \frac{k_0}{D}\tilde{\xi}_f} r_{\tilde{k}} \tag{12}$$

$$= r_{\tilde{k}+k_0} - e^{+j2\pi \frac{k_0}{D}\tilde{\xi}_f} r_{\tilde{k}} + n_{\tilde{k}+k_0} - e^{+j2\pi \frac{k_0}{D}\tilde{\xi}_f} n_{\tilde{k}}, \tag{13}$$

where for the first two terms in Eq. (13), it is noted that $$r_{\tilde{k}+k_0} - e^{+j2\pi \frac{k_0}{D}\tilde{\xi}_f} r_{\tilde{k}} = 0 \; \forall \; (\tilde{k},\tilde{\xi}_f) \in R_{k,\xi_f}.$$

The decision vector given by Eqs. (12) and (13) can be used to test the two synchronization hypotheses $\tilde{k}$ and $\tilde{\xi}$ simultaneously. It provides reasonable information at least for $\sigma_s^2 > \sigma_n^2$. In the case of valid hypotheses, $d_{\tilde{k},\tilde{\xi}_f}$ represents a complex-valued zero-mean $D_{sync}$-dimensional Gaussian distributed random variable. This property follows directly from Eq. (13). In the noiseless case $d_{\tilde{k},\tilde{\xi}_f}$ will be exactly zero for the ideal frame positions and the perfect NCFO estimates . In the presence of mutually uncorrelated white Gaussian noise vectors $n_{\tilde{k}+k_0}$ and $n_{\tilde{k}}$ the noise in $d_{\tilde{k},\tilde{\xi}_f}$ will again be white Gaussian with a noise variance of $2\sigma_n^2$ per complex dimension.

The probability density function (pdf) of $d_{\tilde{k},\tilde{\xi}_f}$ under the condition of a valid synchronization tuple is $$p\left(d_{\tilde{k},\tilde{\xi}_f} \Big| (\tilde{k},\tilde{\xi}_f) \in R_{k,\xi_f}\right) = \frac{1}{(\pi \cdot 2\sigma_n^2)^{D_{sync}}} \cdot \exp\left(-\frac{\|d_{\tilde{k},\tilde{\xi}_f}\|^2}{2\sigma_n^2}\right), \tag{14}$$

where $\|d\|^2 = d^H d$. Clearly, $(\cdot)^H$ denotes the complex conjugate transpose of a vector.

The frame offset and the NCFO have to be estimated jointly. The joint estimates are obtained by performing $$(\hat{k},\hat{\xi}_f) = \underset{(\tilde{k},\tilde{\xi}_f)}{\arg\max}\, p\left(d_{\tilde{k},\tilde{\xi}_f} \Big| (\tilde{k},\tilde{\xi}_f) \in R_{k,\xi_f}\right). \tag{15}$$

The argmax operator yields the argument (tuple) that maximizes the given expression.

This joint synchronization estimate is equivalent to $$(\hat{k},\hat{\xi}_f) = \underset{(\tilde{k},\tilde{\xi}_f)}{\arg\min}\, \|d_{\tilde{k},\tilde{\xi}_f}\|^2 = \underset{(\tilde{k},\tilde{\xi}_f)}{\arg\min}\, \|r_{\tilde{k}+k_0} - e^{+j2\pi \frac{k_0}{D}\tilde{\xi}_f} r_{\tilde{k}}\|^2. \tag{16}$$

The argmin-operator yields the argument (tuple) that minimizes the given expression. The expression to be minimized can be modified to yield $$\|d_{\tilde{k},\tilde{\xi}_f}\|^2 = \|r_{\tilde{k}+k_0}\|^2 + \|r_{\tilde{k}}\|^2 - 2\mathrm{R}\left\{e^{-j2\pi \frac{k_0}{D}\tilde{\xi}_f} r_{\tilde{k}}^H r_{\tilde{k}+k_0}\right\} \tag{17}$$

$$= P[\tilde{k}+k_0] + P[\tilde{k}] - 2\mathrm{R}\left\{e^{-j2\pi \frac{k_0}{D}\tilde{\xi}_f} S[\tilde{k}]\right\},$$

where we introduced the complex correlation $$S[k] = \sum_{\kappa=0}^{D_{sync}-1} r*[k+\kappa] \cdot r[k+k_0+\kappa] \tag{18}$$

and the power sum inside a frame of $D_{sync}$ subsequently received samples $$P[k] = \sum_{\kappa=0}^{D_{sync}-1} |r[k+\kappa]|^2. \tag{19}$$

Both values, S[k] and P[k], can be recursively calculated from S[k−1] and P[k−1], respectively. This is accomplished by adding one new element and subtracting the oldest one. Under the assumption of negligible rounding errors, the sum need not be calculated from scratch in each modulation interval.

The expression in Eq. (16) is exactly the same metric which was proposed for use as a periodicity metric for joint frame and frequency synchronization in [CMU87]. It is a norm for the Mean-Squared Error (MSE) between the received samples, spaced $k_0$ samples apart and can therefore be exploited to monitor the degree of periodicity in the signal. The joint timing and frequency offset decision in the two-dimensional metric in Eq. (16) is in favor of the frame start hypothesis $\tilde{k}$ and the NCFO hypothesis $\tilde{\xi}_f$ which achieve the minimum MSE (MMSE).

With the modified metric $$M[k] = P[k+k_0] + P[k] - 2|S[k]| \tag{20}$$

the original two-dimensional search can be broken down into two one-dimensional estimation problems. The estimation of the frame position comes first via the minimum MSE criterion $$\hat{k} = \underset{\tilde{k}}{\arg\min}\, M[\tilde{k}] \tag{21}$$

Thereafter the Maximum Likelihood (ML) estimate for the NCFO can be obtained by evaluating S[k] at the estimated frame start, i.e., $k=\hat{k}$, and this yields $$\hat{\xi}_f = \frac{D}{2\pi k_0} \arg(S[\hat{k}]). \tag{22}$$

Clearly, $|\xi_f| < D/(2k_0)$ is a minimum requirement for the unambiguousness of the frequency offset estimate $\hat{\xi}_f$. The quality of this estimate is further investigated later in this description, but it is mentioned here that for ISI-free frequency offset estimation, $\hat{k} \in [-(D_g - D_e), 0]$ must be ensured.

Maximum-Likelihood Criterion

In [SvdBB95] and [vdBSIB95], Sandell, van de Beek and Börjesson propose an optimum metric that is based on a ML frame synchronization approach. The detailed derivation can be found in Jan-Jaap van de Beek, Magnus Sandell, and Per Ola Börjesson, *ML Estimation of Timing and Frequency Offset in Multicarrier Systems*, Research report, Div. of Signal Processing, LuleaUniversity of Technology, Sweden, 1996 (henceforth, "[vdBSB96]"). The received signal is modeled as a complex zero-mean Gaussian distributed white random process, which is only valid for some OFDM transmit signals. Unlike the case with large numbers of unused subcarriers, as described in Stefan Müller and Johannes Huber, "A Novel Peak Power Reduction Scheme for OFDM", *Proceedings of the International Symposium on Personal, Indoor and Mobile Radio Communications (PIMRC'97)*, pages 1090–1094, Helsinki, Finland, September 1997 (henceforth, "[MH97b]"), or with adaptive modulation, the zero-correlation of samples is not generally true for OFDM transmit signals with strongly varying transmit powers in the subcarriers. It is especially not true for the received signal because it was convolved with some dispersive channel impulse response. Consequently, the derivation in [vdBSB96] is itself based on the assumption of a non-dispersive channel. In the course of their analysis, they first arrive at a two-dimensional metric for joint time and frequency estimation and with the same reasoning as in the previous subsection they derive the one-dimensional search criterion $$\hat{k} = \underset{\tilde{k}}{\mathrm{argmin}}\left(\rho\left(P[\tilde{k}+k_0] + P[\tilde{k}]\right) - 2|S[\tilde{k}]|\right) \quad (23)$$

for frame synchronization, where the constant $$\rho \equiv \frac{\sigma_s^2}{\sigma_s^2 + \sigma_n^2} \quad (24)$$

accounts for the Signal-to-Noise Ratio (SNR) at the receiver input. Apart from this SNR-adaptive factor the metric has the same structure as the one in Eq. (20). Clearly, P[k] and S[k] are defined in Eqs. (18) and (19). Even though the derivation assumes a non-dispersive channel, the metric retains its optimality and superiority in dispersive channels.

Maximum-Correlation Criterion

A simplified frame synchronization metric is proposed in T. Keller and L. Hanzo, "Orthogonal Frequency Division Multiplex Synchronisation Techniques for Wireless Local Area Networks", *Proceedings of the International Symposium on Personal, Indoor and Mobile Radio Communications (PIMRC'96)*, pages 963–967, Taipei, Taiwan, 1996 (henceforth "[KH96]"). Here, we obtain the frame start via $$\hat{k} = \underset{\tilde{k}}{\mathrm{argmax}}|S[\tilde{k}]|, \quad (25)$$

which represents the time position of Maximum Correlation (MC) magnitude (cf. Eq. (18)). Equivalently, the maximum of $|S[\tilde{k}]|^2$ can be the criterion, so that no square roots need to be processed in an implementation.

If the received signal has a constant envelope and the noise is moderate so that $P[k] = \mathrm{const}\ \forall k$, then the latter criterion would be as optimal as the criteria in Eqs. (23) and (21). However, this is definitely never true for OFDM signals because the signal envelope of OFDM is far from constant. It is not even constant for multipath-corrupted receive signals in single-carrier modulated systems. Consequently, the criterion in Eq. (25) must be suboptimal, because it does not account for the average power inside the currently processed synchronization window.

A Fourth Criterion

In [SC96], Schmidl and Cox suggest applying the "defined'[SC97]-metric $$\hat{k} = \underset{\tilde{k}}{\mathrm{argmax}} \frac{|S[\tilde{k}]|^2}{\left(P[\tilde{k}+k_0]\right)^2} \quad (27)$$

for which the required values are defined in Eqs. (18) and (19).

A Fifth Criterion: Maximum Normalized Correlation

The inventors of the herein-described and claimed invention have developed yet another criterion, referred to herein as Maximum Normalized Correlation (MNC) that they consider to be preferable for use in performing coarse frame synchronization with the new sandamble. The metric in accordance with this aspect of the invention, and its use in determining a coarse time synchronization estimate (i.e., $\hat{k}$) is $$\hat{k} = \underset{\tilde{k}}{\mathrm{argmax}} \frac{|S[\tilde{k}]|^2}{\left(P[\tilde{k}+k_0] + P[\tilde{k}]\right)^2} \quad (28)$$

In operation, then, the first correlation unit 505 (see FIG. 5) determines, for each of a number of hypothesized coarse frequency estimates, $\tilde{k}$, a correlation value ($_{S[\tilde{k}]}$) representing the correlation between the hypothesized A region and the hypothesized B region of the received samples r[k]. These correlation values may be stored in a correlation memory 511. After computing all of the correlation values, the first correlation unit 505 then examines these to perform the argmax-operation, that is, to find that value of $\tilde{k}$ that maximizes the metric $$\frac{|S[\tilde{k}]|^2}{\left(P[\tilde{k}+k_0] + P[\tilde{k}]\right)^2}.$$

This maximizing value, $\hat{k}$, is the coarse frame start estimate 509.

Reducing Frequency Estimation Variance

Having estimated the locations of the A and B regions in the received samples r[k], it is further possible for the first correlation unit 505 to estimate the frequency of the received signal. The prevalent problem in frequency estimation is the frequency accuracy. The variance of the frequency estimate is inversely proportional to $k_0^2$. A second problem is the estimation range which gives the maximum allowable frequency offset which can be recognized by the estimator without ambiguity. For each of the preamble structures depicted in FIGS. 1a, 1b and 3, the estimation range for the frequency offset derived from the correlation between the A and B regions is inversely proportional to $k_0$. It follows, then, that an enlarged periodicity interval has the effect of reducing the estimation range.

A number of possibilities can be outlined to obtain accurate (i.e., low-variance) frequency estimates. These are:

With reference to the repetition preamble depicted in FIG. 1a, an increase in the number of samples within the repeated signal parts in the A and B regions improves the estimation accuracy. See [SC96]. The effect is that the diversity factor (and the training overhead) becomes larger and the periodicity interval is enlarged. Hence, the estimation range is reduced.

Figure 1B:
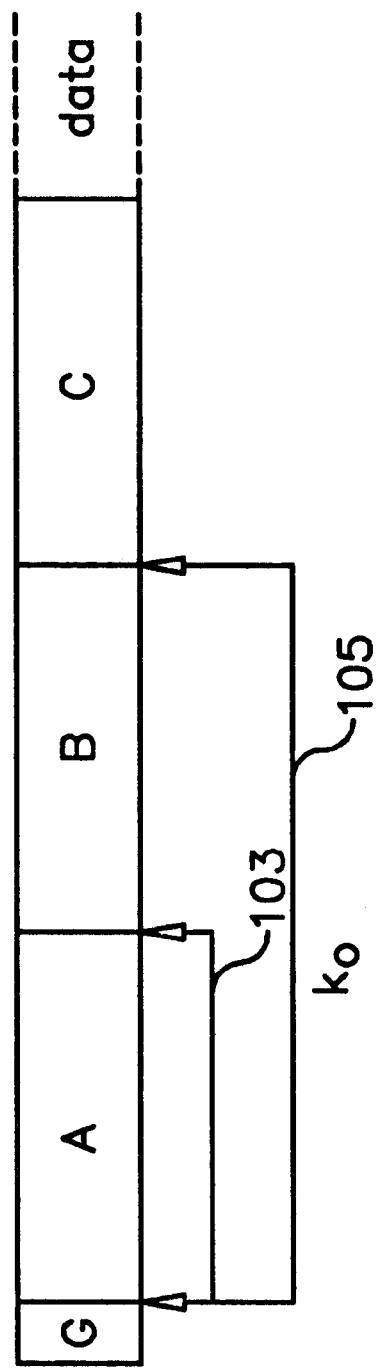

Using several repetitions instead of only two gives the opportunity to use various periodicity intervals, as is depicted in the preamble structure of FIG. 1b. Here, the processing of the regions A and B as well as the regions B and C permits larger frequency offsets to be estimated, while the processing of the regions A and C results in a better frequency variance. See [FM93] and [FM94].

In accordance with one aspect of the invention, another approach to obtain accurate frequency estimates is to increase the periodicity interval without increasing the number of repeated samples. Here the diversity factor (and the training overhead) remain approximately the same, while the estimation range is similarly reduced. By doubling the periodicity interval $k_0$ between the A and B regions, the estimation variance is reduced by a factor of 4, while the estimation range is reduced by a factor of 2. This idea of trading variance against estimation range is realized via the very flexible sandamble approach, in which the repeated synchronization symbols are separated by data.

In terms of the relationship between frequency estimation variance and training overhead, the sandamble has considerable advantages over the pure (conventional) preamble types. This is already apparent in FIGS. 1a, 1b and 3 by comparing the number of training samples. Depending on the specific parameters, the number of overall training samples in the sandamble can be half that of the preamble types with comparable frequency estimation variance, but clearly with a reduced estimation range. The latter can again more cheaply (in the sense of the number of dedicated samples) be enlarged by applying the method in the next Subsection.

Resolving Frequency Ambiguities

This discussion presents an overview of the approach to resolving frequency ambiguities that is used by the first stage of the exemplary embodiment. Following this overview, the various aspects will be examined in greater detail.

Returning now to the sandamble depicted in FIG. 3, the extended guard region $G_2$ is used to resolve the frequency ambiguities which may happen when correlating regions A and B. In particular, the first frequency correction 507 generated from the correlation of the A and B regions by the first correlation unit 505 is used to correct (step 513) the frequency offset of the received samples r̃[k]. The frequency correction step 513 may be performed, for example, by multiplying samples (stored in the sample memory 501) by a complex-valued rotation factor that is a function of the estimated frequency offset value (e.g., $e^{-j2\pi\Delta fTk}$, where $\Delta f$ is the estimated frequency offset). This frequency offset may be inaccurate, however, because of the possible occurrence of a periodic frequency ambiguity with a parameter-dependent interval. Consequently, this residual discrete-valued frequency offset needs to be detected. It is important to realize that there is only a discrete set of valid residual frequency offsets, so that this procedure is a detection rather than an estimation.

In order to obtain a decision variable, $G_2$ is correlated with $A_2$ by a second correlation unit 515. In addition, a third correlation unit 517 correlates the $G_2$ region with the $B_2$ region. In one aspect of the invention, the first frequency correction 513 makes it possible for the two correlation results (from the second and third correlation units 515, 517) to be combined (e.g., by addition) by a combiner 519, although such combination is not essential to the invention. That is, in alternative embodiments, only one or the other of the two mentioned correlations need be performed. Returning now to the exemplary embodiment in which both correlation results are generated and combined, it is found that this combination yields an additional 1.55 dB gain for the frequency interval decision. From this combined correlation result, the residual carrier frequency offset is detected (not estimated) by a frequency offset interval detection unit 521. This frequency interval decision 523 is combined with the first frequency correction estimate 507 from the first correlation unit 505 to form an overall frequency offset estimate 525 (e.g., by multiplying the stored sample by a complex-valued rotation factor that is a function of the estimated frequency offset value). Because this aspect of the invention combines the making of a fine estimate with the making of a discrete decision, this frequency offset estimation procedure is herein referred to as "Fine/Discrete" (FD).

A second advantage of the FD approach lies in the non-uniform distribution of frequency offsets in practical transmission systems. Usually, the frequency offsets around zero are more probable than the large carrier frequency offsets. In this case, the FD approach allows the use of a priori probabilities of frequency offset intervals in the discrete interval decision. This minimizes the overall frequency false-lock probability of FD.

Having described an overview of the operation of the first stage of the synchronization procedure, the various aspects of this first stage will now be described in greater detail.

Three Approaches for Resolving Frequency Ambiguity

In this section three approaches for avoiding or resolving frequency estimation ambiguities are analyzed. This may increasingly occur with the new sandamble structure if the frequency offsets are higher than or near the lock-in range limit of the sandamble. In the first two of the following three techniques, one of the two guard intervals of the two synchronization symbol parts is extended, so that correlations with different basis lengths become feasible. By appropriate processing of the correlation results, the ambiguity can be resolved or avoided in certain limits, thereby leading to a rather feed-forward kind of frequency estimator. Referring back to the preamble structure of FIG. 4, the reader is reminded that in the exemplary sandamble, $D_g^{(1)} > D_g^{(2)} = D_g$. At this point the variable $D_c$ is further introduced, which is the number of correlation products that, due to the guard interval extension, can be used to resolve frequency ambiguity. Clearly, $D_c \leq D_g^{(1)} - D_e$ must be provided in order to ensure the required periodicity for the correlation products.

The third approach does not require a guard interval extension and is therefore more efficient in throughput. It exploits the knowledge of differential subcarrier pilot symbols, introduced for the (iterative) frequency-domain time synchronization. In order to determine the frequency offset, a trial-and-error technique is used, which is computationally more expensive than the first two approaches.

First Technique: Coarse/Fine (CF) Approach

In this technique, ambiguity is avoided prior to the use of the sandamble approach for performing the fine frequency offset estimation. A similar synchronization scheme is described in [LSM97]. In a preprocessing unit, a coarse frequency estimate is obtained from a first correlation between the A and B regions of the preamble structure shown in FIG. 1b. This first correlation has a shorter correlation basis. The hereby estimated (potentially large) frequency offset is corrected prior to the fine estimation according to the result from a second correlation obtained between the A and C regions of the preamble structure shown in FIG. 1b.

In accordance with one aspect of the invention, this technique may be applied to the new sandamble structure, which permits both the first and second correlations to be performed between components having respective shorter and longer correlation bases.

The correlation to use for coarse frequency offset estimation exploits a basis of $D_{sync}$, consists of $D_c$ products and is defined by $$L^c[k] = \sum_{\kappa=1}^{D_c} r*[k-\kappa]r[k+D_{sync}-\kappa]. \tag{29}$$

Figure 6:
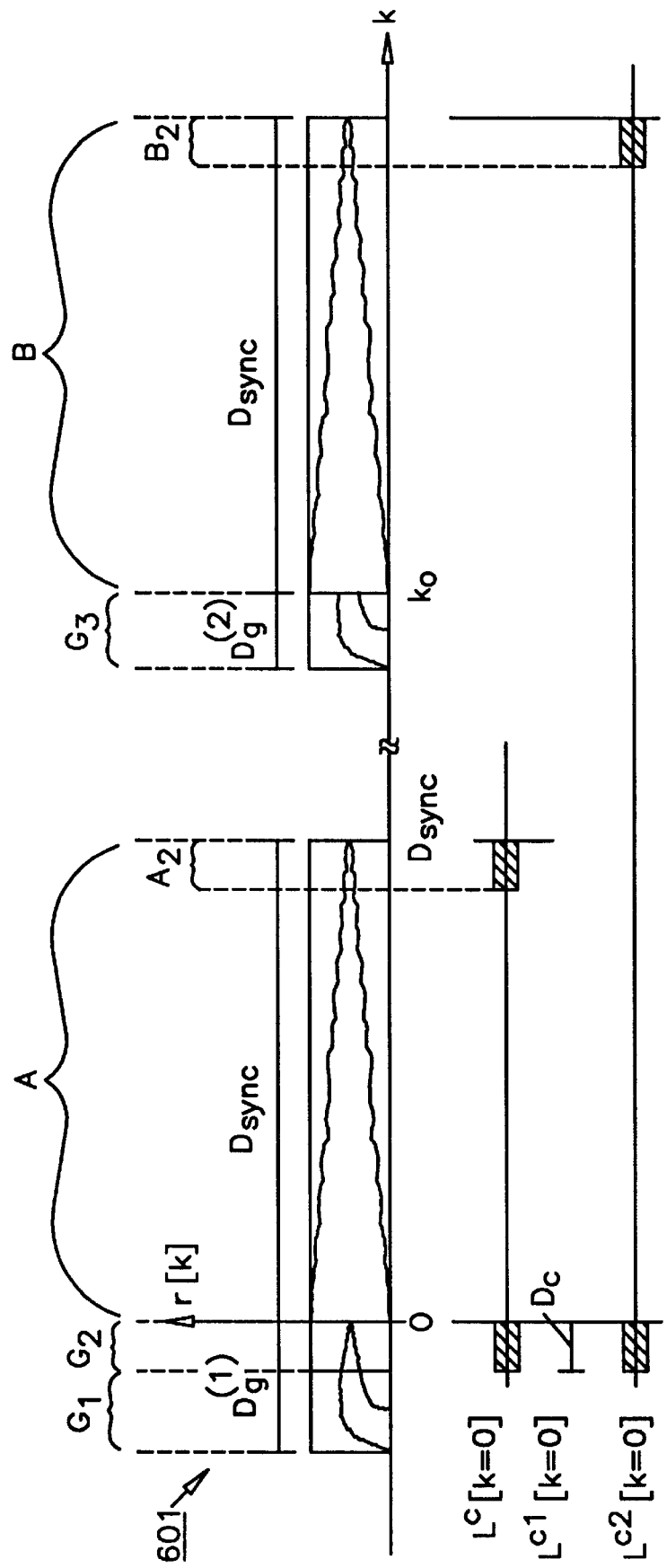
FIG. 6 schematically depicts correlation regions for a received signal having $G_1$, $G_2$, $G_3$ A (including $A_2$) and B (including $B_2$) regions.

In FIG. 6, this correlation is schematically depicted for a received signal 601 having $G_1, G_2, G_3$ A (including $A_2$) and B (including $B_2$) regions.

By substituting, in place of the noisy sample, the sum of the noiseless sample plus noise, i.e., $r[k]=\tilde{r}[k]+n[k]$, we approximately yield $$L^c[k] \approx \sum_{\kappa=1}^{D_c} \tilde{r}*[k-\kappa]\tilde{r}[k+D_{sync}-\kappa] \tag{30}$$
$$+ \sum_{\kappa=1}^{D_c} \tilde{r}*[k-\kappa]n[k+D_{sync}-\kappa] + n*[k-\kappa]\tilde{r}[k+D_{sync}-\kappa],$$

where the noise-noise product has been immediately neglected. Now, we assume perfect time synchronization so that $L^c[k]$ is evaluated at the correct time instant (k=0) and yield $$L^c[0] \approx \sum_{\kappa=1}^{D_c} |\tilde{r}[-\kappa]|^2 e^{+j2\pi\Delta f_{co}D_{sync}T} \tag{31}$$
$$+ \sum_{\kappa=1}^{D_c} \tilde{r}*[-\kappa]\left(n[D_{sync}-\kappa] + \frac{\tilde{r}[D_{sync}-\kappa]}{\tilde{r}*[-\kappa]}n*[-\kappa]\right),$$

where we exploited the property $\tilde{r}[D_{sync}-\kappa]=\tilde{r}[-\kappa]e^{+j2\pi\Delta f_{co}D_{sync}T}$, $1 \leq \kappa \leq D_c$ for the calculation of the useful part of the correlation result. Note that due to the same property the multiplicative factor for the noise component $n*[-\kappa]$, namely the ratio of the noiseless received signal samples $\tilde{r}[D_{sync}-\kappa]$ over $\tilde{r}*[-\kappa]$, has unity magnitude.

At this point, we introduce the new random variable u which represents the sum of useful power in the exploited signal part. It is defined as $$u = \sum_{\kappa=1}^{D_c} |\tilde{r}[-\kappa]|^2, \tag{32}$$

so that the useful component $\tilde{L}^c[0]$ of $L^c[0]$ in Eq. (31) can be expressed as $\tilde{L}^c[0]=u\cdot e^{+j2\pi\Delta f_{co}D_{sync}T}$. The variance of the noise component in $L^c[0]$ is $$\varepsilon\left\{\left|\sum_{\kappa=1}^{D_c}\tilde{r}[-\kappa]\left(n[D_{sync}-\kappa]+\frac{\tilde{r}[D_{sync}-\kappa]}{\tilde{r}*[-\kappa]}n*[-\kappa]\right)\right|^2\right\} \tag{33}$$
$$=\varepsilon\left\{\sum_{\kappa=1}^{D_c}|\tilde{r}[-\kappa]|^2\cdot\left|n[D_{sync}-\kappa]+\frac{\tilde{r}[D_{sync}-\kappa]}{\tilde{r}*[-\kappa]}n*[-\kappa]\right|^2\right\}$$
$$=u*\varepsilon\left\{\left|n[D_{sync}-\kappa]+\frac{\tilde{r}[D_{sync}-\kappa]}{\tilde{r}*[-\kappa]}n*[-\kappa]\right|^2\right\}=u\cdot 2\sigma_n^2,$$

where we assumed that the received signal samples and the noise samples as well as the single noise samples are statistically independent. Note that the complex-valued noise component in $L^c[0]$ is again Gaussian distributed with variance $u\cdot 2\sigma_n^2$.

Now, we focus on the statistical properties of the random variable u in Eq. (32). If $D_c=D_{sync}$, we will constantly find that $u=D_{sync}\sigma_s^2$, which is ensured by the theorem of Parseval. Thus, u is not a random variable for the case $D_c=D_{sync}$. But owing to preamble efficiency, the more prevalent case will be $D_c \ll D_{sync}$ and this will be assumed in the following derivation. It follows directly from the properties of the OFDM transmit signal that the noiseless time-domain samples $\tilde{r}[k]$ can be approximately interpreted as complex-valued uncorrelated and Gaussian distributed (statistically independent) random variables with zero mean and variance given by $\sigma_s^2$. Hence u is centrally chi-square distributed with $2D_c$ degrees of freedom. The pdf of u is then $$p_u(u) = \frac{1}{(\sigma_s^2)^{D_c}(D_c-1)!}u^{D_c-1}\exp\left(-\frac{u}{\sigma_s^2}\right)\delta_{-1}(u), \tag{34}$$

where $\delta_{-1}(u)$ is a unit step function that is equal to 1 for all u greater than or equal to 0, and equal to 0 otherwise.

The following analysis aims to find an analytical expression for the probability of frequency estimation failure, i.e., that the coarse estimator is not able to provide a coarse estimate such that the fine estimate is unambiguous. The noiseless coarse correlation result $$\tilde{L}^c[0] = u\cdot e^{+j2\pi\Delta f_{co}D_{sync}T} = u\cdot e^{+j2\pi\frac{D_{sync}}{D}\xi_f},$$

which simultaneously represents the expected value of the correlation, and has the phase angle $$2\pi\frac{D_{sync}}{D}\xi_f.$$

Clearly, $$\xi_f < \frac{D}{2D_{sync}}$$

must be provided in the noiseless case to ensure non-ambiguity of the coarse estimate. If noise is present, a synchronization failure rate will occur, depending on the difference between the actual $\xi_f$ and this upper limit.

This coarse ambiguity problem occurs for large $\xi_f$ only, but apart from that the coarse frequency offset estimate obtained from $L^c[0]$ must additionally lie within the unambiguity range of the fine estimator. This will turn out to be the more stringent problem. Thus the coarse estimator must at least provide that the residual frequency offset after the first correction lies such that $|2\pi\Delta f_{c,0}k_0T|<\pi$, i.e., the fine estimator may work unambiguously. This phase limit corresponds to an argument of $$\pm\pi\frac{D_{sync}}{k_0}$$

which defines the decision regions in the coarse correlation result. Consequently, the phase range for $arg(L^c[0])$, where the fine frequency synchronization does not fail is given by $$\left|arg(L^c[0]) - 2\pi\frac{D_{sync}}{D}\xi_f\right| < \pi\frac{D_{sync}}{k_0}.$$

Figure 7:
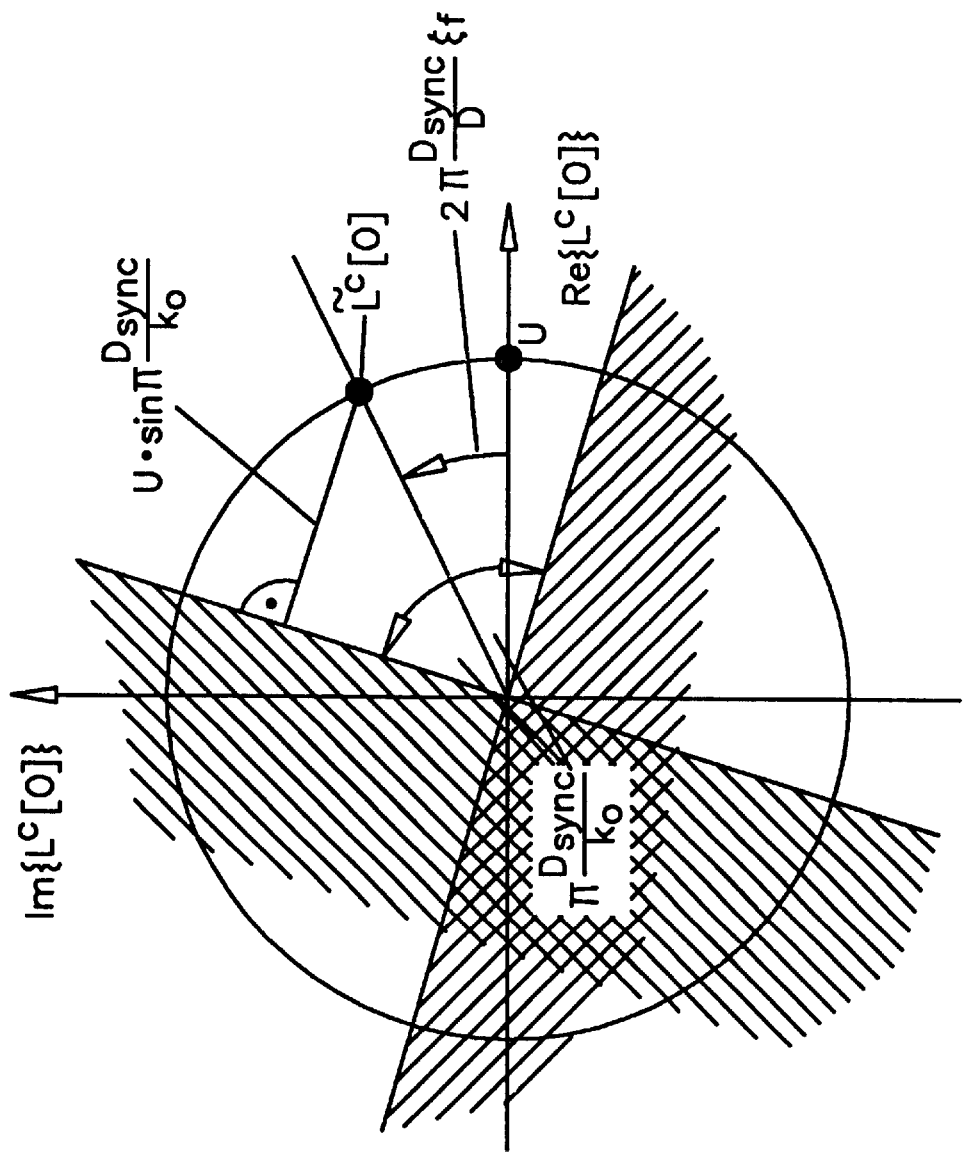
FIG. 7 is a phasor diagram of a noiseless (coarse) correlation in the CF approach and the non-ambiguity region of a fine estimator for the sandamble structure.

FIG. 7 is a phasor diagram of the noiseless (coarse) correlation $\tilde{L}^c[0]$ (expected value) and the non-ambiguity region of the fine estimator for the sandamble structure. The phase range where the fine frequency synchronization does not fail is depicted as non-hatched area in FIG. 7, and as already indicated there, the opening angle $$\pi\frac{D_{sync}}{k_0}$$

of the decision region is usually smaller than $\pi/2$ for a reasonable choice of OFDM parameters.

Now, we have to distinguish two cases to evaluate the probability of false lock due to one of the reasons mentioned above:

The non-hatched area in FIG. 7 lies entirely within the non-ambiguity range of the coarse estimator, i.e., entirely above or below the negative real axis. This is mathematically expressed by $$\pi - 2\pi\frac{D_{sync}}{D}|\xi_f| > \pi\frac{D_{sync}}{k_0},$$

i.e., $$|\xi_f| \leq \frac{D}{2D_{sync}}\frac{k_0 - D_{sync}}{k_0}.$$

In this case we have symmetrical conditions for the error events with respect to both decision region boundaries. They are overstepped if the magnitude of the boundary-orthogonal noise component—with variance $u \cdot \sigma_n^2$ (per real dimension)—exceeds the amplitude value $$u \cdot \sin\pi\frac{D_{sync}}{k_0}$$

(see FIG. 7), in either one of the two directions.

The second case is valid for large relative frequency offsets, i.e., in the range $$\frac{D}{2D_{sync}}\frac{k_0 - D_{sync}}{k_0} < |\xi_f| < \frac{D}{2D_{sync}},$$

where the distances of the, noiseless (expected) correlation point $\tilde{L}^c[0]$ to the two failure boundaries are differing and given by $$u \cdot \sin\pi\left(1 - \frac{2D_{sync}}{D}|\xi_f|\right) \text{ and } u \cdot \sin\pi\frac{D_{sync}}{k_0},$$

respectively.

The probability of frequency synchronization failures, $P_{ff}$, in the coarse/fine scheme can therefore be approximated as $$P_{ff} \approx \qquad(35)$$

$$\begin{cases} 2 \cdot P_{chi}\left(\sin\pi\frac{D_{sync}}{k_0}, \sigma_n^2\right), & |\xi_f| \leq \frac{D}{2D_{sync}}k_0 - \frac{D_{sync}}{k_0} \\ P_{chi}\left(\sin\pi\frac{D_{sync}}{k_0}, \sigma_n^2\right) + \\ +P_{chi}\left(\sin\pi\left(1 - \frac{2D_{sync}}{D}|\xi_f|\right), \sigma_n^2\right), & \frac{D}{2D_{sync}}k_0 - \frac{D_{sync}}{k_0} < |\xi_f| < \frac{D}{2D_{sync}} \end{cases}$$

where $P_{chi}(a,b)$ is given by:

$$P_{chi}(a,b) = \int_0^\infty Q\left(\sqrt{\frac{a^2}{b}}u\right)\frac{1}{(\sigma_s^2)^{D_c}(D_c-1)!}u^{D_c-1}\exp\left(-\frac{u}{\sigma_s^2}\right)du = \qquad(35.1)$$

$$\frac{1}{2}\left[1 - \frac{1}{\sqrt{1 + \frac{2b}{\sigma_s^2 a^2}}}\sum_{\delta=0}^{D_c-1}\binom{2\delta}{\delta}\frac{1}{4^\delta}\left(1 - \frac{1}{1 + \frac{2b}{\sigma_s^2 a^2}}\right)^\delta\right]$$

and has to be evaluated for calculation.

Note that we assumed for the presented derivation, that the frequency synchronization failure probability is merely caused by the failure of the coarse estimator. This assumption is usually satisfied, because the estimation variance of the fine frequency offset estimator is orders of magnitude smaller than that of the coarse estimator. More specifically, the frequency estimate obtained from the fine correlation result can be interpreted as noiseless (near-zero variance), when compared to the coarse estimate.

Second Technique: Fine/Discrete (FD) Approach

In accordance with an aspect of the invention, the frequency offset is first estimated with the fine estimator and then corrected (even though eventually with discrete-valued ambiguity). An attempt is then made to finally resolve this ambiguity by a postprocessing unit operating on one or more correlation results with a different correlation basis. The failure rate performance in the primitive version of this FD approach (described more fully below with reference to Eq. (37)) can be comparable or even identical to that of the CF, but it offers some further advantageous features, which should be exploited to significantly improve its performance over that of CF.

Figure 8:
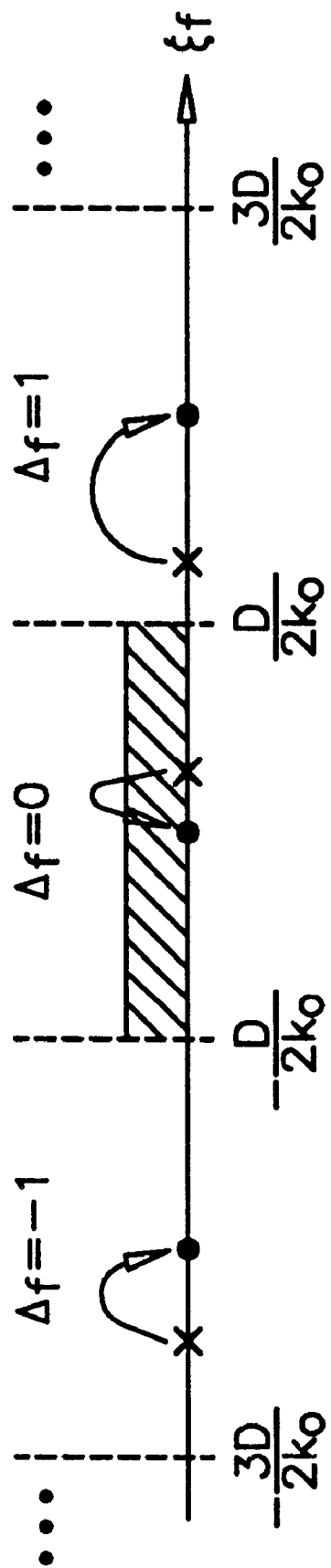
FIG. 8 is a graph in which the horizontal axis represents the relative frequency offsets $\xi_f$ and the axis is subdivided into the (normalized) ambiguity intervals of length $D/k_0$.

According to the preamble structure given in FIG. 4, the fine estimator uses the correlation basis $k_0 = D_{sync} + D + D_g^{(2)}$ to estimate the frequency offset with very low variance. The estimate exhibits a normalized ambiguity interval of $D/k_0$. This means that after "correction" of the estimated fine frequency offset, the received signal can be interpreted to exhibit solely uniformly-spaced and discrete-valued frequency offsets. The operating principle of the fine correlation and correction unit is illustrated in FIG. 8. In the following notation, $\Delta f_{co}$ and $\xi_f$ denote the remaining offset values after the already described frequency offset correction according to the sandamble has been accomplished. Thus the remaining discrete-valued frequency offset is determined by the property $2\pi\Delta f_{co} T k_0 = 2\pi\Delta_f$ with $\Delta_f \in Z$. This results in $$\Delta f_{co} = \frac{1}{k_0 T}\Delta_f \text{ or } \xi_f = \frac{D}{k_0}\Delta_f, \quad \Delta_f \in Z \tag{36}$$

where $\Delta_f$ is the integer-valued parameter, indicating the ambiguity interval, the number of which must be detected by the new postprocessing stage.

In FIG. 8, the horizontal axis represents the relative frequency offsets $\xi_f$ and the axis is subdivided into the normalized ambiguity intervals of length $D/k_0$. The fine/discrete algorithm works such that the original continuous-valued $\xi_f$ somewhere on this axis is estimated by the first (fine) correlation stage. Due to the ambiguity, this normalized offset estimate will be equal to the distance relative to the nearest interval centroid and therefore not necessarily equal to $\xi_f$. In FIG. 8 the crosses indicate some continuous-valued $\xi_f$ and it is shown to which centroid (bullets) they are shifted ("corrected") by the first processing stage.

Now, if it were possible to perfectly estimate (or rather detect) the frequency offset correctly without limitation on the absolute magnitude of $\xi_f$ or at least for an acceptable number of intervals $\Delta_f$ around 0, a frequency estimator with a variance identical to that of the fine estimate but with a large lock-in range would result.

For this purpose the same correlation as in Eq. (29) is used, where the samples r[k] now denote the received signal samples after the first (fine) frequency correction. In the FD case, we obtain for the simple correlation $L^c[k]=L^{c1}[k]$ with $$L^{c1}[k] = \sum_{\kappa=1}^{D_c} r*[k-\kappa]r[k+D_{sync}-\kappa]. \tag{37}$$

$D_c$ is typically in the range of about 10 samples to be correlated. This is the correlation performed by the second correlation unit 515 shown in FIG. 5. The principal position of the samples exploited in the correlation is depicted in FIG. 6.

As in CF we assume perfect frame synchronization, and therefore we find in analogy to Eq. (31) and with Eq. (36).

$$\tilde{L}^{c1}[0] = \sum_{\kappa=1}^{D_c} |\tilde{r}[-\kappa]|^2 e^{+j2\pi\Delta f_{co}D_{sync}T} = \sum_{\kappa=1}^{D_c} |\tilde{r}[-\kappa]|^2 e^{+j2\pi\frac{D_{sync}}{k_0}\Delta_f} \tag{38}$$

for the useful correlation component at the correct timing instant (k=0). Thus the expected argument of the correlation $L^{c1}[0]$ is $$arg\langle \tilde{L}^{c1}[0]\rangle = \left(2\pi\frac{D_{sync}}{k_0}\Delta_f\right) mod 2\pi, \tag{39}$$

where the modulo operation here denotes the reduction to the argument (phase) interval $[-\pi, \pi)$. Considering the expression in Eq. (39), we find that, for suitable values of $$\frac{D_{sync}}{k_0},$$

the correlation result can take distinguishable phase angles for values, $\Delta_f$, of practical interest. FIG. 9 depicts a Table 900 that presents an overview of the phase angle values associated with the frequency offset centroid in the interval $\Delta_f$ for various OFDM parameter values. More specifically, the Table 900 presents a summary of discrete circle fractions $$\frac{1}{2\pi}arg\langle \tilde{L}^{c1}[0]\rangle \in [-0.5, 0.5)$$

(phase angle normalized to $2\pi$) associated with the centroid of interval $\Delta_f$ for various OFDM parameters. The fixed parameters are $D_g=D_g^{(2)}=8$. The value $D/k_0$ gives an idea of which NCFO $\xi_f$ (normalized to the respective D) is associated with the discrete frequency offset interval $\Delta_f=1$. The latter value is identical with the centroid spacing.

It is obvious from the Table 900 that there are more or less advantageous parameter combinations and that in the specific case the appropriate parameter ratio, $$\frac{D}{k_0},$$

has to be designed to meet the needs of the maximally occurring oscillator instabilities. From the parameter set in the first table row $$\left(\frac{D}{k_0} = \frac{4}{7}\right),$$

we learn that in this case an estimation is only possible for $|\Delta_f| \leq 3$, because the circle is uniformly subdivided into only seven detection intervals. This gives a maximum normalized frequency estimation range of $$|\xi_f| < \left(\frac{1}{2} + 3\right) \cdot \frac{D}{k_0} = 2,$$

which is quite a lot when compared to the specified 10 ppm oscillator instabilities. In an exemplary system in which D=64 and fc=5.2 GHz, this results in max $\xi_f \approx 0.266$. Without the newly proposed discrete estimator stage (postprocessing), the range of the sandamble structure would be restricted to $$|\xi_f| < \frac{1}{2} \cdot \frac{D}{k_0} = 0.286.$$

This would actually be just enough for the exemplary system (with the same OFDM parameters), so that with the specified 10 ppm the discrete stage is not required. If it is later desired to use cheaper oscillators, this discrete stage might become necessary.

Another point to be mentioned in favor of FD is the fact that depending on the ratio $$\frac{D}{k_0},$$

the maximum achievable estimation (lock-in) range may even become larger than that of the CF approach. In CF it is inherently restricted to $$|\xi_f| < \frac{D}{2D_{sync}} = 1$$

for the above discussed parameters D=64 and $D_{sync}$=32.

For the other parameter choices in FD, no double representation occurs for the whole range of $\Delta_f$ given in the Table 900. However, the discrete rows points clearly become more dense on the circle. The parameter set in the second row $$\left(\frac{D}{k_0} = \frac{4}{9}\right)$$

provides an exactly uniform partitioning of the circle into nine discrete frequency points (i.e., decision regions). For $|\Delta_f|\geq 5$, ambiguity will occur there as well, so that the maximum normalized frequency estimation range is again bounded by $$|\xi_f| < \left(\frac{1}{2} + 4\right) \cdot \frac{D}{k_0} = 2.$$

For the parameters in the lower row $$\left(\frac{D}{k_0} = \frac{16}{21}\right),$$

the range of permitted $\Delta_f$ before ambiguity occurs is larger than the ±5 listed in the Table 900. The lock-in range is actually ±10 with very dense but uniformly spaced points on the circle for frequency decision, and thus we have $$|\xi_f| < \left(\frac{1}{2} + 10\right) \cdot \frac{D}{k_0} = 8.$$

But clearly, this range must necessarily be larger in realistic (i.e., practical) systems, because with D=256 subcarriers and the same absolute frequency offset $\Delta f_{co}$ (i.e., the same RF front ends) the NCFO $\xi_f$ can become four times that large, when compared to the 64-carrier OFDM system. The FD system in the lower row could theoretically cover the same range of absolute frequency oscillator instabilities as the parameter sets in the first two rows.

Once again it is mentioned that the first row of the Table 900 actually represents a uniform partitioning into 7 discrete points $|\Delta_f|\leq 3$ if all values were to be used in the detection process. For illustration and further analysis, this phasor diagram is plotted in FIG. 10 for a relaxed detection up to $|\Delta_f|\leq 2$ only (i.e., for the five points: −2, −1, 0, 1 and 2). This still provides a lock-in range of $$|\xi_f| < (0.5 + 2) \cdot \frac{D}{k_0} = 1.428,$$

which is more than sufficient for the parameters of the exemplary system mentioned above. With such a FD frequency estimator the carrier frequency oscillator accuracy requirement could be relaxed to over 50 ppm.

Consequently, the correlation result $\tilde{L}^{c1}[0]$ has to be used for the estimation of the discrete frequency offset. The performance criterion of interest is clearly the error rate in this discrete estimation (or, more appropriately, detection) problem. Because the exploited correlation is the same as in CF, the statistical properties of $\tilde{L}^{c1}[0]$ are identical to the ones of $\tilde{L}^c[0]$. Hence, the derivation in CF applies here as well.

Figure 10:
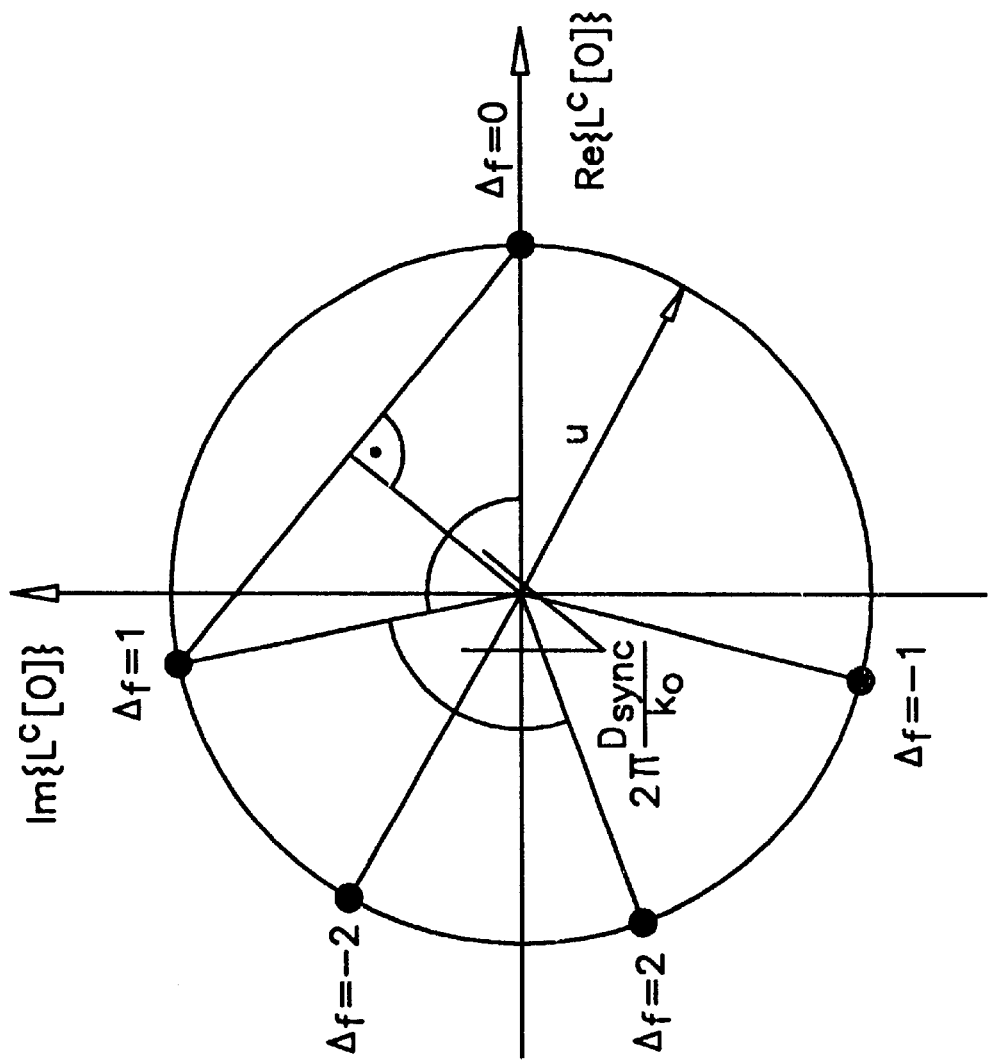
FIG. 10 is a phasor diagram for a relaxed detection with a Fine/Discrete technique (F/D) up to $|\Delta_f| \leq 2$, in accordance with one aspect of the invention.

As an example, we analyze the performance for the case of the correlation constellation depicted in FIG. 10 for $D_g=D_g^{(2)}=8$, D=64 and $D_{sync}$=32 and $|\Delta_f|\leq 2$. We assume that the discrete frequency offset lies in interval zero (i.e., $\Delta f=0$) and calculate the probability that the discrete frequency estimate is incorrect. The probability of error can be approximated by neglecting the points with $|\Delta_f|=2$ and applying the union bound yielding two times the probability that the orthogonal noise component in $L^{c1}[0]$ is larger than half the distance between the correlation signal points $\Delta_f=0$ and $\Delta_f=1$. This half distance is given by $$u \cdot \sin\pi \frac{D_{sync}}{k_0}$$

(see FIG. 10). Similar calculations have to be performed to obtain false-lock rates for the other discrete frequency offset intervals $\Delta_f\neq 0$.

The probability $P_{ff}$ of frequency synchronization failure in the specific constellation diagram of FIG. 10 can therefore be approximated as $$P_{ff} \approx \begin{cases} 2 \cdot P_{chi}\left(\sin\pi\frac{D_{sync}}{k_0}, \sigma_n^2\right), & |\xi_f| \leq \frac{D}{2k_0} \text{ or } \Delta_f = 0 \\ P_{chi}\left(\sin\pi\frac{D_{sync}}{k_0}, \sigma_n^2\right) + P_{chi}\left(\sin\pi\frac{D_{sync}}{2k_0}, \sigma_n^2\right), & \frac{D}{2k_0} < |\xi_f| < \frac{3D}{2k_0} \text{ or } |\Delta_f| = 1, \\ 2 \cdot P_{chi}\left(\sin\pi\frac{D_{sync}}{2k_0}, \sigma_n^2\right), & 3\frac{D}{2k_0} < |\xi_f| < \frac{5D}{2k_0} \text{ or } |\Delta_f| = 2 \end{cases} \quad (40)$$

where $P_{chi}$ (a, b) according to Eq. (35.1) has to be used for calculation.

It is obvious that the case $\Delta_f=0$ results in the lowest error rates, while false-lock probabilities for higher offsets are larger. This estimator property is quite reasonable.

As a first conclusion of all this theory, we can compare the false-lock performance of the CF estimator according to Eq. (35) and the FD approach from Eq. (40) and we find that for lower frequency offsets $$\left(i.e., |\xi_f| < \frac{D}{2k_0}\right),$$

the error rate is identical in both schemes for this special choice of OFDM parameters.

Third Technique: Improving the Power Efficiency of the Detection in FD

So far, it has been shown analytically that for the parameter choice D=64 and $D_{sync}=32$ in the sandamble scheme, the FD approach with $|\Delta_f| \leq 2$ is equivalent to the CF approach in terms of false-lock rate at low frequency offset values.

To mention a first advantage of the FD approach, it is pointed out that a second correlation can be exploited to determine the discrete frequency offset, so that a slight gain in power efficiency of the detector can be achieved. For this purpose, the second correlation $$L^{c2}[k] = \sum_{k=1}^{D_c} r*[k-\kappa]r[k+D_{sync}+k_0-\kappa] \tag{41}$$

is examined more closely. This is the correlation between the $G_2$ and $B_2$ regions that is performed by the third correlation unit 517 (see FIG. 5a). The principal sample positions to be used to calculate $L^{c2}[k]$ have already been indicated in FIG. 6. For the optimum time instant (k=0), it follows in analogy with Eq. (31) and with Eq. (36) that the noiseless component reads $$\tilde{L}^{c2}[0] = \tag{42}$$

$$\sum_{k=1}^{D_c} |\tilde{r}[-k]|^2 e^{+j2\pi\Delta f_{co}(D_{sync}+k_0)T} = \sum_{\kappa=1}^{D_c} |\tilde{r}[-\kappa]|^2 e^{+j2\pi\frac{D_{sync}+k_0}{k_0}\Delta_f}.$$

Hence the expected argument of $L^{c2}[0]$ is $$arg(\tilde{L}^{c2}[0]) = \left(2\pi\frac{D_{sync}+k_0}{k_0}\Delta_f\right)mod2\pi = \left(2\pi\frac{D_{sync}}{k_0}\Delta_f\right)mod2\pi, \tag{43}$$

which turns out to be the same expected phase as that of $\tilde{L}^{c1}[0]$. Note that the discovered equivalence between the arguments is established only by the operation of the fine frequency correction stage, which performed earlier on the received samples.

Thus the parameter to be exploited in the proposed FD approach with increased power efficiency is the correlation sum $$L^c[k]=L^{c1}[k]+L^{c2}[k]. \tag{44}$$

In the exemplary embodiment, this correlation sum is generated by the combiner 519 (see FIG. 5). Because optimum time synchronization has been assumed, we evaluate it at the perfect time position (k=0) and obtain:

$$L^{c1}[0] + L^{c2}[0] \approx \sum_{\kappa=1}^{D_c} 2|\tilde{r}[-\kappa]|^2 e^{+j2\pi\frac{D_{sync}}{k_0}\Delta_f} + \tag{45}$$

$$\sum_{\kappa=1}^{D_c} \tilde{r}^*[-\kappa](n[D_{sync}-\kappa]+n[D_{sync}+k_0-\kappa]) +$$

$$\sum_{\kappa=1}^{D_c} n^*[-\kappa] \cdot 2\tilde{r}^*[-\kappa]\frac{\tilde{r}[D_{sync}-\kappa]}{\tilde{r}^*[-\kappa]}$$

$$= \sum_{\kappa=1}^{D_c} 2|\tilde{r}[-\kappa]|^2 e^{+j2\pi\frac{D_{sync}}{k_0}\Delta_f} +$$

$$\sum_{\kappa=1}^{D_c} \tilde{r}^*[-\kappa]\left(n[D_{sync}-\kappa] + n[D_{sync}+k_0-\kappa] + 2n^*[-\kappa]\frac{\tilde{r}[D_{sync}-\kappa]}{\tilde{r}^*[-\kappa]}\right),$$

so that the useful component now is $$2u \cdot e^{+j2\pi\frac{D_{sync}}{k_0}\Delta_f},$$

with the same definition of u as previously introduced in Eq. (42). Thus, the amplitude of the useful signal component is doubled. After a short calculation, the variance of the noise component is found to be $u \cdot 6\sigma_n^2$. The probability $P_{ff}$ of frequency synchronization failure in the specific constellation diagram of FIG. 10 can therefore be approximated as $$P_{ff} \approx \begin{cases} 2 \cdot P_{chi}\left(\sin\pi\frac{D_{sync}}{k_0}, 3\sigma_n^2\right), & |\xi_f| \leq \frac{D}{2k_0} \text{ or } \Delta_f = 0 \\ P_{chi}\left(2\sin\pi\frac{D_{sync}}{k_0}, 3\sigma_n^2\right) + P_{chi}\left(2\sin\pi\frac{D_{sync}}{2k_0}, 3\sigma_n^2\right), & \frac{D}{2k_0} < |\xi_f| < \frac{3D}{2k_0} \text{ or } |\Delta_f| = 1, \\ 2 \cdot P_{chi}\left(2\sin\pi\frac{D_{sync}}{2k_0}, 3\sigma_n^2\right), & \frac{3D}{2k_0} < |\xi_f| < \frac{5D}{2k_0} \text{ or } |\Delta_f| = 2 \end{cases} \tag{46}$$

where again $P_{chi}(a, b)$ according to Eq. (35.1) has to be used for calculation.

From the comparison of the failure rates analytically obtained from Eq. (40) and Eq. (46), one can conclude that for any $\xi_f$ the same false-lock performance is now achieved with a receive power reduced by approximately 1.25 dB, when compared to the single correlator ("primitive" version). Consequently, the use of the additional correlation slightly improves the power efficiency of the discrete frequency estimator.

Figure 11:
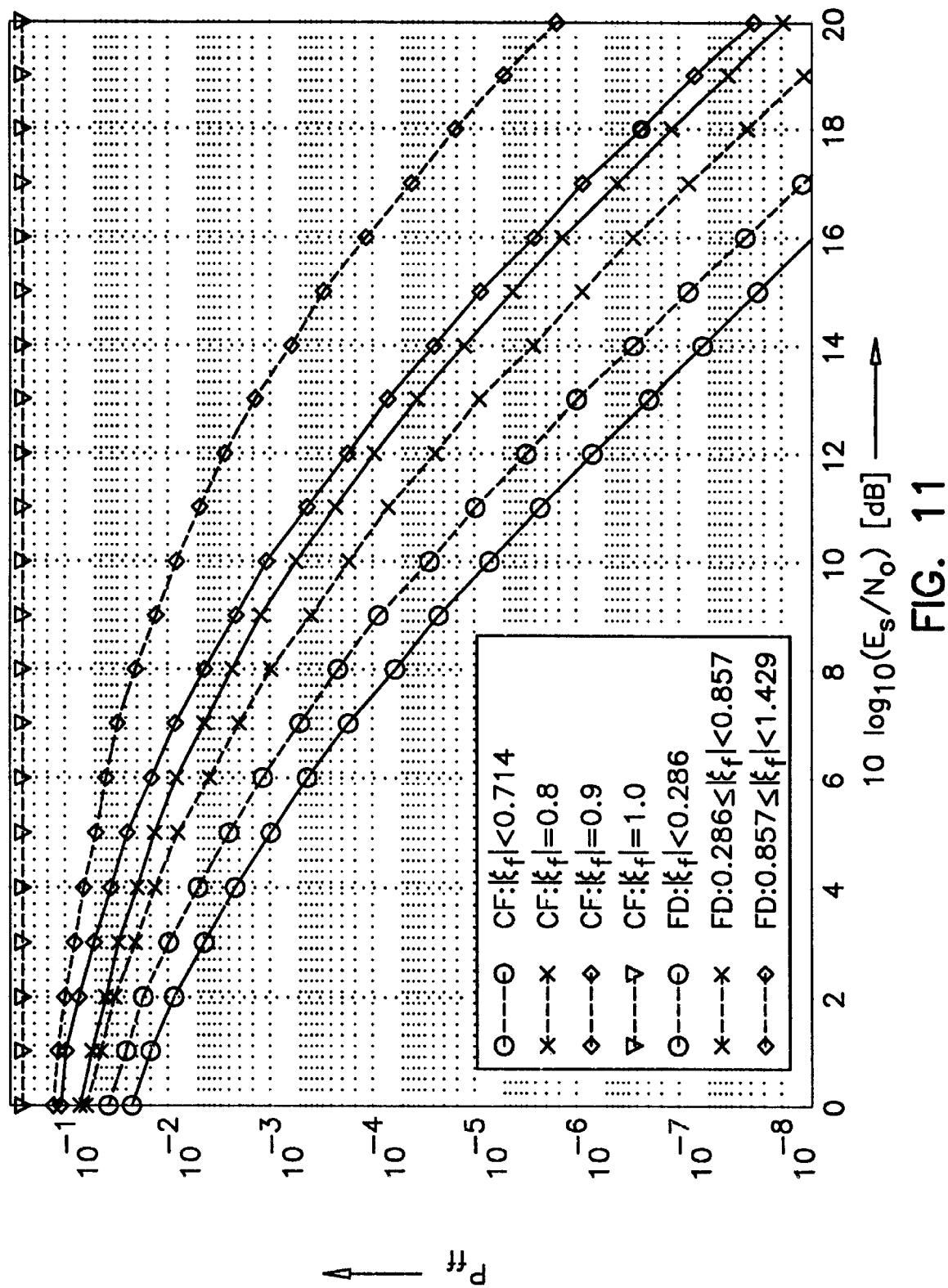
FIG. 11 is a graph in which the theoretical failure rate performance of a Coarse/Fine synchronization technique (C/F) is compared to that of the F/D technique over a range of $E_s/N_0$ values in an Additive White Gaussian Noise (AWGN) channel and over a range of relative offset $\xi_f$ values.

FIG. 11 is a graph in which the theoretical failure rate performance of CF is compared to that of FD over a range of $E_s/N_0$ values and over a range of relative offset $\xi_f$ values. For both approaches, the guard interval of the first synchronization symbol is extended to $D_g^{(1)}=14$, so that a (quite low) number of $D_c=6$ correlation products is used in the coarse correlation which can be interpreted as a diversity factor of 6 for the detection problem.

Figure 12:
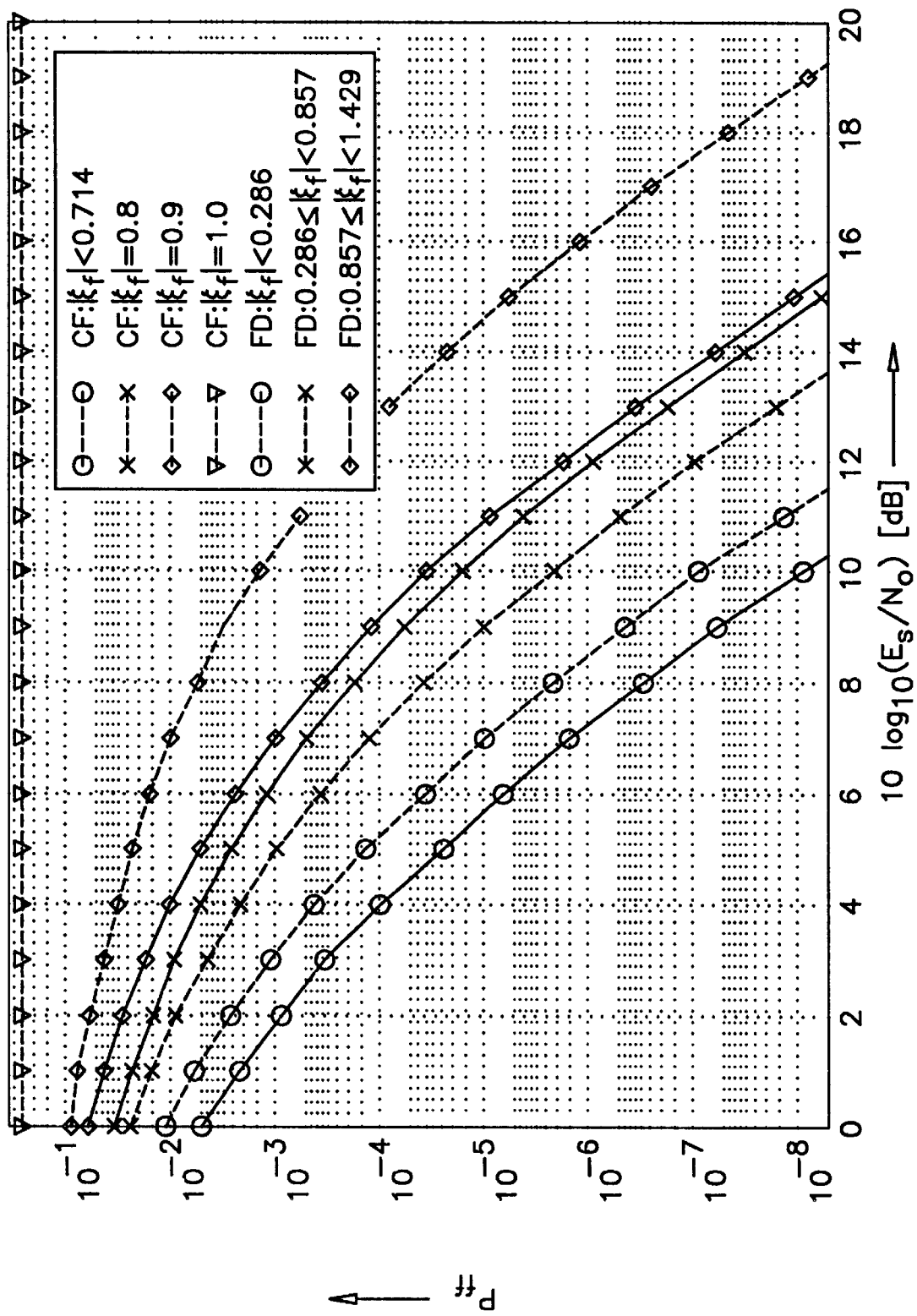
FIG. 12 is a graph in which the same failure rate comparison is provided for the case in which $D_c=10$ correlation products are used in the coarse correlation.

FIG. 12 is a graph in which the same failure rate comparison is provided for $D_g^{(1)}=18$, which implies, that $D_c=10$ correlation products are used in the coarse correlation. It should become clear that, due to the higher diversity factor, the performance is improved. The curves for the false-lock rates now decrease much steeper for rising SNR.

The diagrams show that the CF approach exhibits a constant performance over a wide range of $\xi_f$ up to $$|\xi_f| \leq \frac{D}{2D_{sync}} \frac{k_0 - D_{sync}}{k_0} = 0.714.$$

Increasing the frequency offset beyond this limit results in a considerable and continuous performance degradation. The complete break-down of CF is reached at $|\xi_f|=1$. But clearly the noise performance of CF is already unacceptable beyond $|\xi_f|=0.9$, so that the full nominal lock-in range of $|\xi_f|<1$ is only valid for noiseless systems.

The performance characteristic of the FD approach is markedly different, as the performance is constant within one interval, but degrades (or improves) in hard steps. If it were necessary to estimate the maximum possible range $|\Delta_f| \leq 3$, the error rate in all intervals would be identical to that for $|\Delta_f|=2$ (diamonds for FD in FIGS. 11 and 12), because then the circle is uniformly partitioned in this case. It is worth noting that if it were only necessary to estimate $|\Delta_f| \leq 1$, the false-lock rate for $|\Delta_f|=1$ would be even lower than the one for $\Delta_f=0$, so that FD would outperform CF in the entire range up to $|\xi_f|=0.857$.

Another point which should further be considered is the following: So far we have only considered preamble structures in which $D_g^{(2)} \approx D_g$ and $D_g^{(1)} > D_g$, that is, those preamble structures in which the first part of the split synchronization preamble provided the additional samples for the coarse correlation. Clearly, this is not compulsory because, in alternative embodiments, the second part of the synchronization preamble could equivalently be transmitted with the extended guard interval, while the first part could be transmitted using the conventional guard interval duration. This would affect the results so-far presented in this section in several ways. First, the correlation basis $k_0$ of the fine correlation would become adjustable in certain limits, but apart from this parameter nothing would be changed in the algorithm during the first (fine) estimation stage. It is worthy of note that the ratio $$\frac{D}{k_0} = \frac{D}{D_{sync} + D_g + D + D_g^{(2)}}$$

which determines the FD decision regions for the discrete frequency detection unit would be adjustable (in limits)

through the parameter $k_0$ or rather by $D_g^{(2)}$. The most important thing to point out is that the correlation sum for the coarse estimate would differ considerably as we now exploit $$L^{c1}[k] = \sum_{\kappa=1}^{D_c} r^*[k + k_0 - \kappa]r[k + k_0 + D_{sync} - \kappa] \text{ and} \quad (47)$$

$$L^{c2}[k] = \sum_{\kappa=1}^{D_c} r*[k + D_{sync} - \kappa]r[k + k_0 - \kappa]. \quad (48)$$

Figure 13:
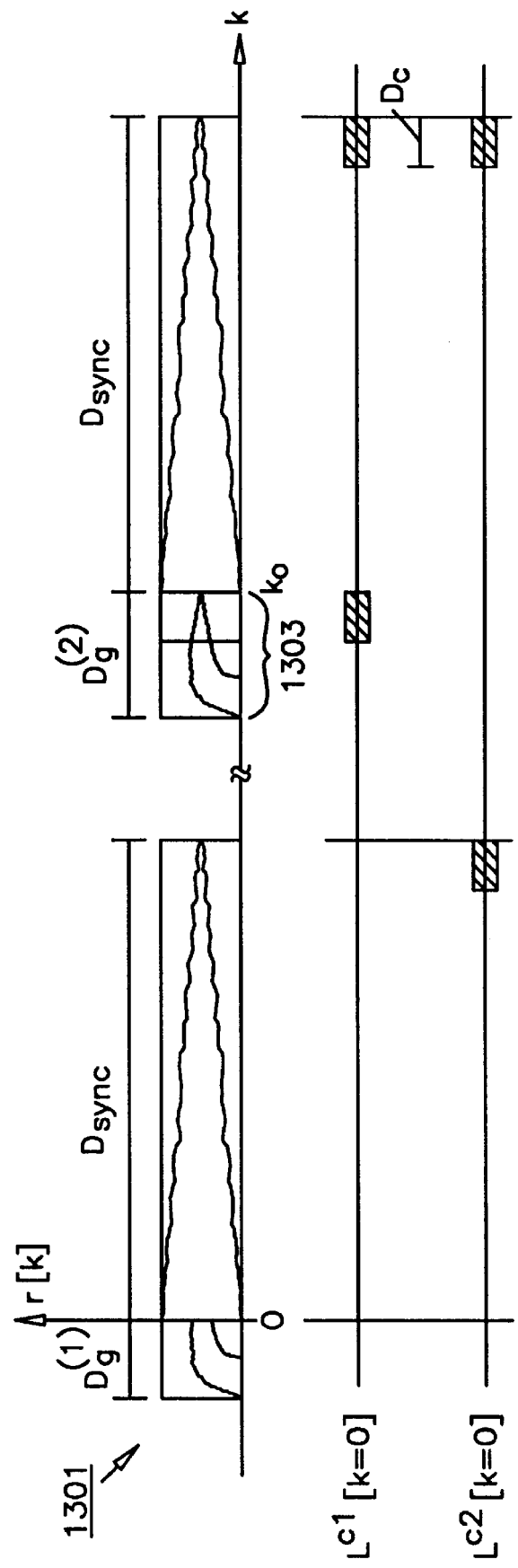
FIG. 13 schematically depicts the temporal position of the associated correlation windows which are used to calculate $L^{c1}[k]$ and $L^{c2}[k]$ when an alternative sandamble structure having an extended guard interval in a second part is used, in accordance with one aspect of the invention.

The temporal position of the associated correlation windows which are used to calculate $L^{c1}[k]$ and $L^{c2}[k]$ when this alternative sandamble structure 1301 is used are illustrated in FIG. 13. It can be seen that an extended guard interval occurs in the second part.

For the two single noiseless correlation components—which simultaneously represent the expected correlation values—we find now at the correct timing instant $$\tilde{L}^{c1}[0] = \quad (49)$$

$$\sum_{\kappa=1}^{D_c} \tilde{r}^*[k_0 - \kappa]\tilde{r}[k_0 + D_{sync} - \kappa] = \sum_{\kappa=1}^{D_c} |\tilde{r}[k_0 - \kappa]|^2 e^{+j2\pi \frac{D_{sync}}{k_0}\Delta_f}$$

$$\tilde{L}^{c2}[0] = \sum_{\kappa=1}^{D_c} \tilde{r}^*[D_{sync} - \kappa]\tilde{r}[k_0 - \kappa] = \sum_{\kappa=1}^{D_c} |\tilde{r}[k_0 - \kappa]|^2 e^{+j2\pi \frac{k_0 - D_{sync}}{k_0}\Delta_f}. \quad (50)$$

Therefore, the expected argument values of the two correlation results in this case ($D_g^{(2)} > D_g^{(1)}$) are $$arg(\tilde{L}^{c1}[0]) = \left(2\pi \frac{D_{sync}}{k_0}\Delta_f\right) mod 2\pi \quad (51)$$

$$arg(\tilde{L}^{c2}[0]) = \left(2\pi \frac{k_0 - D_{sync}}{k_0}\Delta_f\right) mod 2\pi = -\left(2\pi \frac{D_{sync}}{k_0}\Delta_f\right) mod 2\pi. \quad (52)$$

For the first correlation we obtain the same mean argument as before, while the second correlation now exhibits the exactly negated argument. Thus the correlation sum to be exploited to achieve maximum detection power efficiency in the case $D_g^{(2)} > D_g^{(1)}$ reads $$L^c[k] = L^{c1}[k] + (L^{c2}[k])^*, \quad (53)$$

which has the same statistical features as the "double correlation" in Eq. (44) for the case ($D_g^{(1)} > D_g^{(2)}$). Therefore, both variants achieve nearly the same performance if the slightly increased fine correlation basis (and therefore marginally lower estimation variance and negligibly reduced lock-in range) in the latter approach is neglected. It is noted that in this embodiment, the simple combiner 519 depicted in FIG. 5a would have to be supplemented with a complex conjugation unit (not shown) at one of its inputs, in order to receive the value $L^{c2}[k]$.

Using A Priori Probabilities for the Detection in FD

So far the discussion has not considered the pdf of the frequency offsets which will actually occur during practical operation, and clearly they will not be uniformly distributed. It is justifiable to assume that NCFOs around zero will be predominant, while offsets in intervals farther out will be rather seldom. In the simplest model of uniformly distributed and statistically independent frequency offsets in the transmitter and the receiver oscillator, the overall frequency offset pdf will follow a triangular shape. Thus we are not interested in minimizing the probability of frequency failure for each of the intervals, but we would like to minimize the overall a posteriori frequency failure rate by taking into account the pdf of NCFOs, that is, considering the a priori probabilities of estimation intervals. The decision rule to be applied can be interpreted as that of a digital transmission with a generally non-uniform PSK signal set. The correlation phase angles (signal points) are defined by the respective correlation results and—most importantly—occur with unequal a priori probabilities.

The decision $\hat{\Delta}_f$ on the discrete frequency interval shall be in favor of the a posteriori most probable one. This is expressed in the decision rule $$\hat{\Delta}_f = \underset{\tilde{\Delta}_f}{\arg\max} \, Pr\{\tilde{\Delta}_f = \Delta_f \mid L^c\}, \quad (54)$$

where for brevity of notation we introduced $L^c \equiv L^c[0]$ for the correlation result at the optimum timing instant. Note that here $L^c[k]$ stands either for $L^{c1}[k]$, $L^{c2}[k]$ or the suitable combination of both.

Now we focus on the most power efficient case of the double correlation, where the useful component was $$2u \cdot e^{+j2\pi \frac{D_{sync}}{k_0} \Delta_f}$$

and the Gaussian noise variance was $u \cdot 6\sigma_n^2$ (per complex dimension). We modify the posteriori probability in several steps and obtain the expression $$Pr\{\tilde{\Delta}_f = \Delta_f \mid L^c\} \quad (55)$$

$$= \frac{Pr\{\tilde{\Delta}_f = \Delta_f\}}{p_{L^c}(L^c)} \cdot p_{L^c}(L^c \mid \tilde{\Delta}_f = \Delta_f)$$

$$= \frac{Pr\{\tilde{\Delta}_f = \Delta_f\}}{p_{L^c}(L^c)} \cdot \frac{1}{2\pi 3u\sigma_n^2} \cdot$$

$$\exp\left(-\left|L^c - 2ue^{+2\pi \frac{D_{sync}}{k_0} \Delta_f}\right|^2 \bigg/ (6u \cdot \sigma_n^2)\right)$$

$$= \frac{Pr\{\tilde{\Delta}_f = \Delta_f\}}{6\pi u \sigma_n^2 \cdot p_{L^c}(L^c)} \cdot$$

$$\exp\left(\left(-|L^c|^2 + 4u\text{R}\left\{e^{-j2\pi \frac{D_{sync}}{k_0} \Delta_f} \cdot L^c\right\} - 4u^2\right) \bigg/ (6u \cdot \sigma_n^2)\right),$$

where $Pr\{\Delta_f = \Delta_f\}$ is the a priori frequency offset interval probability which can be obtained by integration of the frequency offset pdf within the respective interval limits. The interval-conditioned pdf $p_{L^c}(L^c \mid \tilde{\Delta}_f = \Delta_f)$ is in very good approximation Gaussian at higher SNRs, where the noise-noise products are negligible (see Eq. (31)). Neglecting the constant-valued multiplicative factors, which do not affect the maximum probability decision because they are common for all $\Delta_f$, we yield the simplified probabilistic decision rule $$\hat{\Delta}_f = \underset{\tilde{\Delta}_f}{\arg\max}\left[Pr\{\tilde{\Delta}_f = \Delta_f\} \cdot \exp\left(2\text{R}\left\{e^{-j2\pi \frac{D_{sync}}{k_0} \tilde{\Delta}_f} \cdot L^c\right\} \bigg/ (3 \cdot \sigma_n^2)\right)\right], \quad (56)$$

which is independent of the centrally chi-square distributed random variable u. It is this decision rule that is preferably applied by the frequency offset interval detection unit 521 (see FIG. 5a). Equivalently, the decision rule in the logarithmic domain reads $$\hat{\Delta}_f = \underset{\tilde{\Delta}_f}{\arg\max}\left[\frac{2}{3 \cdot \sigma_n^2}\text{R}\left\{e^{-j2\pi \frac{D_{sync}}{k_0} \tilde{\Delta}_f} \cdot L^c\right\} + \ln Pr\{\tilde{\Delta}_f = \Delta_f\}\right]. \quad (57)$$

Thus the knowledge of the noise variance $\sigma_n^2$ as well as the a priori probabilities $Pr\{\Delta_f = \Delta_f\}$ of the discrete frequency offset intervals $\Delta_f$ are required for an optimum decision on the discrete frequency offset.

For a priori equally probable offset intervals, the decision rule simplifies to the well known type of $$\hat{\Delta}_f = \underset{\tilde{\Delta}_f}{\arg\max}\text{R}\left\{e^{-j2\pi \frac{D_{sync}}{k_0} \tilde{\Delta}_f} \cdot L^c\right\}. \quad (58)$$

Without explicit derivation we give the final decision rule for the less power efficient single correlation case, which reads $$\hat{\Delta}_f = \underset{\tilde{\Delta}_f}{\arg\max}\left[\frac{1}{\sigma_n^2}\text{R}\left\{e^{-j2\pi \frac{D_{sync}}{k_0} \tilde{\Delta}_f} \cdot L^c\right\} + \ln Pr\{\tilde{\Delta}_f = \Delta_f\}\right], \quad (59)$$

reflecting the loss of $$10 \log_{10}\left(\frac{3}{4}\right) = -1.25$$

dB in power efficiency between single and double correlation. This follows directly from the factor $$\frac{2}{3}$$

in the amplitude factor, when comparing Eq. (57) to Eq. (59) and the fact that the correlation result $L^c$ in Eq. (57) will be twice as large for the double correlation case.

Simulation Results With Perfect Time Synchronization

First, simulation results for the CF scheme in AWGN (non-dispersive channel) and a multipath channel according to a decaying delay-power profile 1 are presented and compared to the theoretical results obtained from the AWGN performance analysis. The simulation parameters for all presented results utilize D=64 and $D_u$=53.

Figure 14:
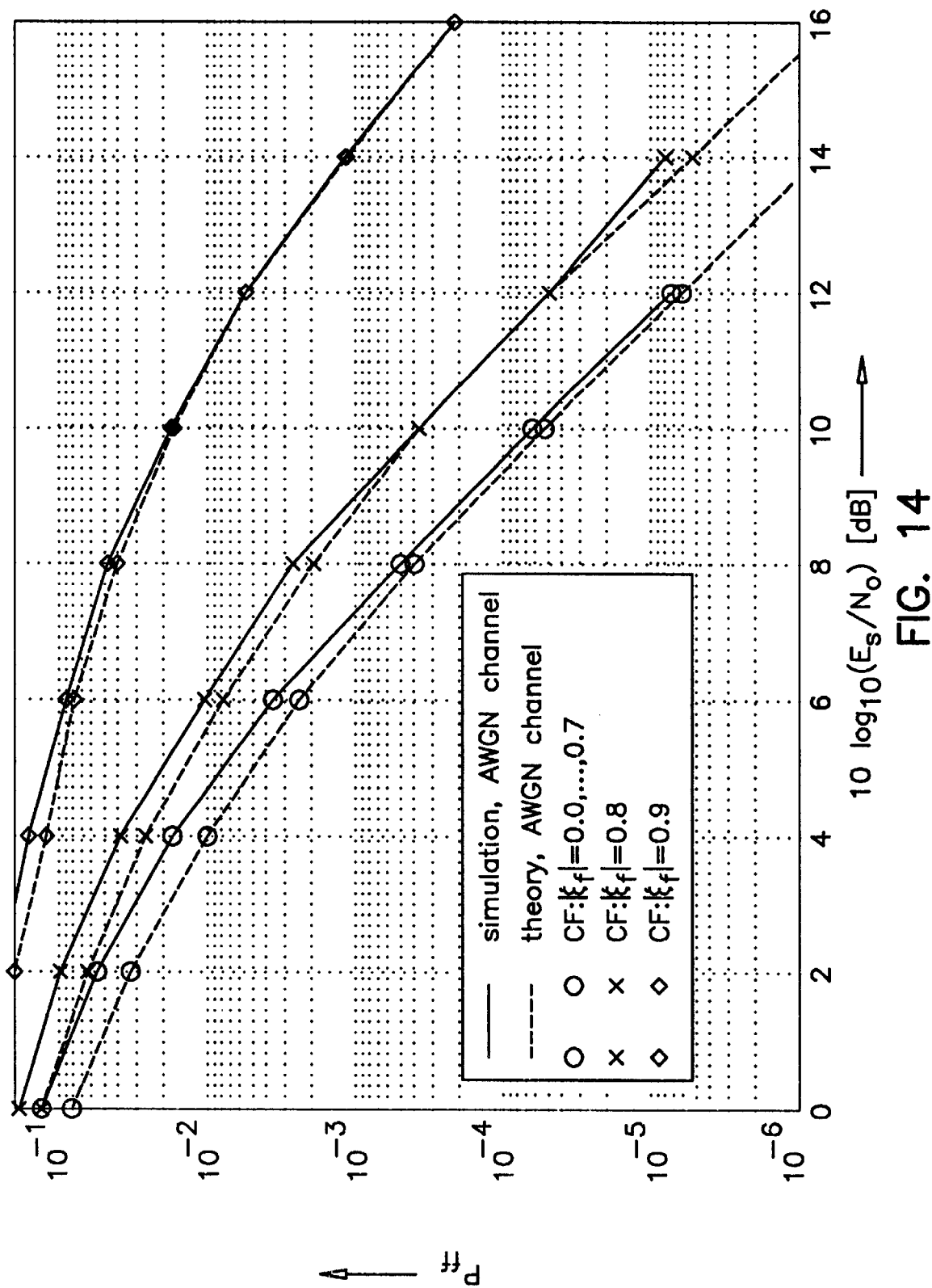
FIG. 14 is a graph in which the false-lock rate $P_{ff}$ of CF in an AWGN channel is shown for various normalized frequency offsets $|\xi_f| \in [0.0, 0.9]$.

FIG. 14 is a graph in which the false-lock rate $P_{ff}$ of CF in an AWGN channel is shown for various normalized frequency offsets $|\xi_f| \in [0.0, 0.9]$. Asymptotically, the performance is exactly predicted by Eq. (35). Even the predicted continuous degradation for $|\xi_f| \geq 0.714$ is confirmed by the simulation results. For lower SNRs, there is a slight difference between the simulation results and the analytic results which is due to the neglected noise-noise products in the theoretical derivation following the steps from (29) to (31).

Figure 15:
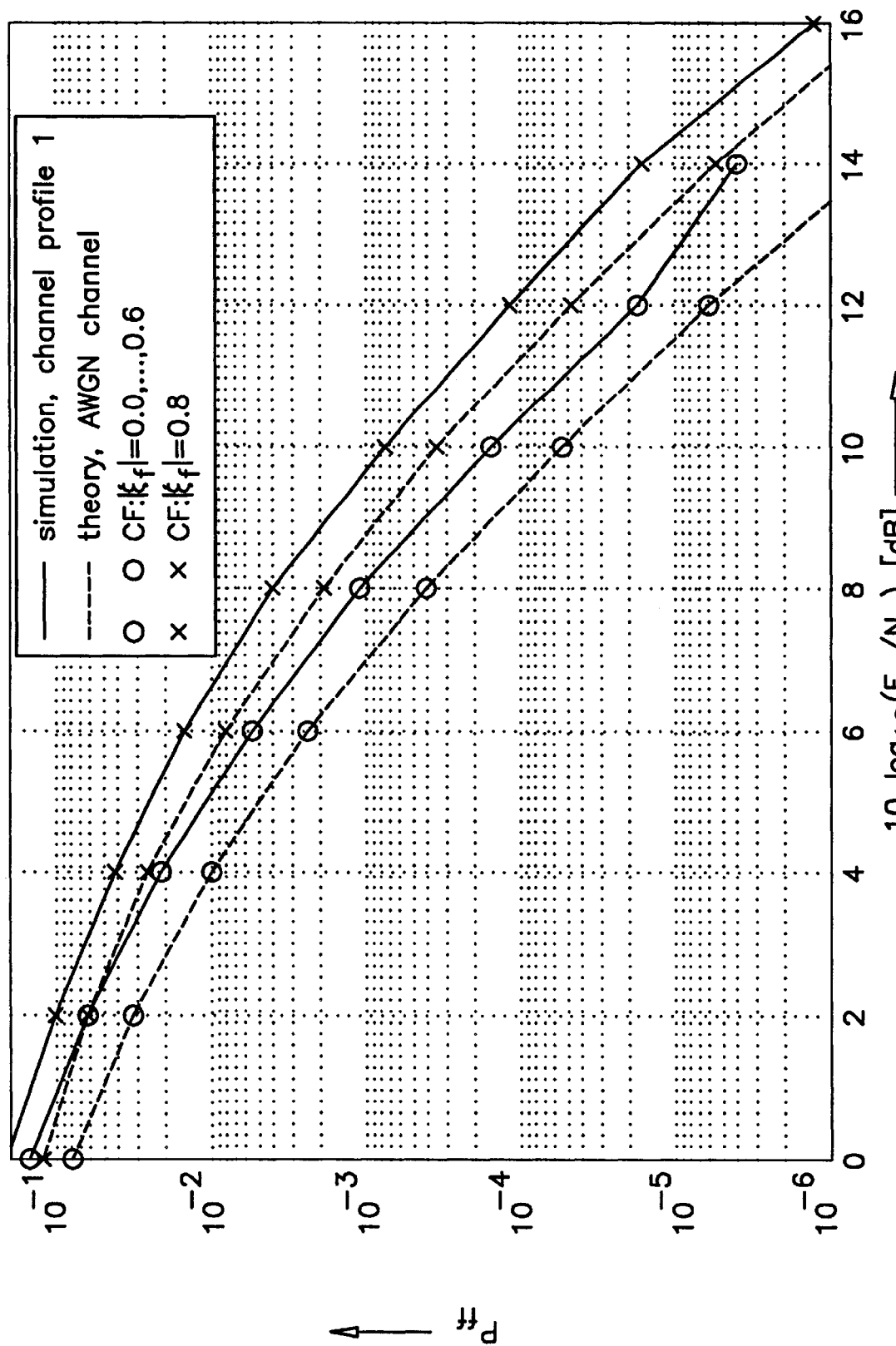
FIG. 15 is a graph depicting the frequency synchronization performance of CF for transmission over a severe multipath channel.

FIG. 15 is a graph in which the frequency synchronization performance of CF for transmission over a severe multipath channel is shown. The theoretical predictions incorporated in the plot are valid for AWGN and surprisingly, the performance difference is very low: approximately 1 dB. The difference is caused by the channel-induced correlation of subsequently received samples. Hence the $D_c$ samples in the correlation sum are no longer statistically independent, so that the useful correlation component does not follow the chi-square distribution which has been assumed in the derivation.

Thus far, we can conclude that all assumptions in the analytical derivation of the false-lock rates for AWGN were justified and the performance results are verified via the simulated CF synchronization behavior. Even though the analysis was performed for AWGN, the analytic result can be used to predict the performance for severe multipath channels within an uncertainty of roughly 1 dB or less.

Figure 16:
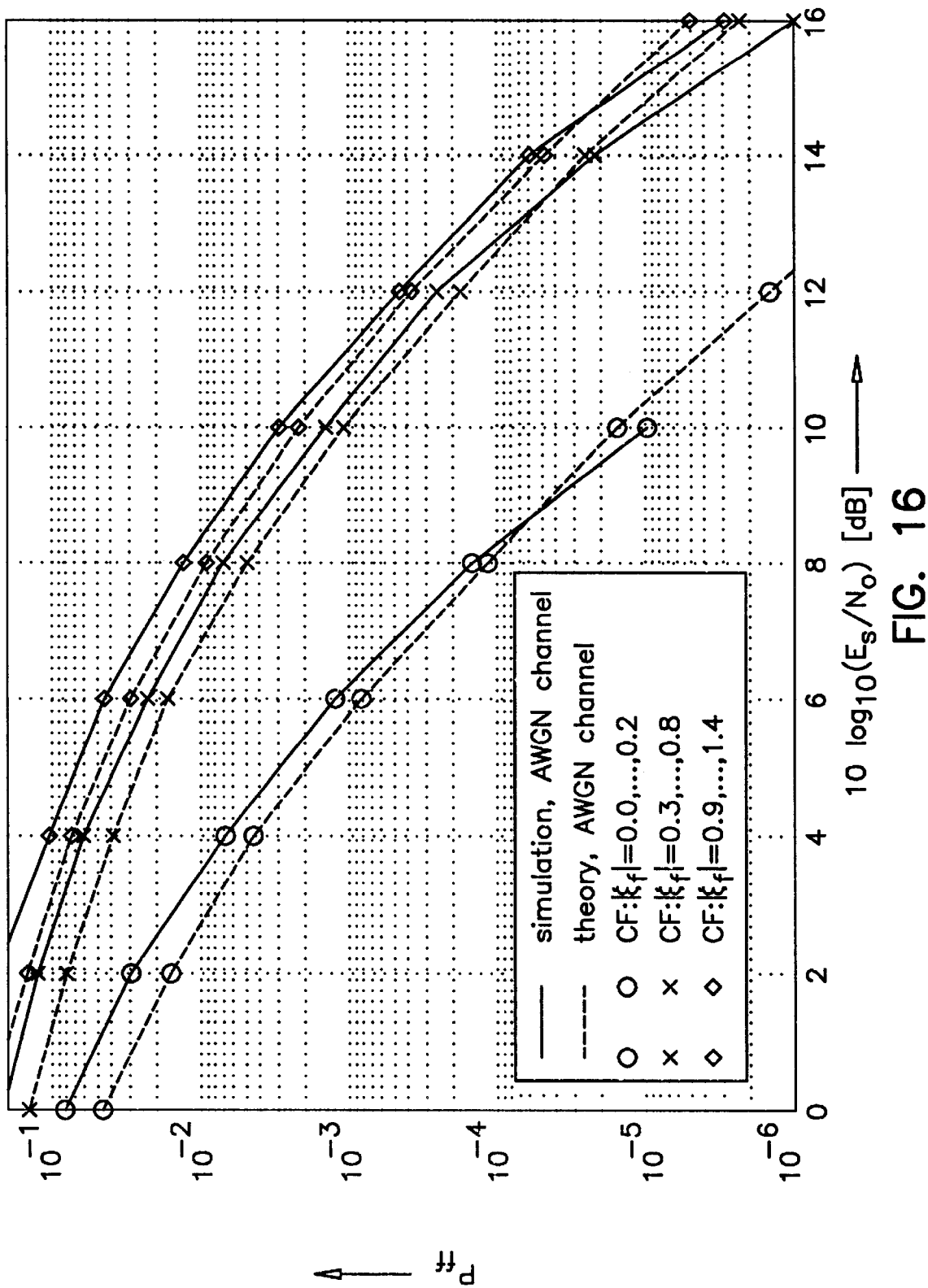
FIG. 16 is a graph depicting the false synchronization probability for transmission over the AWGN channel for various values of $\xi_f$.

What follows are simulation results for the FD scheme with "double correlation", able to detect 5 discrete intervals, i.e., $|\Delta_f| \leq 2$. This gives a lock-in range of $|\xi_f| \leq 1.429$, which is 43% larger than the nominal range of CF. It should be noted that CF actually cannot exploit the total nominal lock-in range, because the performance is continuously degrading up to the total break-down at the nominal limit $|\xi_f|=1.0$. FIG. 16 is a graph that depicts the false synchronization probability for transmission over the AWGN channel for various values of $\xi_f$. The step-wise degradation of the frequency synchronization behavior is entirely confirmed by the simulation results. Asymptotically, the theoretical false-lock rate is nearly identical with the simulated results, and the difference at lower SNRs has its origin (like in CF) in the neglected noise-noise products in the correlation sum (see Eq. (44)).

Figure 17:
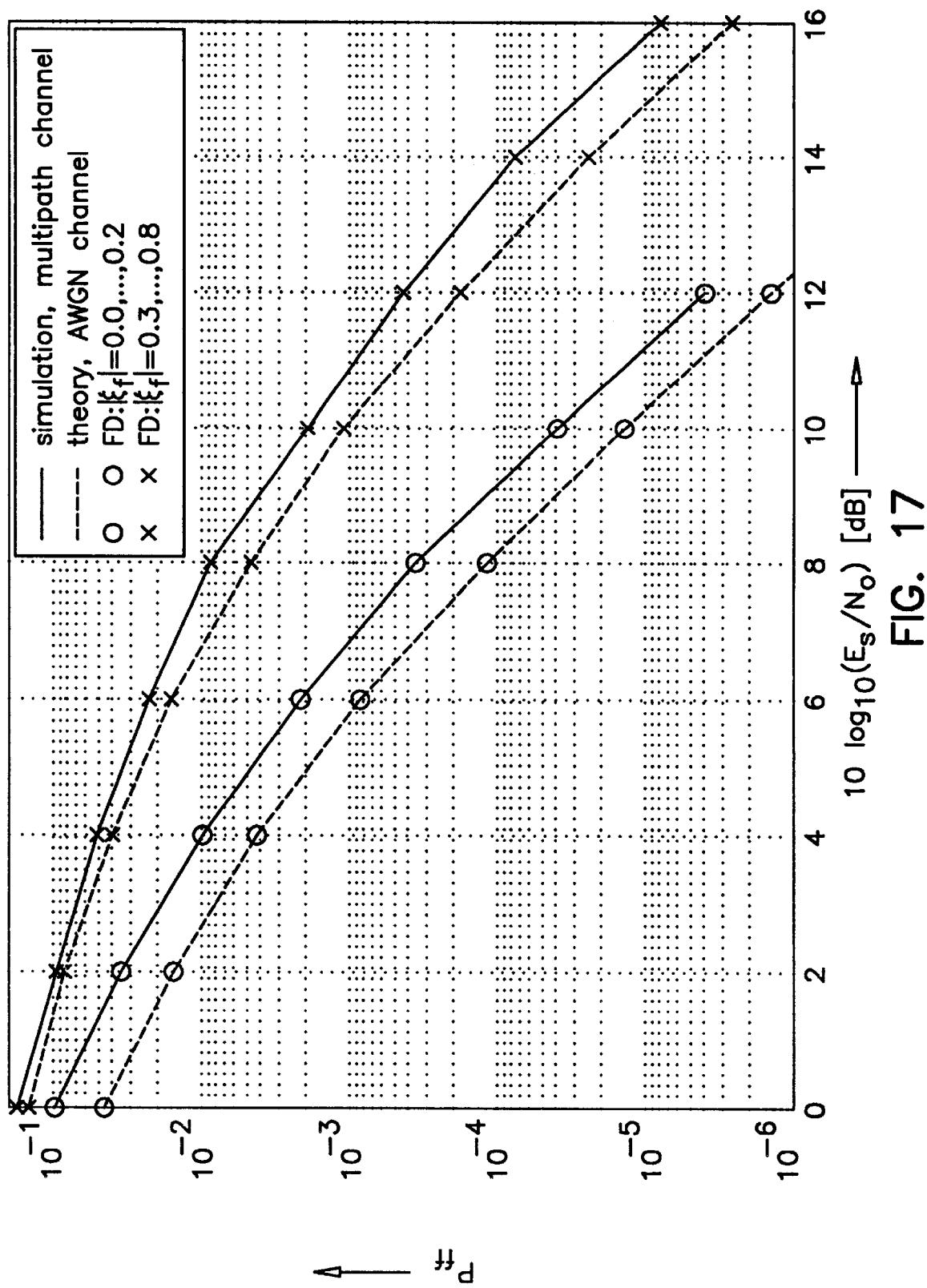
FIG. 17 is a graph comparing simulated versus theoretical results of using the FD technique in a multipath channel, assuming transmission over a severe multipath channel.

In a multipath channel, the FD approach shows a good correspondence to the theoretical prediction derived under the assumption of a transmission over AWGN. This performance evaluation is shown in the graph of FIG. 17. As in the CF scheme, the multipath simulation results are within 1 dB from the AWGN prediction, so that the theoretical result from Eq. (46) serves as a good mean to evaluate the frequency synchronization failure rates even in severe multipath channels.

Figure 18:
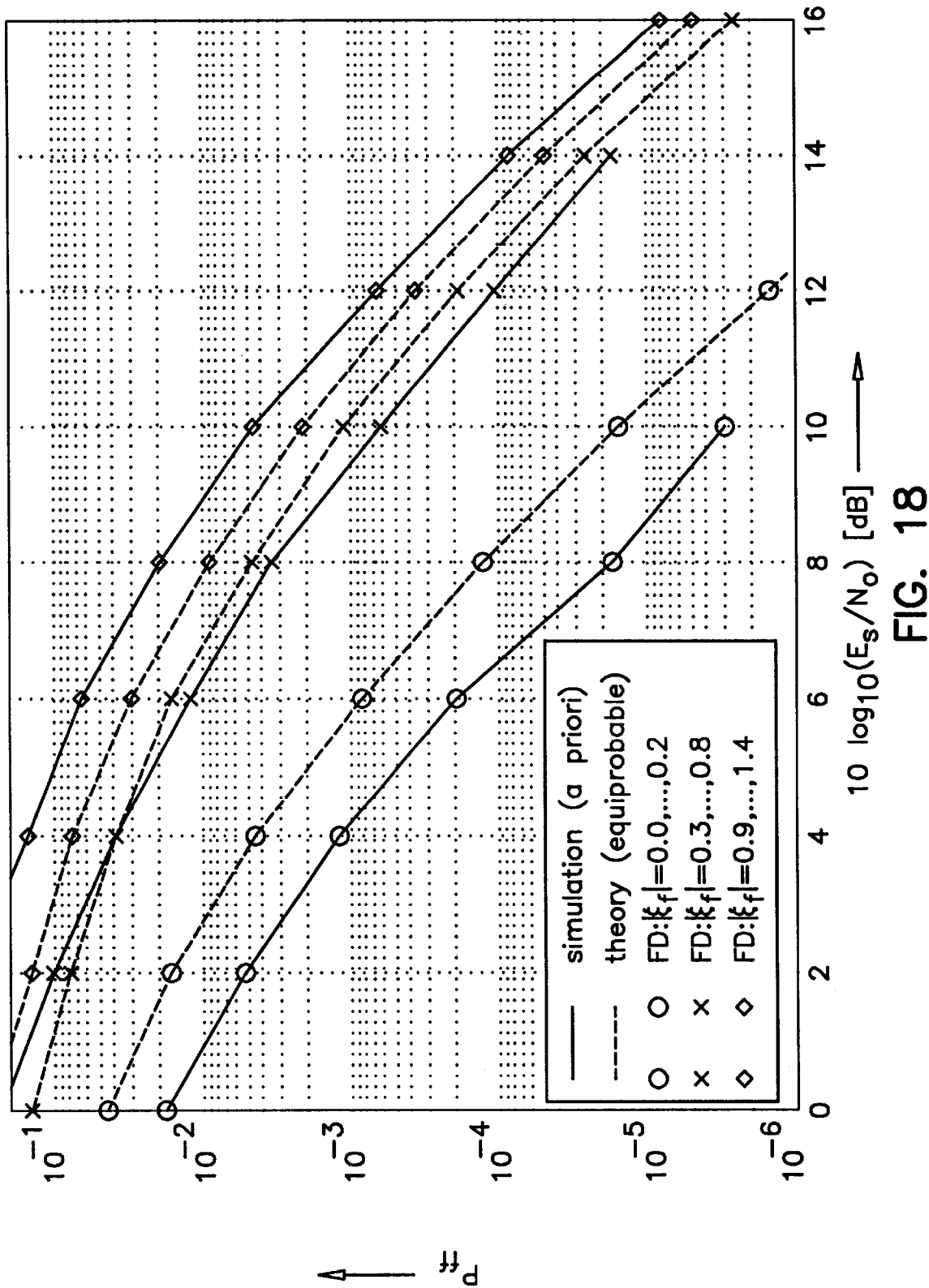
FIG. 18 is a graph depicting simulated frequency synchronization failure rates over SNR and theoretical predictions for the inventive FD approach with two correlations in an AWGN channel with different a priori probabilities for the ambiguity intervals.

To conclude these simulation results, the benefit of using a priori information for the occurring frequency offsets in the FD detection rule is motivated via the simulation result in the graph of FIG. 18, which has been obtained on an AWGN channel. The parameter setting was such that the a priori probability for the zeroth frequency offset interval ($\Delta_f=0$) was 0.90, while the adjacent two intervals $|\Delta_f|=1$ and $|\Delta_f|=2$ obtained a probability of 0.04 and 0.01, respectively. It is apparent that the false-lock rate $P_{ff}$ is drastically reduced for interval zero and slightly reduced for $|\Delta_f|=1$. The costs for this reduction are to be seen in the increase of $P_{ff}$ for the intervals with $|\Delta_f|=2$. Hence, the communication links with large frequency offsets and quite low probability will suffer a higher false sync rate. The overall synchronization failure rate is minimized by this detection rule.

Fine/Discrete Approach with Pilot Correlation (FDPC)

An approach is now described that is not restricted to application only in the FD approach with the sandamble structure as described earlier. Rather, this frequency-domain correlation can as well be used in any approach with sufficiently high discrete-valued frequency ambiguity, i.e., $|\xi_f| \geq 0.5$ or even integer values of the residual NCFO $\xi_f$. It is only required that a frequency ambiguity with an interval known at the receiver be generated by some fine frequency correction stage.

The core of this Fine/Discrete approach with Pilot Correlation (FDPC) is the exploitation of differential pilot symbols across the subcarriers of the frequency multiplex. These may be the same pilots as will be described for use in an (iterative) frequency-domain frame synchronization aspect of the invention. Thus this approach does not require any additional redundancy. The received and fine frequency corrected signal is frequency shifted (mostly in the time-domain by modulation) with integer multiples of the frequency ambiguity interval and transformed into the frequency domain by a separate DFT each. If the relative frequency offset associated with the frequency ambiguity interval is an integer multiple of a subcarrier spacing, this frequency shift can be done directly in the frequency domain by a shift of the subcarrier amplitudes. Hence only one DFT would be required in this case.

After transformation into the frequency domain samples $Y_{\mu,\nu}$, the correlation, L, is determined for each of these trial signals, $I_{\mu,\nu}$, in accordance with:

$$L \stackrel{def}{=} \sum_{\forall \nu \in I} Y^*_{\mu,\nu} Y_{\mu,\nu+1} \hat{I}^*_{\mu,\nu}. \tag{60}$$

It will be seen that this same frequency-domain correlation is useful in the stage 2 aspect of the invention, to be described later in this disclosure.

Now, instead of evaluating the phase angle, the amplitude of the correlation result L is evaluated and the interval which yields the maximum correlation amplitude is selected.

It is now advantageous to restrict the single observation blocks in the estimator to K=2, $k_0=1$, $(2k_0=K)$ i.e., $D_{cig}=1$ to keep the radial noise component low. Unfortunately, this choice has been found to be suboptimum for the frame synchronization algorithm, because there the phase is evaluated. For phase estimation, it is desirable to use $D_{cig}>1$. Hence a compromise in pilot arrangement between the frame synchronizer and the discrete frequency detector needs to be found, based on the specific problem setting.

Apart from that, this approach is data limited, and will therefore suffer a flattening, even in noise- and interference-free situations. This means that owing to the random data within the OFDM symbol which carries the pilots, a false lock may be caused by eventual match of random data with the correlation pattern. The error floor can be moved to lower values by increasing $D_{cg}$, so that the probability of random data match gets very low. If an OFDM sync preamble without random data is used (i.e., it actually is a training symbol in the strict sense), the subcarrier values in this symbol can be optimized to prevent the flattening.

Simulation Results with Imperfect Time Synchronization

Figure 19:
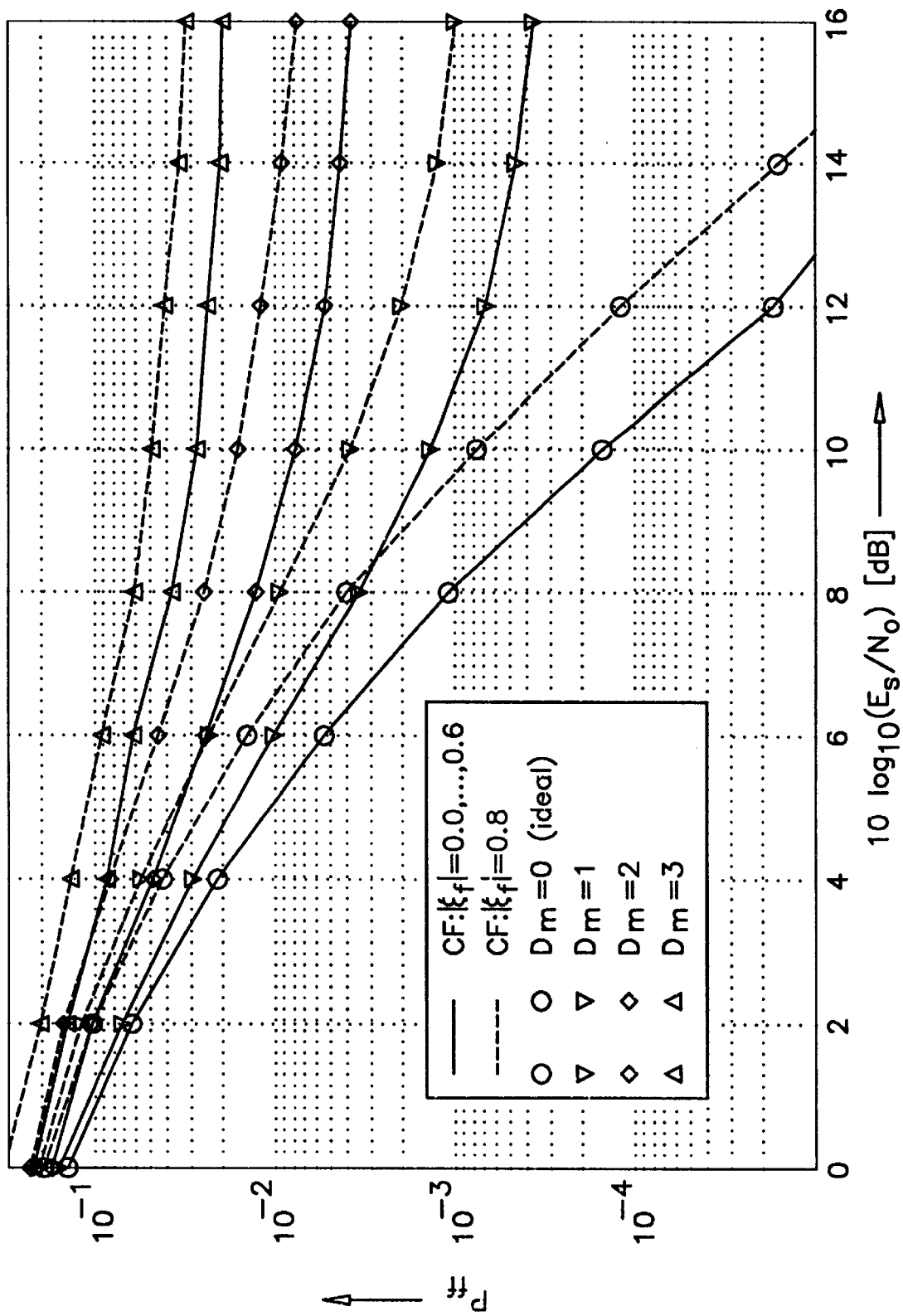
FIG. 19 is a graph depicting the frequency false-lock rate $P_{ff}$ of the CF scheme with $D_c=6$ and various misplacements $D_m$ in a multipath channel.

FIG. 19 is a graph depicting the frequency false-lock rate $P_{ff}$ of the CF scheme with $D_c=6$ and various misplacements $D_m$ in a severe multipath channel. Various normalized initial frequency offsets $|\xi_f| \in [0.0, 0.8]$ are used for simulation. The time sync error causes an error floor for $P_{ff}$.

Figure 20:
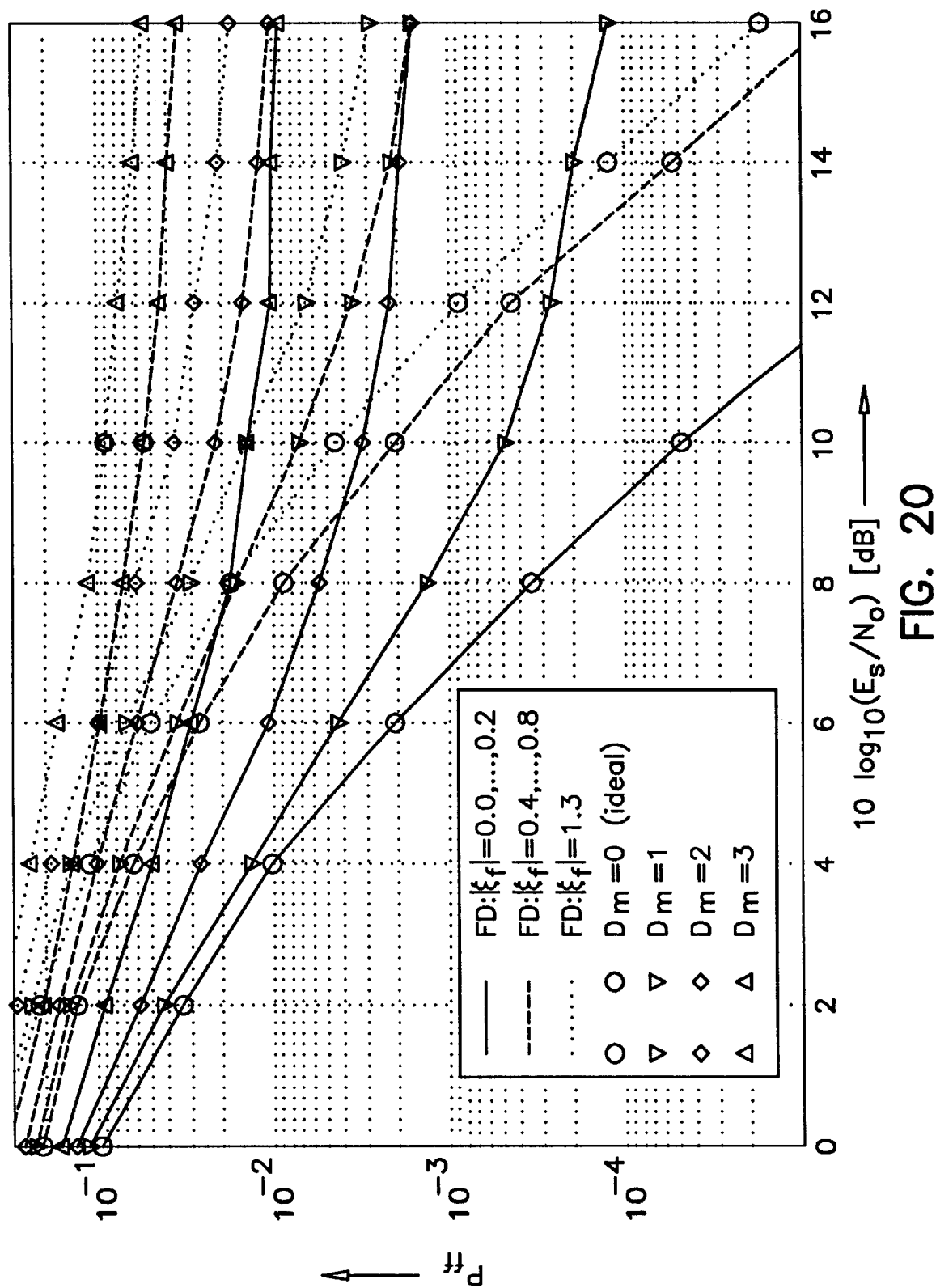
FIG. 20 is a graph depicting the performance of the FD approach for equal a priori probabilities of the frequency offset intervals.
Figure 21:
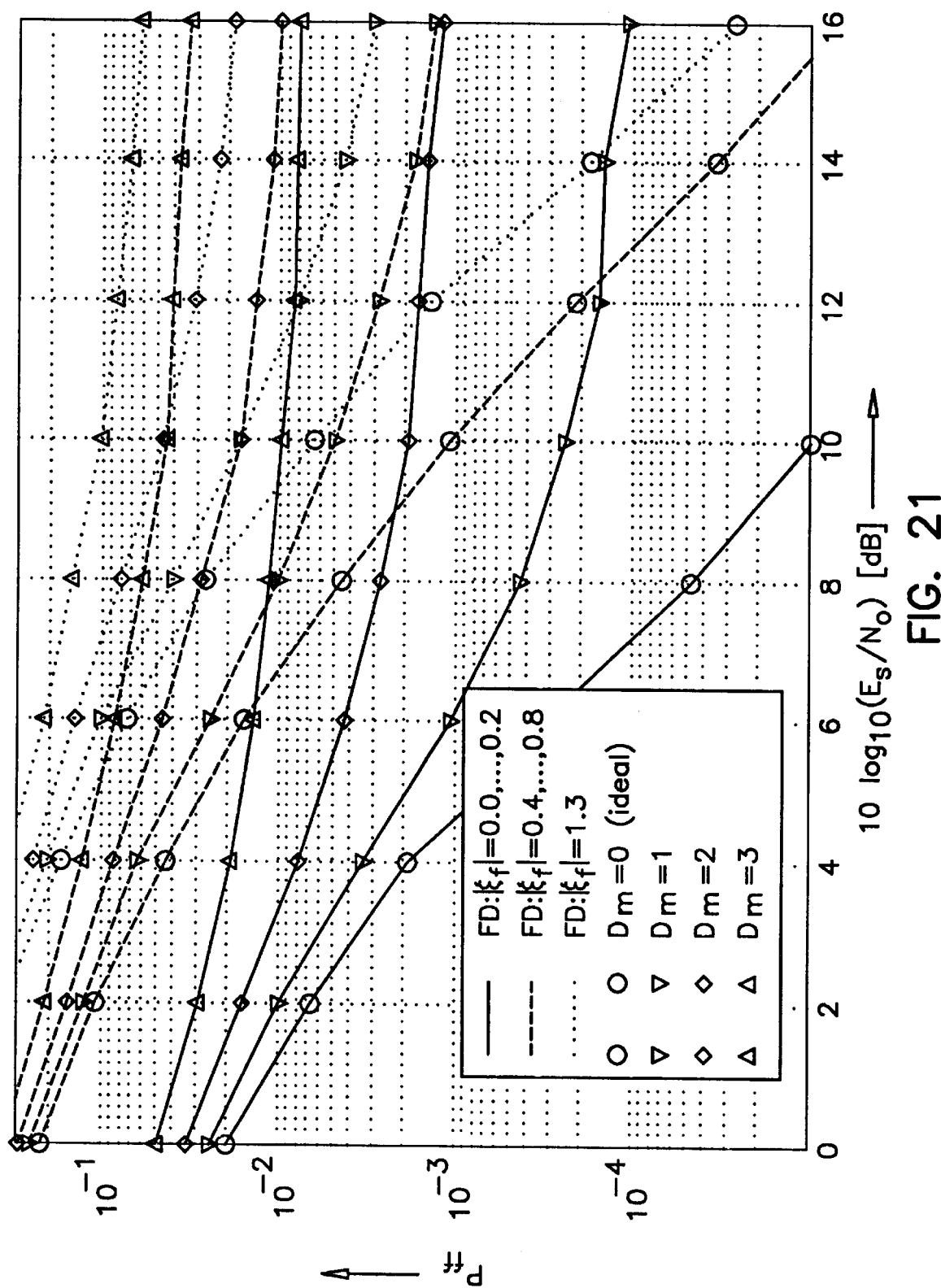
FIG. 21 is a graph depicting the performance characteristic with the same a priori parameters previously used.

The performance of the FD approach is given in the graph of FIG. 20 for equal a priori probabilities of the frequency offset intervals, while the graph depicted in FIG. 21 reflects the performance characteristic with the same a priori parameters previously used. It can be seen from a comparison of FIG. 20 with FIG. 19 that at low frequency offsets FD is less affected by frame synchronization errors than CF. Including FIG. 21 in the comparison, it can be seen that this robustness becomes increasingly large for unequal frequency offset intervals. It should be noted that the length of the prolonged guard interval of $D_c=6$ is quite low, when compared to the misplacements $D_m$. An increase in $D_c$ would lower the error floors.

Figure 22:
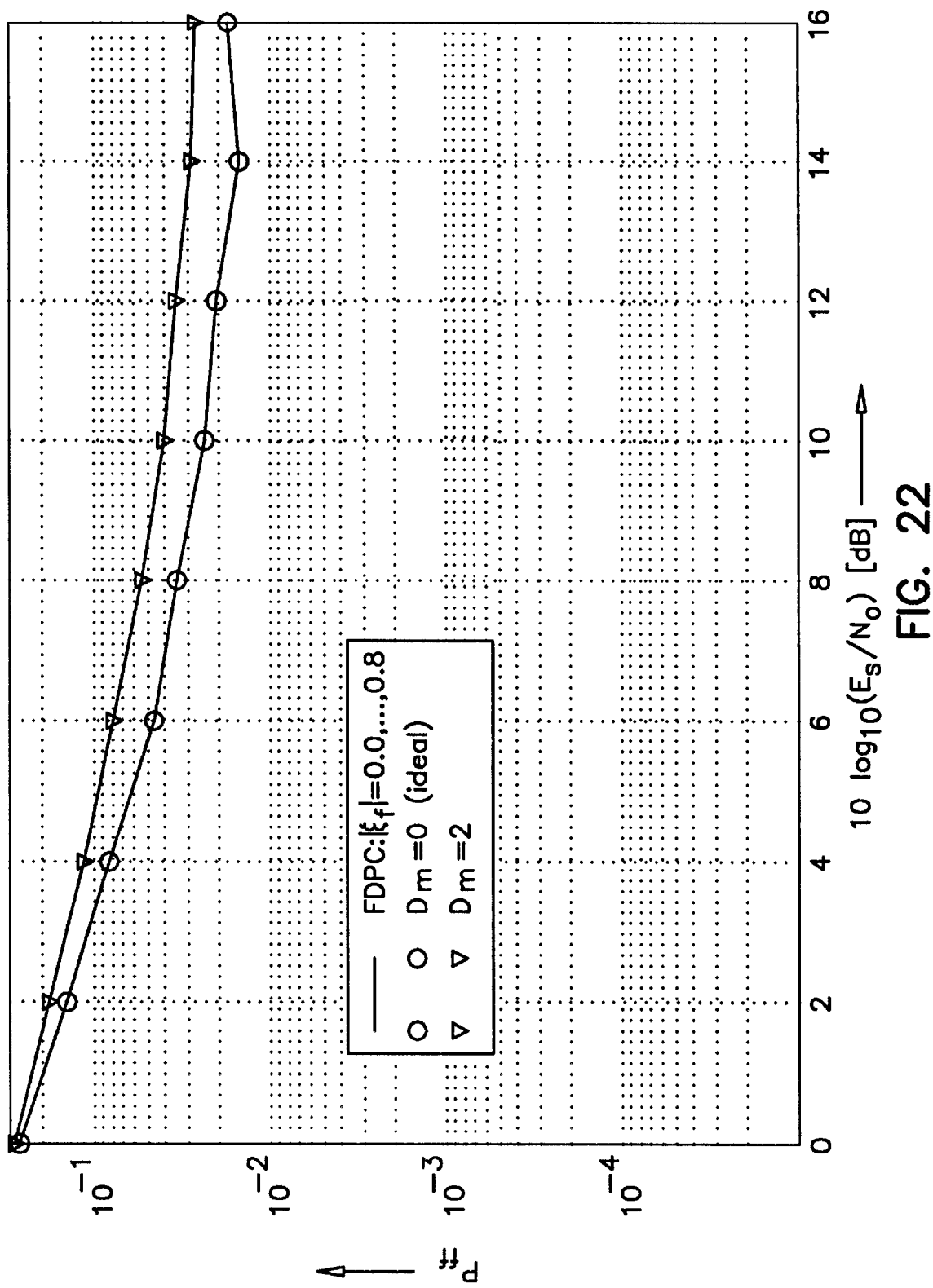
FIG. 22 is a graph depicting simulation results for a Fine/Discrete approach with Pilot Correlation (FDPC)
Figure 23:
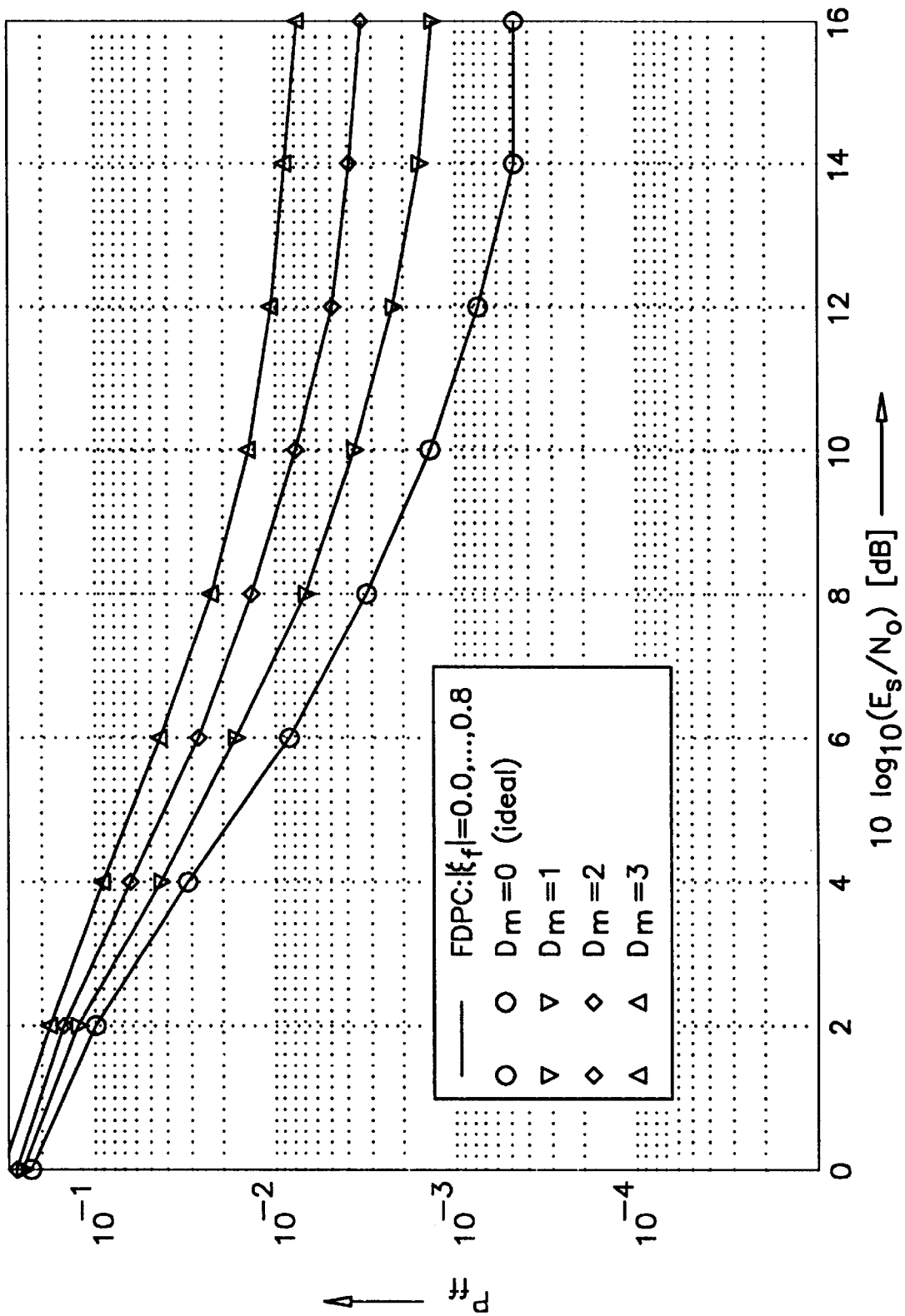
FIG. 23 is a graph further depicting simulation results for the FDPC technique in accordance with the invention.

Simulation results for the FDPC approach are now presented. From the graph depicted in FIG. 22, it can be seen that this approach produces unsatisfactory results in frequency-selective channels. Only $D_{cg}=10$ together with $D_{cig}=1$ were used in this simulation, which might be too few pilots for a reliable decision in a multipath channel. Considering the graph depicted in FIG. 23, we learn that the performance of FDPC in AWGN is not that bad for an approach that exploits pre-existing redundancy, that is, an approach that does not introduce $D_c$ additional training data samples (prolonged guard interval) as CF or FD requires. A further increase of $D_{cg}$ might yield better results in AWGN as well as in multipath channels.

Alternative Embodiment of First Stage

Figure 5B:
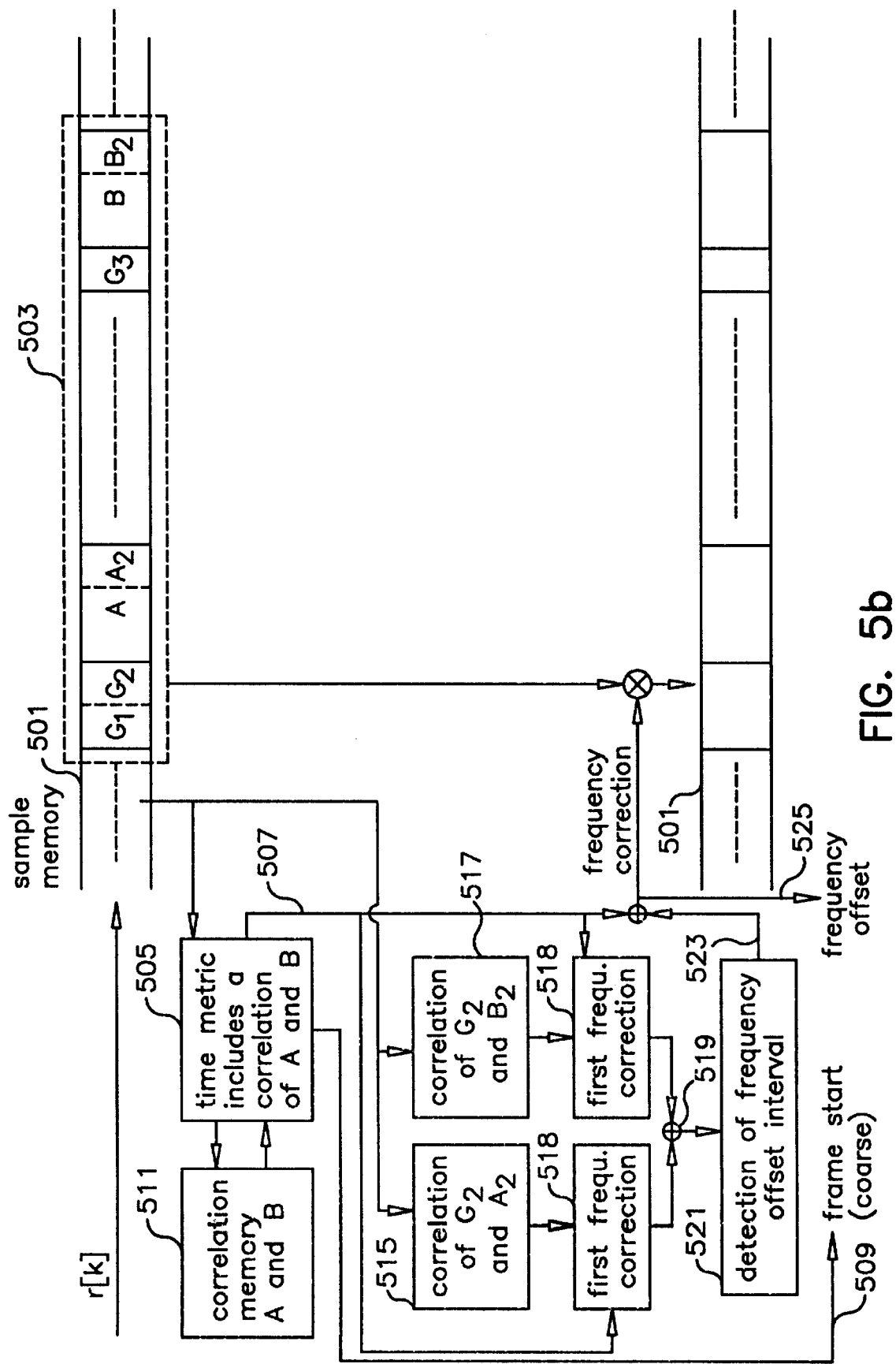
FIG. 5b is a diagram depicting hardware components and flow of signals and order of operations in an alternative exemplary embodiment of a first stage unit that performs coarse frame synchronization and fine frequency synchronization in accordance with one aspect of the invention.

An alternative embodiment of the first stage will now be described with respect to FIG. 5b. From a mathematical point of view, this embodiment accomplishes the same thing as the embodiment described above with respect to FIG. 5a. However, this alternative embodiment is less expensive because it requires fewer multiplications and less memory. In this embodiment, received (noisy) samples r[k] are supplied to a sample memory 501. It is known that the stored received samples r[k] will include a sandamble structure 503. In a first step of the first stage, the received samples r[k] are supplied to a first correlation unit 505 that generates a coarse frame start (time) estimate 509 as well as a first frequency correction 507. These are generated by determining similarity metrics from the received samples r[k], and using information obtained from the generated metrics to detect the sandamble 503. From the detected sandamble 503, both the first frequency correction 507 and the coarse frame start (time) estimate 509 may be determined. Alternative embodiments of the invention may be derived by using different types of similarity metrics, as explained above with respect to FIG. 5a.

In order to obtain a decision variable, $G_2$ is correlated with $A_2$ by a second correlation unit 515. In addition, a third correlation unit 517 correlates the $G_2$ region with the $B_2$ region. In order for the two correlation results to be combined, it is necessary to perform a frequency correction on each. In this embodiment, this is accomplished by respective first frequency correction units 518. Each of the first frequency correction units 518 receives a correlation result from a respective one of the second and third correlation units 515, 518, and corrects this as a function of the first frequency correction 507 generated earlier by the first correlation unit 505. The frequency correction units 518 operate by multiplying the received correlation value by a complex-valued phase rotating factor which is calculated from the first frequency correction 507. After each has been frequency corrected, the two correlation results (from the second and third correlation units 515, 517) are combined (e.g., by addition) by a combiner 519, although such combination is not essential to the invention. That is, in alternative embodiments, only one or the other of the two mentioned correlations need be performed. Returning now to the exemplary embodiment in which both correlation results are generated and combined, the combined correlation result is supplied to a frequency offset interval detection unit 521, which detects a second frequency offset 523. This frequency interval decision 523 is combined with the first frequency correction estimate 507 from the first correlation unit 505 to form an overall frequency offset estimate 525 (e.g., by multiplying the stored sample by a complex-valued rotation factor sequence that is a function of the estimated frequency offset value). The overall frequency offset estimate 525 may then be applied to frequency correct the received samples r[k]. Other aspects of the particular operations performed by this alternative embodiment are the same as those described above with reference to FIG. 5a.

SECOND STAGE: FINE FRAME SYNCHRONIZATION FOR OFDM

In this section a post-processing stage for frame synchronization is outlined that achieves a more accurate estimate in packetized spontaneous OFDM transmission. To estimate the time offset of the received modulation signal a ML timing offset estimation from the frequency-domain is chosen that applies a correlation technique on frequency-domain received subcarrier amplitudes. The algorithm starts operation upon a coarse timing estimate obtained from a time-domain metric. Other techniques might detect Null symbols, such as is described in Markku Kiviranta and Aarne Mämmelä, "Coarse Frame Synchronisation Structures in OFDM", *ACTS Mobile Telecommunications Summit*, pages 464–470, Granada Spain, 1996 (henceforth, "[KM96]"), or simply the maximum of a power detector.

The performance characteristic of this frequency-domain post processing unit is derived in the following for an application to the synchronization symbol with $D_{sync}$ carriers, but it should be kept in mind, that this post processing is applicable on each regular D-carrier symbol as well.

The Frequency-Domain Frame Synchronization Approach

We assume perfect frequency synchronization and find $$\tilde{Y}_{\mu,v} = A_{\mu,v}H[v]e^{+j\frac{2\pi}{D_{sync}}\xi_t v} \quad (61)$$

for the noiseless receive subcarrier amplitudes, $\tilde{y}_{\mu,v}$, in subcarrier v if the Normalized (sampling) Time Offset (NTO), $$\xi_t = \frac{\Delta t_{so}}{T},$$

is not too large. $A_{\mu,v}$ is the transmitted subcarrier value in subcarrier v, and H[v] is the channel influence. Hence a time offset has basically the effect of a linear phase term across the received subcarrier amplitudes. The benefit of exploiting the fundamental system theoretical property in Eq. (61) for time synchronization is mentioned in S. U. Zaman and K. W. Yates, "Multitone Synchronization for Fading Channels", *Proceedings of the International Conference on Communications (ICC'94*, pages 946–949, New Orleans, USA, 1994 (henceforth, "[ZY94]"). There, the authors try to apply linear regression methods to find axis crossings and slope of the linear increasing phase rotation across the subcarrier multiplex. From these quantities they derive estimates for the carrier phase and time offset. The solution now described in this disclosure works differently. We interpret (some of) the subcarrier transitions from subcarrier amplitude $A_{\mu,v}$ to $A_{\mu,v+1}$ to be differentially encoded in the frequency direction with the complex-valued information amplitude $I_{\mu,v}$ (differential pilot) so that $$A_{\mu,v+1} = A_{\mu,v} \cdot I_{\mu,v} \forall v \in I \quad (62)$$

with the subcarrier index set $$I = \{v = D_{cs}i + j | i=0, \ldots, D_{cg}-1; j=0, \ldots, D_{cig}-1\} \subset [0, D-2]. \quad (63)$$

Figure 24:
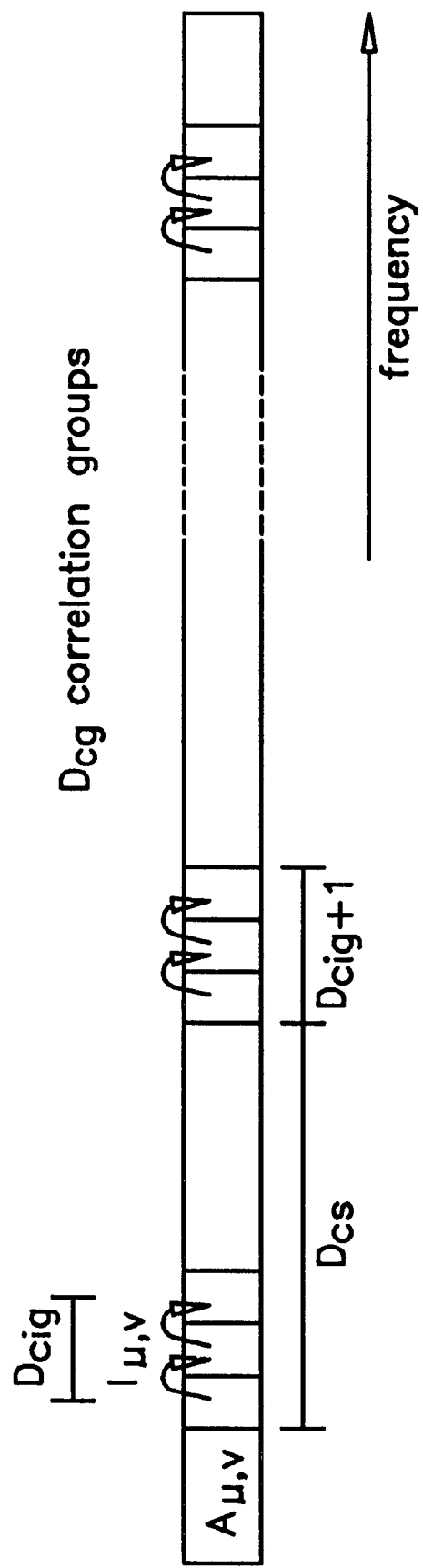
FIG. 24 depicts a principle arrangement of differential subcarrier pilots within a subcarrier multiplex, in accordance with one aspect of the invention.

This set expresses that $D_{cg}$ ("cg" means "correlation groups") blocks with $D_{cig}$ ("cig" means "correlations in group") directly adjacent differential information symbols $I_{\mu,\nu}$ (are interpreted to) perform a differential encoding across the subcarriers. The single correlation blocks are assumed to be spaced $D_{cs} > D_{cig}+1$ subcarriers apart. The principle arrangement of these differential subcarrier pilots within the subcarrier multiplex is depicted in FIG. 24.

Considering Eq. (61), it is apparent that the correlation of frequentially adjacent subcarrier amplitudes can provide some reasonable means for estimating the relative time offset $\xi_t$. For the noiseless received subcarrier amplitudes, the single correlation product equates to $$\tilde{Y}^*_{\mu,\nu} \tilde{Y}_{\mu,\nu+1} = A^*_{\mu,\nu} A_{\mu,\nu+1} H^*[\nu] H[\nu+1] e^{+j \frac{2\pi}{D_{sync}} \xi_t}, \quad (64)$$

(where $A^*_{\mu,\nu} A_{\mu,\nu+1} = |A_{\mu,\nu}|^2 I_{\mu,\nu}$) and we observe that the linear increasing phase is transformed to a constant phase offset. Especially in an AWGN channel, where the discrete channel transfer function is $H[\nu]=1$, $\forall \nu$, the mean value of this estimate is a perfect estimate of $\xi_t$.

The dependence on the argument of the differential information symbol $I_{\mu,\nu}$ must be canceled by multiplication with the complex conjugate of a (possibly perfect) estimate $\hat{I}_{\mu,\nu}$ of this complex-valued amplitude (modulation removal).

For modulation removal, at least two well-known techniques can be applied. These are: a Data Aided (DA) technique, and a Decision Directed (DD) technique.

In the DA technique, the receiver a priori knows the frequency-domain symbols (subcarrier amplitudes) dedicated for fine time synchronization purposes. Clearly, the known symbols represent additional redundancy if they are not used for further estimation procedures. They cannot be used for data transmission and therefore the number of these pilot symbols should not be excessively high. This approach is very robust and the only one that works if the number of carriers is too small. Apart from that, this approach offers the possibility to estimate frequency offsets larger than one subcarrier spacing, provided that the "fractional frequency offset" (i.e., the frequency offset component with magnitude smaller than half a subcarrier spacing) is corrected prior to this stage. For this purpose, the values of the received frequency-domain symbol sequence and some shifted versions of it are compared to the known symbols. The frequency shift with the best match is the estimate for the "integer frequency offset."

In the Decision Directed (DD) technique, the estimator operates on detected modulation symbols, i.e., on decisions from the demodulator to remove the modulation. The differential encoding with $I_{\mu,\nu}$ can be virtual in that it does not necessarily represent information. Hence, no redundancy is needed for this type of estimation and, thus, the number of symbols exploited in the estimation process can advantageously be as large as the number of used subcarriers in the OFDM system. This kind of estimator gives satisfying performance only for large OFDM symbols ($\geq 256$ carriers) and moderate signal constellations (e.g., QPSK). Theoretically, the estimation variance of DD is usually better than that of DA because more symbols are exploited in the estimation process and adjacent subcarrier transitions are used, which further decreases the estimation variance. But the estimate of DD suffers not only from Gaussian noise and interference, but also from the fact that wrong demodulator decisions produce feedback noise. Clearly, this approach is not as robust as DA because, depending on the cardinality of the modulation alphabet and the accuracy of the initial time offset, the demodulator symbol errors will be higher or lower due to the dominating interference noise.

With modulation removal, the argument of the frequency-domain correlation of the actually received noisy amplitudes is $$L \stackrel{def}{=} \sum_{\forall \nu \in I} Y^*_{\mu,\nu} Y_{\mu,\nu+1} \hat{I}^*_{\mu,\nu} \quad (65)$$

where $Y_{\mu,\nu}$ are frequency-domain samples (obtained from a Discrete Fourier Transform (DFT) of noisy signal samples), and $\hat{I}_{\mu,\nu}$ is a known or estimated discrete signal point (which is approximately equivalent to modulation removal). Assuming correct (error-free) modulation removal, and together with the restriction $|I_{\mu,\nu}|^2 = 1$, $\forall \nu$ and $\sigma_A^2 = \epsilon\{|A_{\mu,\nu}|^2\}$, and assuming that the correlation result L comprises a representative set of the available frequency bins so that the expected value of L can be calculated with $C_H[\nu_0]$, which is actually determined by averaging over all frequency bins, we yield for the expected value of the correlation $$\varepsilon\{L\} = D_{cg} \cdot D_{cig} \cdot \sigma_A^2 \cdot e^{+j \frac{2\pi}{D_{sync}} \xi_t} \cdot C_H[1], \quad (66)$$

with the frequential autocorrelation $C_H[\nu_0]$ being given by $$C_H[\nu_0] \stackrel{def}{=} \frac{1}{D} \sum_{\nu=0}^{D-1} H^*[\nu] H[(\nu + \nu_0) \bmod D] \quad (66.1)$$

where D is the number of carriers and $H[\nu]$ is the channel transfer factor at subcarrier $\nu$. Note that we have to substitute $D = D_{sync}$ there. Hence $$\hat{\xi}_t = \frac{D_{sync}}{2\pi} \arg(L) \stackrel{Eq.(66)}{=} \xi_t + \frac{D_{sync}}{2\pi} \arg(C_H[1]) \quad (67)$$

can be used to provide a reasonable estimate of the time offset. With the estimator in Eq. (67), a fictive relative time offset of $$\frac{D_{sync}}{2\pi} \arg(C_H[1])$$

is added owing to the center of power delay gravity. But clearly, this delay is constant for the specific static channel parameters effective during one burst.

It can be shown that the frame synchronization estimate found by this estimator is MMSE-optimum for differential demodulation in the frequency direction.

The number of samples in the cyclic prefix guard interval and the number of samples in the cyclic postfix guard interval may be optimally adapted to an expected channel power delay profile. This is basically a numerical optimization problem that strongly depends on the multipath (echo) characteristic of the physical transmission link (e.g., radio link). A good compromise is to use as many samples in the cyclic posfix guard interval as needed to represent the time associated with the center of power delay gravity of the channel.

A Lower Bound for the Frame Synchronization Variance

The following analysis aims to derive a lower bound for the time offset estimation variance. As already outlined, the time offset estimator performs $$\hat{\xi} = \frac{D_{sync}}{2\pi} \arg(L) = \frac{D_{sync}}{2\pi} \hat{\varphi}, \quad (68)$$

where $\varphi$ is the phase increment between two subcarriers. Here, we assume that the two sync symbol parts of length $D_{sync}$ are processed with a $2D_{sync}$-point DFT. For this reason, the variance of the signal set in the synchronization symbol deserves some attention due to the symbol repetition (time diversity). Applying the theorem of Parseval, we yield the equation $D_{u,sync} \cdot \sigma_A^2 = (2D_{sync}) \cdot \sigma_s^2$, owing to the fact that two time-domain signal parts of length $D_{sync}$ are exploited to gather the useful energy for $D_{u,sync}$ active ("used", hence the subscript "u") subcarriers. Therefore the following effective signal set variance (fictive) is true for the synchronization symbol:

$$\sigma_A^2 = \frac{2D_{sync}}{D_{u,sync}} \sigma_s^2 \quad (69)$$

For the noise components Parseval's theorem reads $2D_{sync} \cdot \sigma_N^2 = 2D_{sync} \cdot \sigma_n^2$, and thus we have the identity $\sigma_N^2 = \sigma_n^2$.

The variance $\sigma_{\xi_t}^2 = \epsilon\{(\hat{\xi}_t - \epsilon\{\hat{\xi}_t\})^2\}$ of the normalized time synchronization error can be lower bounded via $$\sigma_{\xi_t}^2 = \frac{D_{sync}^2}{4\pi^2} \frac{1}{D_{cg} \cdot D_{cig}^2 \cdot \frac{2D_{sync}}{D_{u,sync}} \sigma_s^2/\sigma_n^2} = \frac{1}{4\pi^2} \frac{D_{sync} \cdot D_{u,sync}}{2D_{cg} \cdot D_{cig}^2} \frac{1}{E_s/N_0} \quad (70)$$

but it is worth noting that this variance is a purely theoretical lower limit. We assumed a perfectly aligned demodulation window without any interference power from preceding or subsequent OFDM symbols. This is clearly not true for the cases of typical operation.

Instead of estimating the time offset from the frequency-domain of a repeated synchronization symbol, we can estimate the time offset from scattered pilots being multiplexed into any one regular OFDM symbol of dimension D with $D_u$ non-zero subcarriers. In this case, we have no "time diversity" and the final result for the lower bound reads $$\sigma_{\xi_t}^2 = \frac{1}{4\pi^2} \frac{D \cdot D_u}{D_{cg} \cdot D_{cig}^2} \frac{1}{E_s/N_0}. \quad (71)$$

For $D=2D_{sync}$ this variance is 8 times larger than the variance achieved with Eq. (4.62). In the case that $D=D_{sync}$ we still have a 2 times higher estimation variance which directly reflects the diversity factor.

Iterative Frequency-Domain OFDM Frame Synchronization

The task to be fulfilled by the frame or time synchronization unit is to reliably find the starting position of an OFDM symbol in a sequence of noisy received samples that have been corrupted by ISI and additive noise on the radio link. As used here, the word "reliable" means that the variance of the timing estimate should be minimum or that the estimate is within a tolerable limit of some reasonable estimation mean. Furthermore, the false-lock probability should be minimized. In contrast to single-carrier modulation, the requirements to be met by the frame synchronizer are not that stringent, as offsets up to a few samples can be tolerated in OFDM. This is not the case for single-carrier schemes, where frame synchronization is a hit-or-miss problem. Throughout this section and for the simulation results that follow, we assume the worst case situation in which the sync symbol is embedded in a stream of OFDM symbols and is therefore not surrounded by mere noise.

Motivation of the Iterative Approach

A very important statement is concerned with the interference terms due to the time offset in the initial (coarse) time offset estimate. This interference from preceding and succeeding OFDM symbols represents noise with the same power as the useful signal. It is acquired by the misalignment of the demodulation (DFT) window and clearly limits the estimation accuracy in the first run of the proposed time synchronization refinement procedure. Consequently, in accordance with another aspect of the invention, the estimation described above should be performed iteratively. The first run will usually provide an improved time offset estimate, so that a repeated realignment of the time window and a further run of the refinement procedure will yield increasingly improved time synchronization estimates with decreasing estimation variance. After a sufficient number of iterations and under the restriction of an initial estimate which ensures convergence of the iteration process, the variance of the time offset estimator approaches the theoretical lower limit in Eq. (70). Simulations for DA indicate that two or three runs are sufficient to approach the theoretical lower limit for moderate initial time offsets.

Implementation Example

For operation over a multipath (ISI) channel, the guard interval is advantageously split into prefix and postfix parts because the proposed estimator defined by Eq. (67) will add a time associated with the center of power delay gravity of the respective channel. More specifically, the estimated frame synchronization positions are rather shifted towards more positive time positions. Thus with the conventional OFDM systems, which have a guard interval only preceding the useful symbol part, the proposed estimator will systematically position the time window too far into the direction of positive time values, so that the demodulation window always includes interference attributable to a part of the guard interval of the following symbol.

In accordance with an aspect of the invention, this problem is addressed by providing an OFDM system in which a postfix is alternatively used alone, or together with a prefix. The format of the OFDM symbol in accordance with the modified scheme is illustrated in FIG. 24. As usual in OFDM, the D samples in the middle are obtained from the Inverse Discrete Fourier Transform (IDFT) of the subcarrier amplitudes. In accordance with an exemplary embodiment of the invention, a prefix $D_{g,pre}$ is generated by a repetition of an ending partial sample sequence $D_{end}$ from the entirety, D, of the originally obtained samples. Similarly, a postfix $D_{g,post}$ is generated by a repetition of a beginning partial sample sequence $D_{begin}$ from these D originally obtained samples.

Another advantage of this structure is that the iteration will converge faster because, when positioned at the correct time position, there are guard samples both to the left and to the right of the demodulation frame, whereas in the conventional prefix structure, no guard samples will be found to the right of the demodulation frame.

A block diagram of an exemplary embodiment of the stage 2 frame synchronization mechanism is shown in FIG.

26. This figure depicts not only the hardware components used in the exemplary embodiment, but also the flow of signals and order of operations, and as such also serves as a flowchart of the various steps performed in the embodiment. In order to depict this flow of operation, the same hardware component, such as the sample memory 501, may in some cases be depicted in several places in the figure. Notwithstanding this multiple depiction, only one of any such unit is required. The functions of the various units described in this and subsequent figures may be implemented in any of a number of ways. For example, programmable processing logic may perform the herein-described functions by executing program instructions that have been stored in a suitable computer-readable storage medium (e.g., Random Access Memory (RAM), magnetic storage medium, optical storage medium, and the like). Alternatively, hardwired logic may be designed and built to perform some or all of the various functions. Each of these alternatives, as well as their equivalents, are intended to be considered within the scope of the invention. It will further be understood that the segregation of the various functions into the illustrated blocks is for the purpose of facilitating a description of the invention. In practice, it is possible for some or all of the illustrated blocks to be combined into a single unit that performs all of the combined functions.

Figure 26:
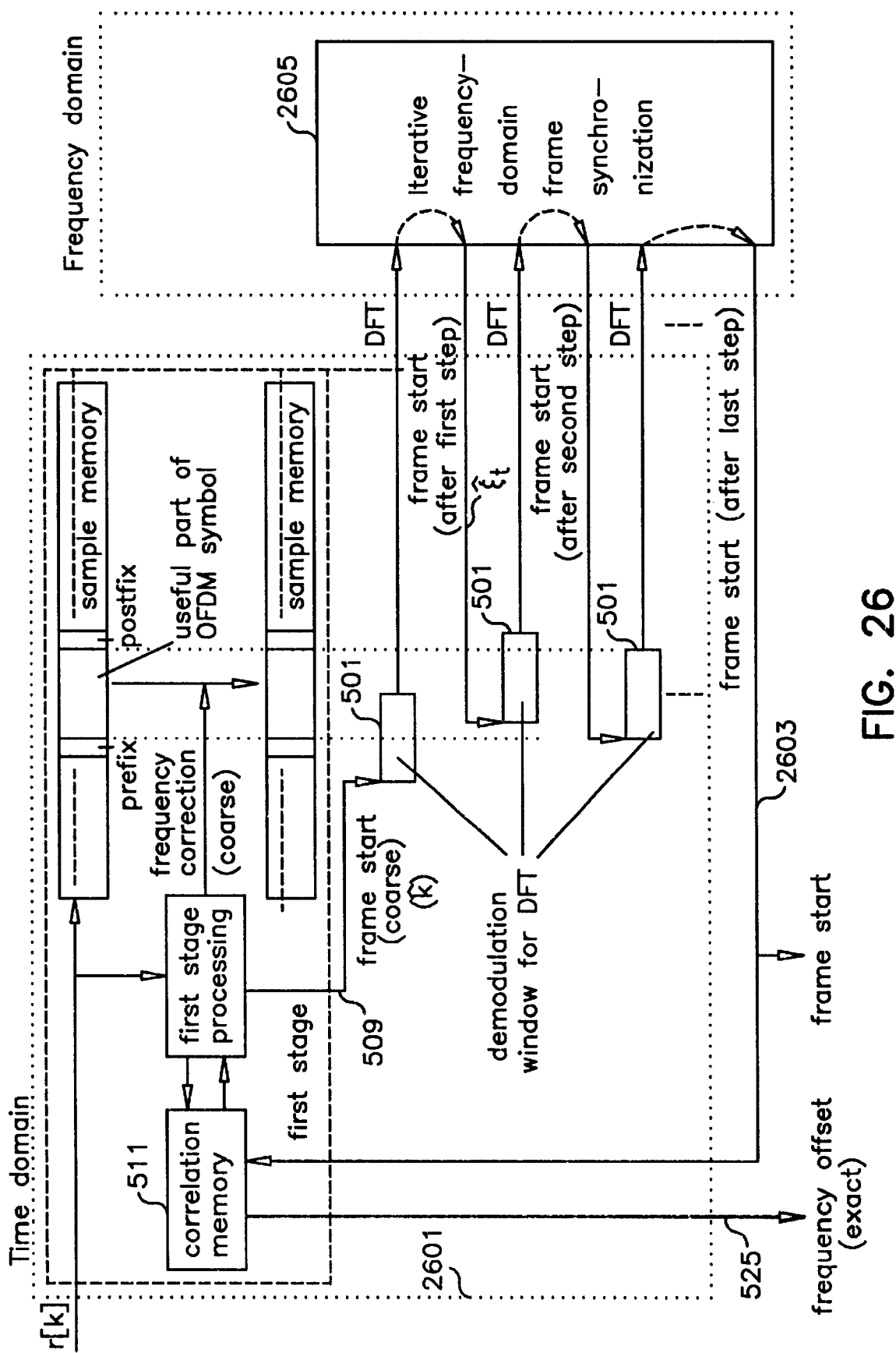
FIG. 26 is a diagram depicting hardware components and flow of signals and order of operations in an exemplary embodiment of a second stage unit that performs fine frame synchronization in accordance with another aspect of the invention.

In addition to depicting the hardware and structure and flow of operations associated with the stage 2 processing (i.e., the fine frame synchronization), FIG. 26 additionally shows how the iterative synchronization procedure of stage 2 may be combined with the overall frequency and frame synchronization framework established by the stage 1 processing, which is represented within the dashed lines in the figure. That which appears outside the dashed lines in FIG. 26 corresponds to stage 2 processing.

The coarse frame start estimate 509 (i.e., $\hat{k}$) from a time-domain technique 2601 (e.g., according to any of the metrics specified in Eqs. (20) through (28)) can be used to extract a frequency offset estimate, $\hat{\xi}_f$, by determining a correlation result, s[k], in accordance with Eq. (18), and then applying Eq. (22) to exploit the argument of the correlation result. The frequency offset estimate would be optimum if the correlation result were evaluated at the correct frame start. Due to time offsets, the variance of this frequency estimate will be higher than in the optimum case.

Upon these coarse estimates, the iterative frequency-domain frame synchronization unit 2605 starts to work, repeatedly determining a correlation result and generating therefrom a next time offset estimate $\hat{\xi}_t$ that is used to adjust the DFT's demodulation window in the sample memory 501 for use in a next iteration until convergence is reached, thereby yielding an optimum frame start estimate 2603. In a preferred embodiment, convergence is achieved within two iterations, but of course this could be different in other applications.

As illustrated in FIG. 26, this optimum frame start estimate 2603 can again be used to further improve the frequency offset estimate by evaluating the previously stored argument at the correct time position within the correlation result memory 511.

After convergence of the iterative refinement procedure, both the frame synchronization estimate 2603 and the frequency offset estimate 525 are reliably obtained with low variance.

Advantages of the Proposed OFDM Frame Synchronization Scheme

Advantages associated with the iteratively improved frame synchronization and the modified OFDM symbol structure in accordance with the invention include:

The frequency-domain refinement procedure offers a time synchronization with very low variance for spontaneous transmission over unknown frequency-selective channels, even though a systematic time synchronization "error" is introduced by the channel power delay characteristic.

The expected time synchronization position found with this technique automatically corrects the phase ramp across the subcarriers caused by the center of power delay gravity in the channel impulse response. This is a very reasonable frame synchronization estimate with OFDM, especially in conjunction with differential demodulation in the frequency direction.

The cyclic postfix prevents interference from the following symbol which would otherwise systematically occur due to the channel-delayed frame sync positions.

The division of the guard interval into a prefix and a postfix offers reduced sensitivity in terms of time synchronization errors in a small interval around the ideal position. More concisely, it helps the iterative process to converge more easily.

Simulation Results

Figure 25:
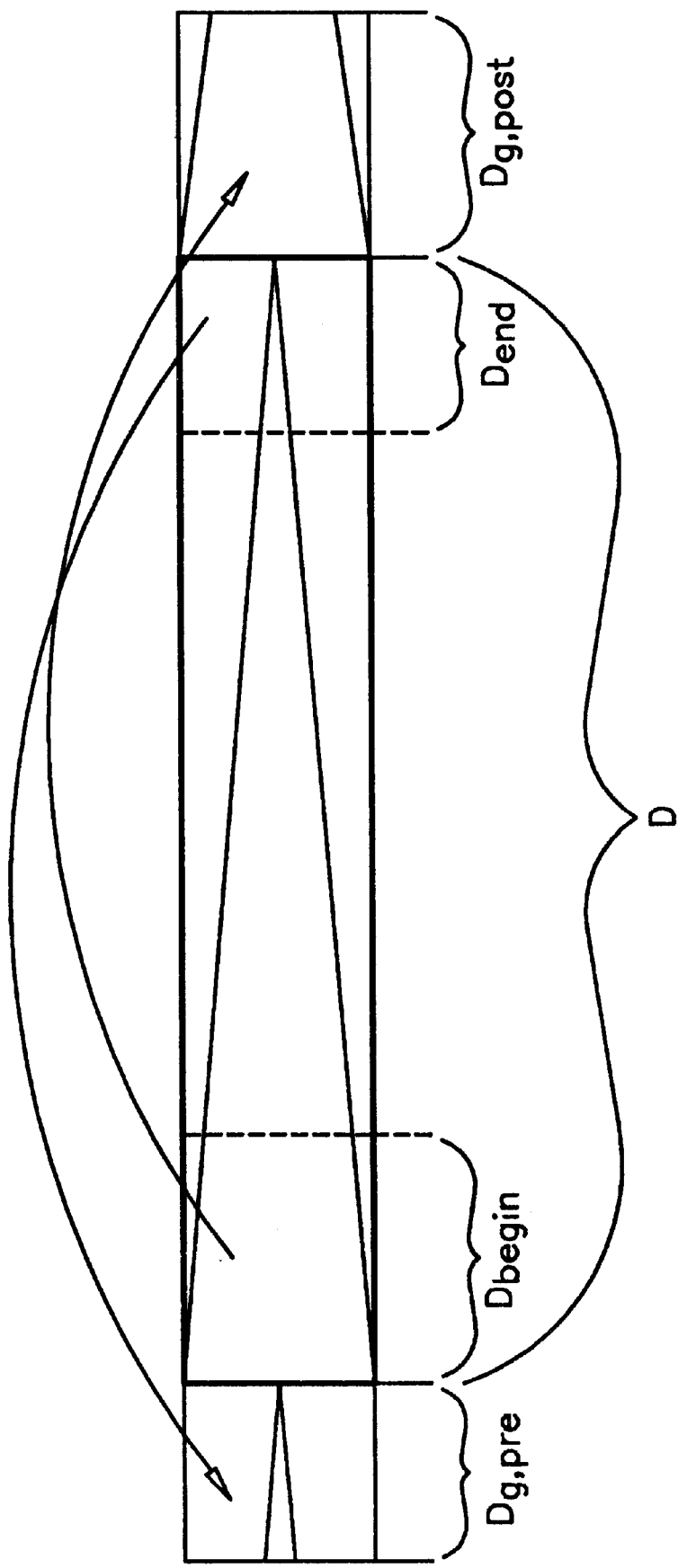
FIG. 25 depicts an OFDM symbol structure with a prefix and a postfix guard interval in accordance with an aspect of the invention.

The setup for the presented simulations realizes an OFDM symbol structure with a prefix and a postfix guard interval as illustrated in FIG. 25. Hence the guard interval of $D_g=8$ modulation intervals is split into equal parts of 4 samples representing a cyclic prefix and 4 samples realizing the cyclic postfix. Consequently, for transmission over AWGN we will have a misplacement $D_m=0$ for sampling offsets $|\xi_s|\le 4$. The OFDM burst is transmitted over the respective channel and the receiver starts the iterative procedure upon a fixed and deterministic misplacement $D_m$ which represents the parameter in the following diagrams.

In these simulations, the frequency-domain time offset estimation was limited to two processing steps, i.e., the iterative frequency domain frame synchronization unit 2605 in FIG. 26 was run only twice. Thus, two DFTs were required for frame sync and another one for final data demodulation. The achieved performance improvement is investigated in terms of the variance $\sigma_{\xi_t}^2$ of the timing estimate $\hat{\xi}_t$ and in terms of the time synchronization failure rate $p_{tf}(m)$ which is the probability that the estimated frame start position lies more than ±m samples away from the actual optimum frame start. For OFDM transmission, depending on the number of subcarriers D, it can be sufficient to choose an m≠0. In a system having 64 carriers, we choose m=1, so that there is an interval of 3 timing positions which are interpreted as valid (acceptable) symbol starts. Hence we allow, at most, one interfering sample in the demodulation window of length D=64 resulting in minimally 18.06 dB SNR due to frame misalignment.

Figure 27:
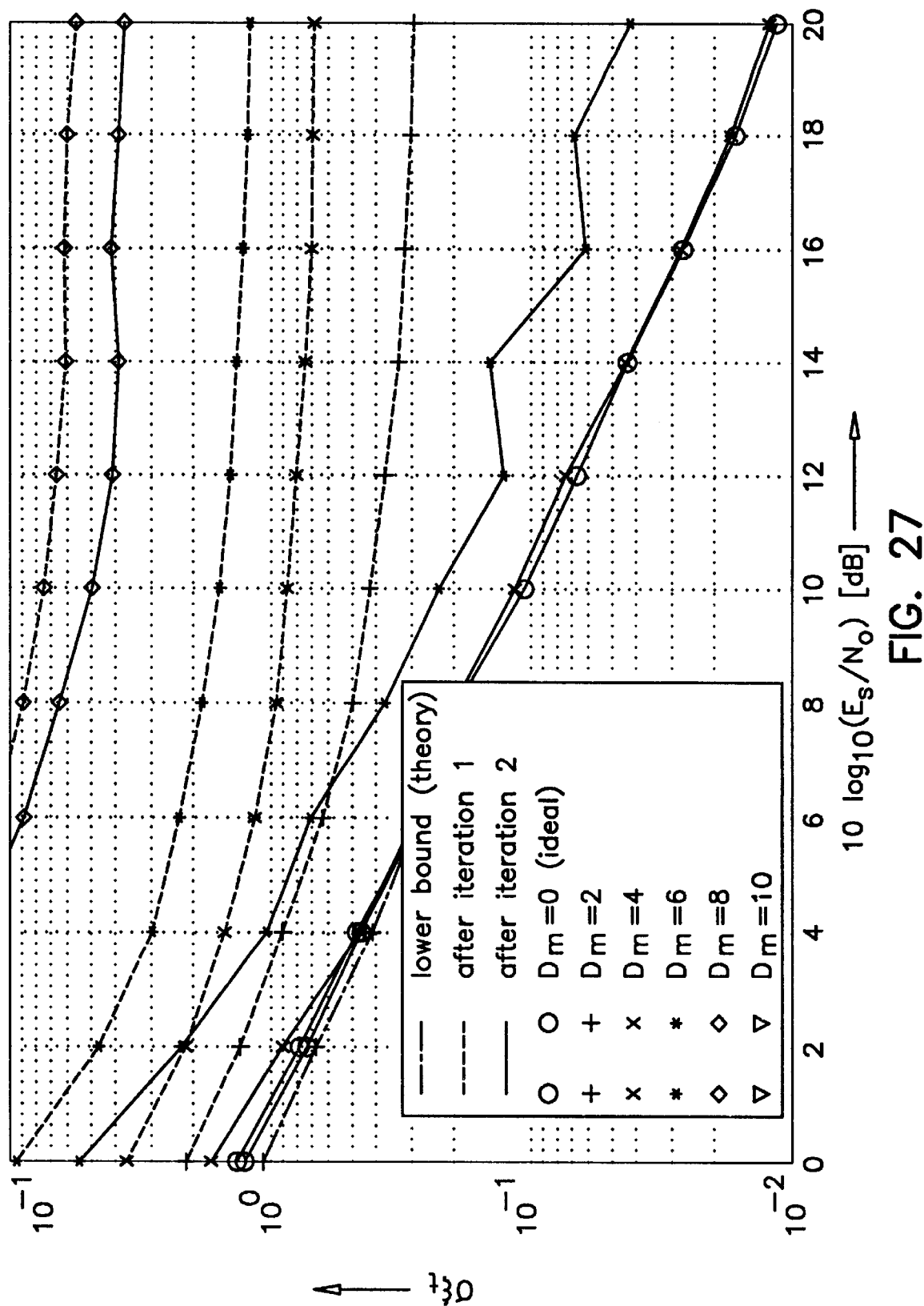
FIGS. 27 and 28 are each graphs showing the simulated standard deviation of $\hat{\xi}_t$ in the iterative frame synchronization in accordance with an aspect of the invention for transmission over AWGN in the presence of an initial misplacement $D_m$.
Figure 28:
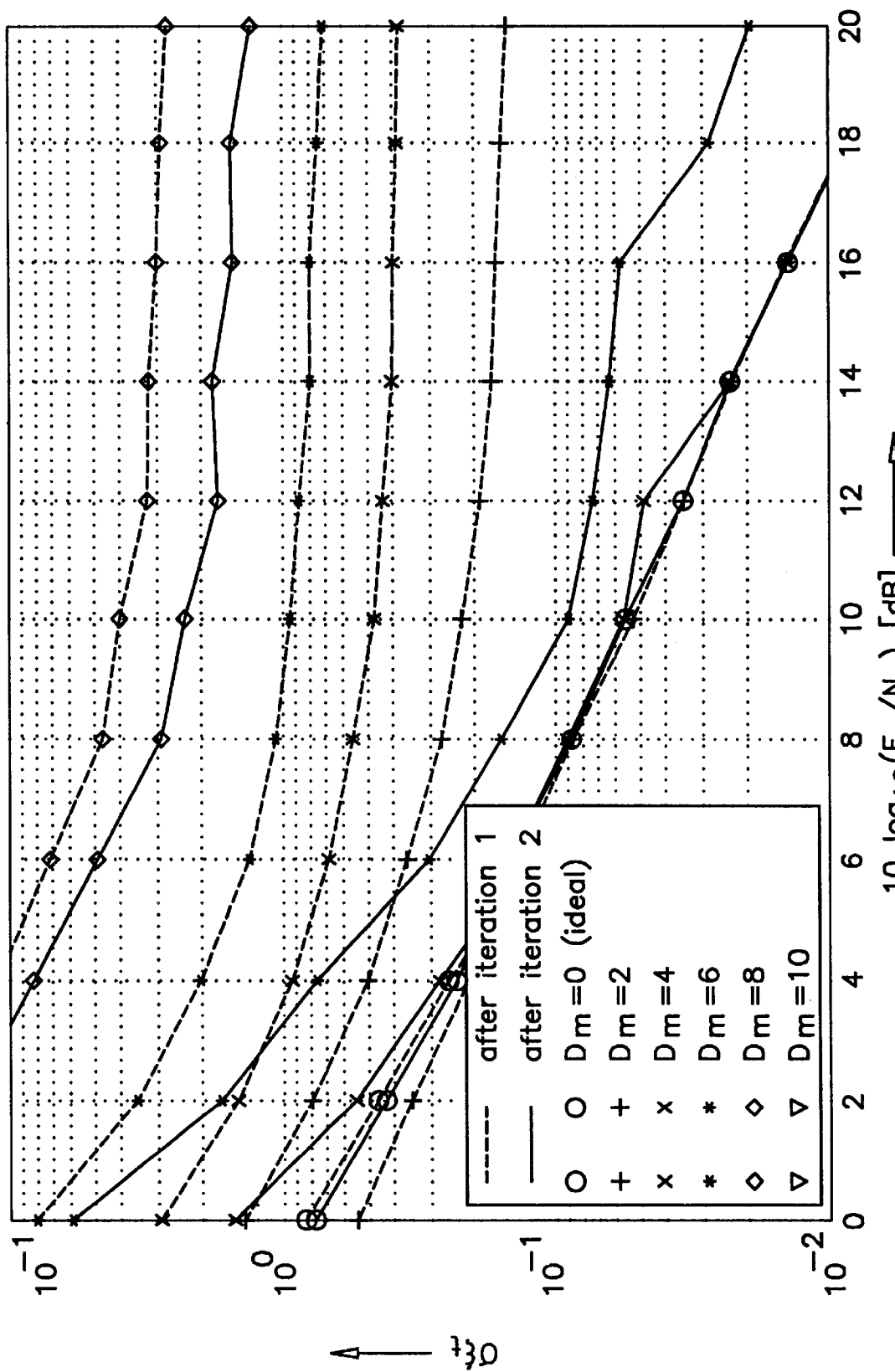

For the simulation of the estimation variance, the estimator parameters $D_{cg}$ and $D_{cig}$ present in the lower bound of Eq. (70) were varied. The variation was done in such a way so as to constantly maintain $D_{cg}-D_{cig}=10$, i.e., a constant training symbol overhead was maintained in order to enable a fair comparison. The simulated standard deviations for two parameter settings and transmission over an AWGN channel are depicted in FIGS. 27 and 28. More specifically, FIGS. 27 and 28 are each graphs showing the simulated standard deviation of $\hat{\xi}_t$ in the iterative frame synchronization for transmission over AWGN in the presence of an initial misplacement $D_m$. In each case, the lower bound is according to Eq. (70). In the graph of FIG. 27, the frequency-domain estimator worked with $D_{cg}=10$ and $D_{cig}=1$ in a system with $D=64$, $D_g=8$ and $D_{sync}=32$. In the graph of FIG. 28, the frequency-domain estimator worked with $D_{cg}=5$ and $D_{cig}=2$ in a system with $D=64$, $D_g=8$ and $D_{sync}=32$.

The first thing to notice is the constantly decreasing lower bound for the time offset estimate when the number of correlations in one group $D_{cig}$ is increased. This behavior can analytically be seen from Eq. (70) and it is due to the summation of adjacent frequency-domain correlation products in the overlapping estimators of the type $k_0=1$. It can be seen from the graphs of FIGS. 27 and 28 that up to a misplacement of $D_m=4$ (i.e., $|\xi_t|\leq 8$), the simulated estimation variance gets increasingly lower. This means that for moderate time offsets, the simulation results manage to follow the decreasing lower bound, even though it becomes visibly more problematic, i.e., for all $D_m$, the asymptotic behavior is not reached until higher SNRs.

The situation is quite different for larger initial time offsets. Generally there is an improvement for the step from FIG. 27 ($D_{cg}=10$ and $D_{cig}=1$) to FIG. 28 ($D_{cg}=5$ and $D_{cig}=2$). However, a further step to ($D_{cg}=2$ and $D_{cig}=5$) would result in a degradation for the (iterated) estimation performance for $D_m \geq 6$. In conclusion, the variant $D_{cg}=5$ and $D_{cig}=2$ embodies the most robust of the investigated parameter settings.

Figure 29:
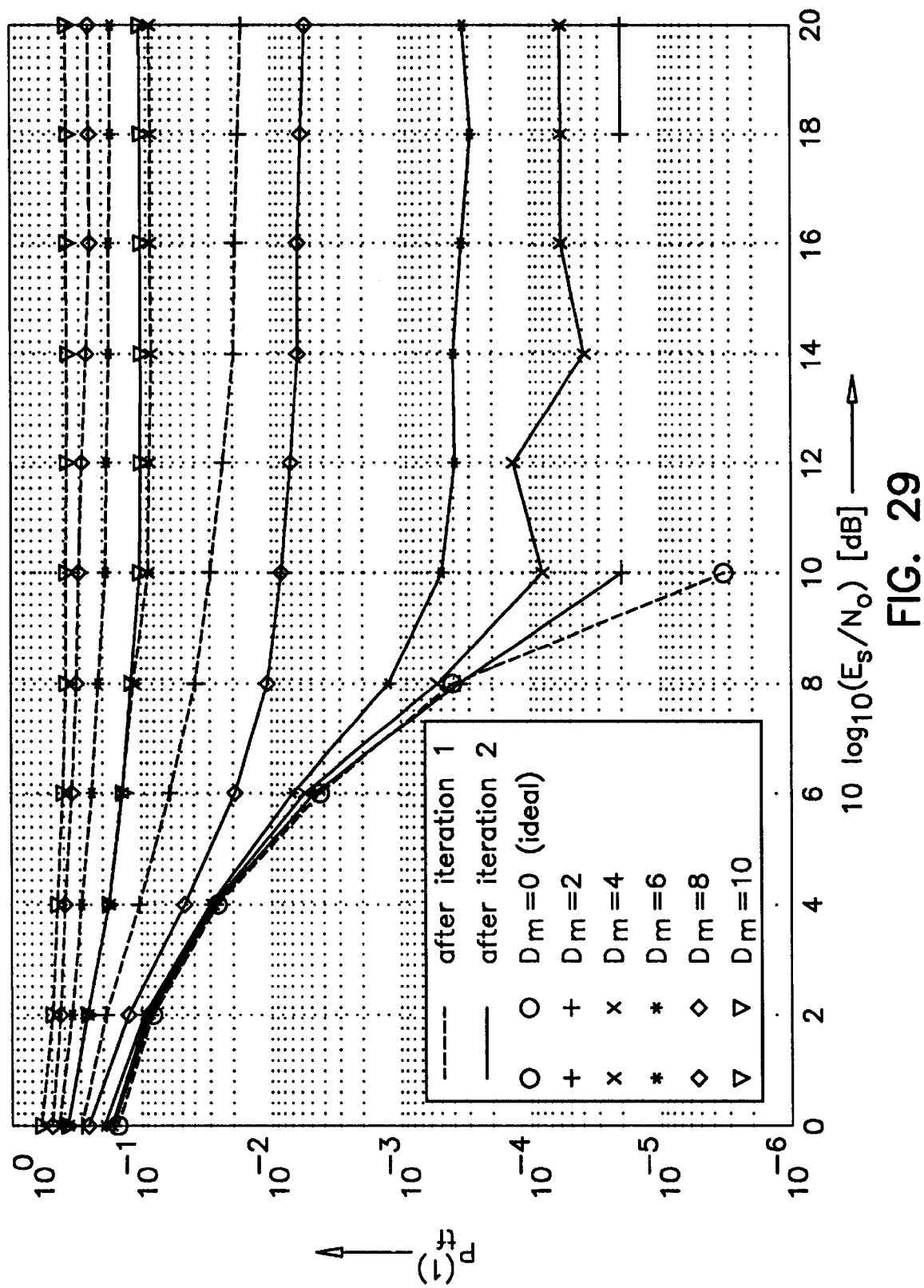
FIGS. 29 and 30 are graphs depicting the time synchronization failure rates for transmission over AWGN in the presence of an initial misplacement $D_m$.
Figure 30:
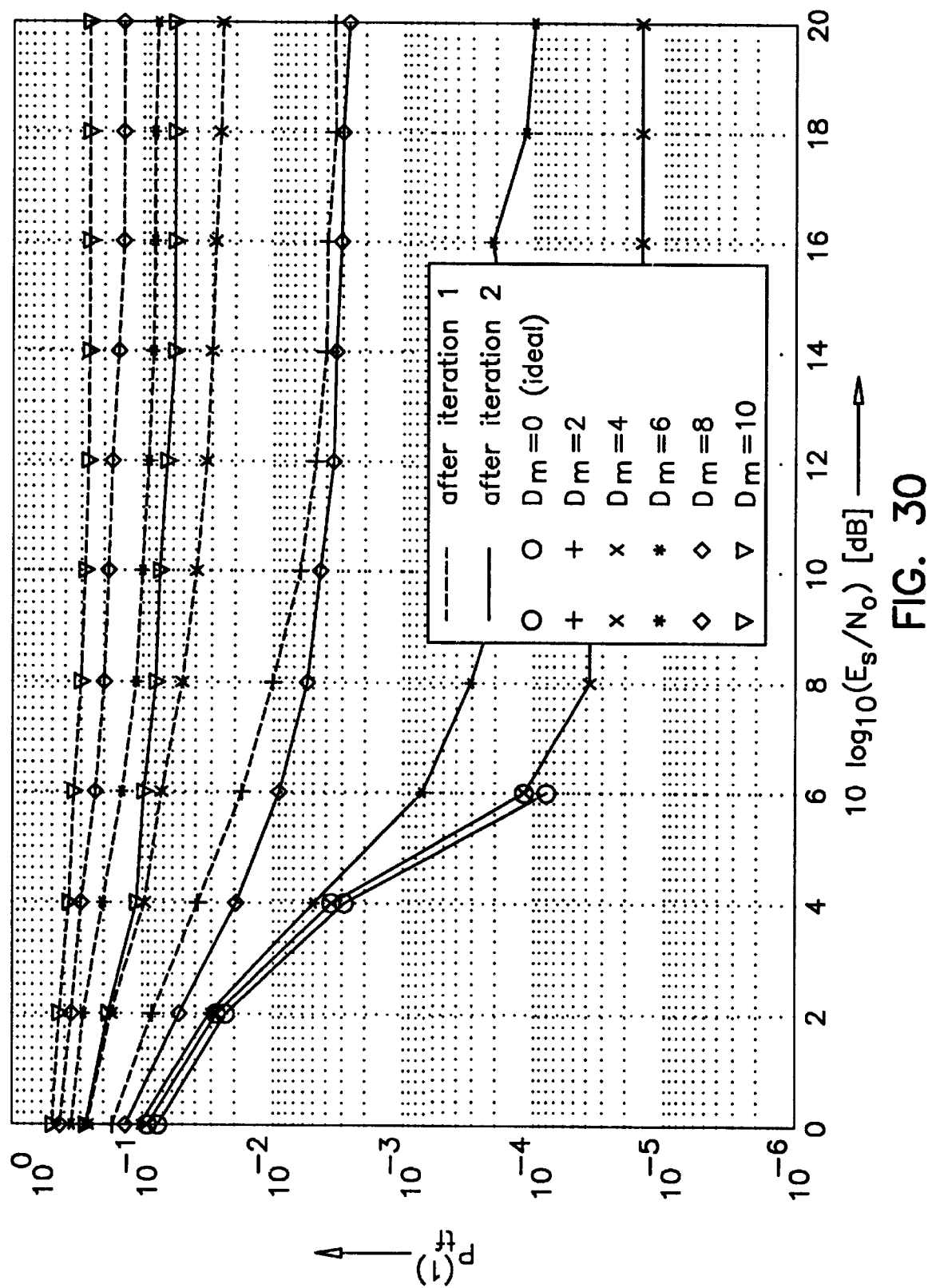

Turning now to the graphs of FIGS. 29 and 30, we consider the time synchronization failure rates for the previously investigated AWGN transmission scenario, that is, transmission over AWGN in the presence of an initial misplacement $D_m$. In the graph of FIG. 29, the frequency-domain estimator works with $D_{cg}=10$ and $D_{cig}=1$ in a system with $D=64$, $D_g=8$ and $D_{sync}=32$. In the graph of FIG. 30, the frequency-domain estimator works with $D_{cg}=5$ and $D_{cig}=2$ in a system with $D=64$, $D_g=8$ and $D_{sync}=32$. Here we observe the same estimator behavior as was noted above with respect to FIGS. 27 and 28: Moving from the estimator parameters in FIG. 29 to the ones in FIG. 30 results in an overall improvement of the performance. Gains of 2 dB and more are realized. The AWGN performance in the latter diagram reveals that two iterations of the iterative frequency-domain approach are able to transform an initial misplacement of $D_m=8$ (i.e., $|\xi_t|\leq 12$) into a successful time synchronization (i.e., $(\hat{\xi}_t-\xi_t)\in\{-1,0,+1\}$) in over 99% of cases for $10\log_{10}(E_s/N_0)\geq 6$ dB. Having in mind that this estimator operates with only $D_{sync}=32$, the results are quite impressive. Larger OFDM symbols will result in larger allowable initial offsets, i.e., a larger range of convergence and more iterations would result in lower error floors for $P_{tf}^{(m)}$.

Similar performance gains were also obtained for transmission over a multipath channel, where $D_{cg}=5$ and $D_{cig}=2$ was found to be a good choice. In frequency-selective channels, $D_{cg}$ must necessarily be quite large, as it determines the diversity factor achieved by the frequency-domain pilot symbols, and thus it directly affects the power efficiency of the iterative frame synchronization performance.

One can conclude from the simulation results for the iterative frequency-domain frame synchronization applied to the exemplary system that two iterated frequency-domain estimates are adequate for providing a robust frame synchronization refinement for initial coarse time estimates in a range of at least $|\xi_t|\leq 6$ for multipath and $|\xi_t|\leq 10$ for AWGN channels. For moderate offsets, the remaining error floor in the synchronization failure rate diagrams can be further reduced by an increased number of iterations. For very large offsets as starting points of the iteration, the error floor is caused by the first processing loop which eventually drives the frame entirely out of the region of convergence.

OVERALL SYNCHRONIZATION PERFORMANCE

It is desired to evaluate the Packet Error Rate (PER) over SNR in a severe multipath channel with operational synchronization in a $D=64$ carrier system. The synchronization has been chosen to work with a sandamble with $D_{sync}=32$. If not otherwise stated, the historic MMSE criterion according to Eq. (21) is used for coarse frame synchronization, even though the MNC metric of Eq. (28) was found to be more robust and preferable.

For frame synchronization refinement, only the first frequency-domain frame synchronization estimate is used, and the results are not iterated. Here, we use $D_{cg}=5$ correlation groups with $D_{cig}=2$ correlations in one group, i.e., 10 dedicated differential pilots are introduced into the frequency multiplex of the sandamble synchronization symbol.

For the simulations a constant NCFO of $\xi_f=0.3$ is used. This is beyond the estimation range of the pure sandamble correlation. Hence, a FD frequency detector with $D_c=10$ and 3 discrete intervals is used that operates with uniform a priori probabilities for all three detected frequency offset intervals.

Figure 31:
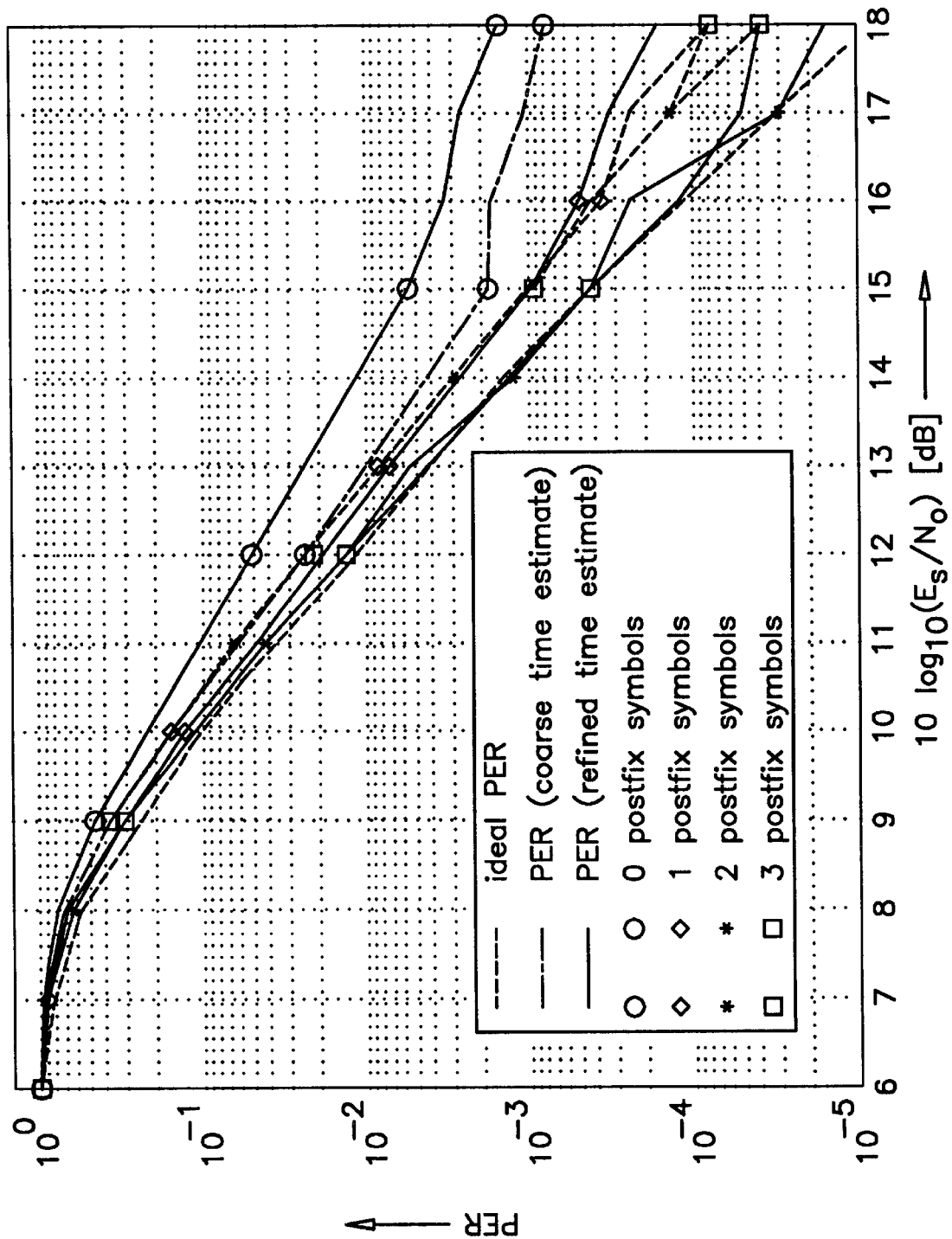
FIG. 31 is a graph depicting, for postfix symbols comprising various numbers of samples, the Packet Error Rate (PER) as a function of SNR for 8DPSK modulation in the time direction for ideal synchronization and operational burst synchronization before and after the frame synchronization refinement.

FIG. 31 is a graph depicting, for postfix symbols comprising various numbers of samples (i.e., 0, 1, 2 and 3 samples per postfix symbol), the PER as a function of SNR for convolutionally coded 8-Differential Phase Shift Keying (8DPSK) modulation in the time direction for ideal synchronization and operational burst synchronization before and after the frame synchronization refinement. The PER represents the performance after Soft Decision (SD) Viterbi-Decoding. The packet error rate indicates the rate of received packets with residual transmission errors. Each packet consists of 570 user bits. From this graph one concludes that performance improves when a postfix of reasonable length is used. That is, the use of no postfix as well as the use of too much postfix yields poor results. Using a postfix of 2 samples is found to be a good compromise in this severe multipath channel. The performance achieves the ideal PER within a fraction of 1 dB.

Figure 32:
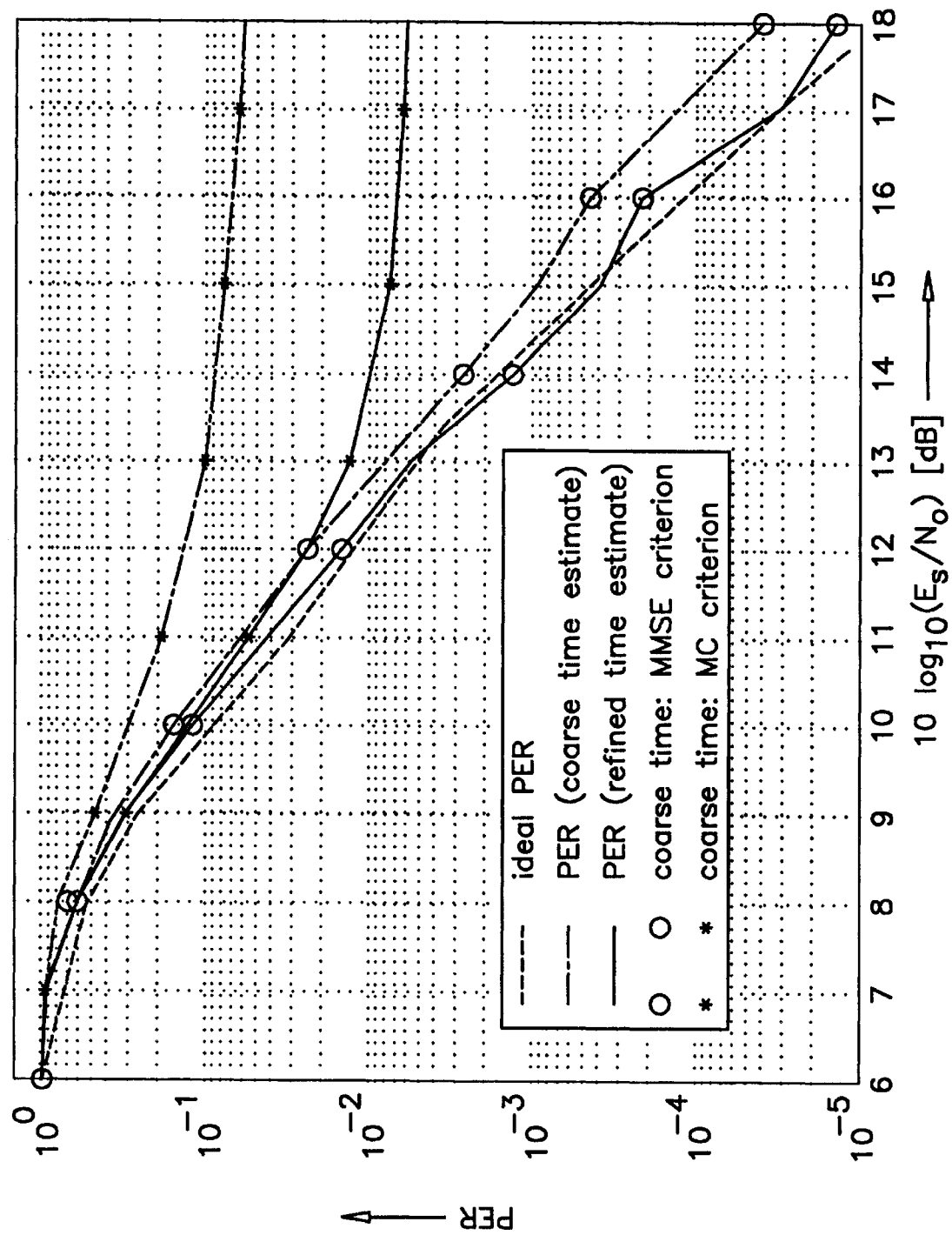
FIG. 32 is a graph of the PERs plotted as a function of SNR, where PERs are determined for the cases of ideal synchronization and operational burst synchronization before and after the frame synchronization refinement in accordance with the invention.

FIG. 32 provides an idea of the consequences of an unreliable coarse timing estimate. More specifically, FIG. 32 is a graph of the PERs plotted as a function of SNR, where PERs are determined for the cases of ideal synchronization and operational burst synchronization before and after the frame synchronization refinement. The presented results are for 8DPSK modulation in the time direction. However, similar results are obtained for the frequency direction as well. Here, the frequency-domain frame sync refinement shows large gains, but it cannot repair the major problems caused by the bad initial estimate. The bad initial estimate from the MC criterion ruins the overall performance; the PER after the frame sync refinement hits an error floor around $10^{-2}$.

FIG. 33 is a graph showing a comparison between differential modulation in the frequency direction and in the time direction. For each, PERs are plotted as a function of SNR for ideal synchronization and operational burst synchronization before and after the frame synchronization refinement. In this diagram there are three ideal PERs (graphs 3301, 3303 and 3305), with one of them (graph 3305) being for 8DPSK modulation in the time direction. The other two ideal curves (graphs 3301 and 3303) are for 8DPSK modulation in the frequency direction. The lower of these (graph 3303) is with an MMSE optimal demodulation of differential modulation schemes in the frequency direction. The higher of these (graph 3301) is for "ideal" demodulation window alignment with no channel phase correction.

Two important conclusions can be drawn from FIG. 33:

First, for DPSK in the frequency direction with small numbers of carriers (here D=64), a frequency domain frame sync refinement is called for because the performance with the coarse time estimate (indicated by graph 3307) is not satisfying. Furthermore, the performance with refinement (indicated by graph 3309) approaches that of the MMSE demodulation (graph 3303) within a fraction of one dB. This confirms the derivation presented earlier.

Also, for DPSK in the time direction, the performance with the coarse time estimate (indicated by graph 3311) is already satisfying. As indicated by graph 3313, a performance gain of 1 dB at PER=$10^{-3}$ is possible with the frequency-domain frame sync refinement.

SUMMARY OF FEATURES

A number of aspects of the invention will be apparent to those having ordinary skill in the art. These include: In the context of frequency synchronization:

The sandamble structure itself. This includes the temporal division of the periodically repeated signal parts in two (or more) regions, eventually separated by data.

The use of an extended guard region within a sandamble to make it possible to resolve frequency ambiguities by the FD approach.

The FD approach for frequency offset estimation. This implies the first (fine) estimation due to the correlation between A and B and the correction of this estimated offset by techniques such as those illustrated in FIGS. 5a and 5b.

A subsequent correlation between $G_2$ and $A_2$ and/or $G_2$ and $B_2$ (and in at least one embodiment, correction of these correlation results) and the advantageous combination (e.g., addition) of these two (possibly corrected) results. Detection (decision) of the residual frequency offset interval based on the final correlation result (e.g., combined correlation result).

The use of a priori knowledge (probabilities) of the possible frequency offsets in the detection step of FD to optimize the overall frequency synchronization performance.

In the context of frame (time) synchronization:

The guard interval, which usually consists of only a cyclic prefix, is supplemented with a cyclic postfix.

The cyclic prefix can be shortened, and this spare time added to the end of the useful OFDM symbol part for use as the cyclic postfix.

In the system design, the distribution of the total number of guard samples in the pre- and postfix can be optimally adapted to the expected channel power delay profile.

The frame synchronization refinement can start upon a coarse estimate. The only requirement is that it must be reliable enough to ensure convergence of the frequency-domain based estimator.

The estimate for frame synchronization may be obtained from a frequency-domain processing stage, which operates iteratively. Each iteration step includes 1) frame alignment according to the most recent estimate, 2) either a complete DFT or a recursive sliding DFT of this frame, 3) time offset estimation from the frequency-domain amplitudes. If the algorithm converges, the variance of this estimate will get increasingly smaller.

Of course, only one single step of the proposed frequency-domain refinement need be implemented (and therefore executed), so that in this case the procedure is non-iterative. In other words, one is free to perform any number of refinements (including only one refinement), as appropriate.

The iterative processing stage need not operate on a special preamble symbol. In a decision-directed approach it can be applied to every OFDM symbol in the burst. The pilot symbols in a data-aided approach can be multiplexed into any OFDM symbol in the burst. When the frequency offset is already corrected and a reliable coarse timing estimate can be derived from periodic protocol structures in the radio link, the second stage can be used in a stand-alone mode without the sandamble. In this case we arrive at a very efficient "preambleless" frame synchronization scheme.

In a combination of stages 1 and 2, the symbols in a data-aided approach can either be multiplexed into any OFDM symbol in the burst or into the sandamble symbol. Depending on the specific system parameters one of these approaches may be advantageous than the other.

The last frame synchronization estimate (or even that after each iteration) can be used to steadily improve the frequency offset correction. After the described synchronization procedure performed upon the burst preamble or the first symbol, the remaining OFDM burst can be demodulated with nearly optimum (minimum variance) frequency and time offset estimates.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of transmitting a sequence of data samples, comprising the steps of:

initially transmitting a first preamble comprising a sequence of preamble samples;

transmitting the sequence of data samples; and subsequently transmitting a second preamble comprising the sequence of preamble samples, wherein the first preamble comprises a first guard region and a symbol sequence, the first guard region comprises a first subset of the symbol sequence, the second preamble comprises a second guard region and the symbol sequence; and the second guard region comprises a second subset of the symbol sequence and whereby the sequence of data samples is transmitted after the step of initially transmitting the first preamble, and before the step of subsequently transmitting the second preamble.

2. The method of claim 1, wherein the first subset of the symbol sequence is a larger subset of the symbol sequence than the second subset of the symbol sequence.

3. The method of claim 1, wherein the second subset of the symbol sequence is a larger subset of the symbol sequence than the first subset of the symbol sequence.

4. A method of receiving a sequence of desired data samples, comprising the steps of:

receiving a signal sequence that includes a first preamble followed by the sequence of desired data samples followed by a second preamble, wherein the first preamble comprises a symbol sequence, and the second preamble comprises the symbol sequence;

hypothesizing a plurality of locations of the first preamble in the received plurality of data samples;

for each of the hypothesized locations, determining a hypothesized first preamble and a corresponding hypothesized second preamble;

for each of the hypothesized locations, determining a correlation between the hypothesized first preamble and the corresponding hypothesized second preamble; and using the correlations to determine locations of a most likely hypothesized first preamble and of a most likely second preamble.

5. The method of claim 4, further comprising the step of using the locations of the most likely hypothesized first and second preambles to estimate a fist frequency offset of the received signal sequence.

6. The method of claim 5, wherein:

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
  using the first frequency offset to make a first frequency correction of the received signal sequence;
  determining a frequency corrected first guard region in the first frequency corrected received signal sequence;
  determining a frequency corrected first preamble in the first frequency corrected received signal sequence;
  correlating the second subset of the symbol sequence from the frequency corrected first guard region with the second subset of the symbol sequence from the frequency corrected first preamble, thereby generating a correlation result; and
  using the correlation result to detect a second frequency offset.

7. The method of claim 6, wherein the step of using the correlation result to detect the second frequency offset comprises the step of using a priori knowledge of probabilities of possible frequency offset intervals to detect the second frequency offset.

8. The method of claim 5, wherein;

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
  correlating the second subset of the symbol sequence from the first guard region with the second subset of the symbol sequence from the first preamble, thereby generating a correlation result;
  using the first frequency offset to correct the correlation result; and
  using the corrected correlation result to estimate a second frequency offset.

9. The method of claim 5, wherein:

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
  using the first frequency offset to make a first frequency correction of the received signal sequence;
  determining a frequency corrected first guard region in the first frequency corrected received signal sequence;
  determining a frequency corrected second preamble in the first frequency corrected received signal sequence;
  correlating the second subset of the symbol sequence from the frequency corrected first guard region with the second subset of the symbol sequence from the frequency corrected second preamble, thereby generating a correlation result; and
  using the correlation result to detect a second frequency offset.

10. The method of claim 9, wherein the step of using the correlation result to detect the second frequency offset comprises the step of using a period knowledge of probabilities of possible frequency offset intervals to detect the second frequency offset.

11. The method of claim 5, wherein:

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
  correlating the second subset of the symbol sequence from the first guard region with the second subset of the symbol sequence from the second preamble, thereby generating a correlation result;
  using the first frequency offset to correct the correlation result; and
  using the corrected correlation result to estimate a second frequency offset.

12. The method of claim 5, wherein:

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
  using the first frequency offset to make a first frequency correction of the received signal sequence;
  determining a frequency corrected first guard region in the first frequency corrected received signal sequence;
  determining a frequency corrected first preamble in the first frequency corrected received signal sequence;
  determining a corrected second preamble in the first frequency corrected received signal sequence;
  correlating the second subset of the symbol sequence from the frequency corrected first guard region with the second subset of the symbol sequence from the frequency corrected first preamble, thereby generating a first correlation result;

correlating the second subset of the symbol sequence from the frequency corrected first guard region with the second subset of the symbol sequence from the frequency corrected second preamble, thereby generating a second correlation result;

combining the first and second correlation results, thereby generating a combined correlation result; and using the combined correlation result to detect a second frequency offset.

13. The method of claim 12, wherein the step of using the combined correlation result to detect the second frequency offset comprises the step of using a priori knowledge of probabilities of possible frequency offset intervals to detect the second frequency offset.

14. The method of claim 5, wherein:

the first preamble comprises a first guard region and a symbol sequence;

the first guard region comprises a first subset of the symbol sequence and a second subset of the symbol sequence;

the second preamble comprises a second guard region and the symbol sequence; and the method further comprises the steps of:
correlating the second subset of the symbol sequence from the first guard region with the second subset of the symbol sequence from the first preamble, thereby generating a first correlation result;

correlating the second subset of the symbol sequence from the first guard region with the second subset of the symbol sequence from the second preamble, thereby generating a second correlation result;

using the first frequency offset to correct the first correlation result;

using the first frequency offset to correct the second correlation result;

combining the first and second corrected correlation results, thereby generating a combined corrected correlation result; and using the combined corrected correlation result to estimate a second frequency offset.

15. The method of claim 4, wherein:

the received signal sequence includes the first preamble, followed by a cyclic prefix guard interval, followed by the sequence of desired data samples, followed by a cyclic postfix guard interval, followed by a second preamble, and the method further comprises the steps of:
using the location of the most likely hypothesized first preamble to determine a coarse estimate of a starting position of the sequence of desired samples in the received signal sequence; and generating an improved estimate of the starting position of the sequence of desired samples in the received signal sequence by:
using a time domain to frequency domain transformation technique and the coarse estimate of the starting position of the sequence of desired samples in the received signal sequence to generate frequency-domain received samples;

determining a frequency-domain correlation between the frequency-domain received samples and noiseless samples; and generating the improved estimate of the starting position of the sequence of desired samples in the received signal sequence based on an argument of the frequency-domain correlation between the frequency-domain received samples and the noiseless samples.

16. The method of claim 15, wherein:

the cyclic prefix guard interval comprises an ending subset of the sequence of desired data samples; and the cyclic postfix guard interval comprises a beginning subset of the sequence of desired data samples.

17. The method of claim 15, wherein the number of samples in the cyclic prefix guard interval and the number of samples in the cyclic postfix guard interval are optimally adapted to an expected channel power delay profile.

18. The method of claim 15, further comprising the steps of:

generating a further improved estimate of the starting position of the sequence of desired samples in the received signal sequence by:
using the improved estimate of the starting position of the sequence of desired samples in the received signal sequence to generate improved frequency-domain received samples;

determining a second frequency-domain correlation between the improved frequency-domain received samples and the noiseless samples; and generating the further improved estimate of the starting position of the sequence of desired samples in the received signal sequence based on an argument of the second frequency-domain correlation between the frequency-domain received samples and the noiseless samples.

19. The method of claim 15, further comprising the step of generating the noiseless samples by demodulating symbols contained in the received signal sequence.

20. The method of claim 19, further comprising the step of generating the noiseless samples by demodulating symbols contained in the sequence of desired samples.

21. The method of claim 15, further comprising the step of generating the noiseless samples from pilot symbols that have been multiplexed into the sequence of received samples.

22. A method of receiving a sequence of desired data samples, comprising the steps of:

receiving a signal sequence that includes a cyclic prefix guard interval followed by the sequence of desired data samples, followed by a cyclic postfix guard interval;

determining a coarse estimate of a starting position of the sequence of desired samples in the received signal sequence; and generating an improved estimate of the starting position of the sequence of desired samples in the received signal sequence by:
using the coarse estimate of the starting position of the sequence of desired samples in the received signal sequence to generate frequency-domain received samples;

determining a frequency-domain correlation between the frequency-domain received samples and noiseless samples; and generating the improved estimate of the starting position of the sequence of desired samples in the received signal sequence based on an argument of the frequency-domain correlation between the frequency-domain received samples and the noiseless samples.

23. The method of claim 22, wherein:
the cyclic prefix guard interval comprises an ending subset of the sequence of desired data samples; and
the cyclic postfix guard interval comprises a beginning subset of the sequence of desired data samples.

24. The method of claim 22, wherein the number of samples in the cyclic prefix guard interval and the number of samples in the cyclic postfix guard interval are optimally adapted to an expected channel power delay profile.

25. The method of claim 22, further comprising the steps of:
generating a further improved estimate of the starting position of the sequence of desired samples in the received signal sequence by:
using the improved estimate of the starting position of the sequence of desired samples in the received signal sequence to generate improved frequency-domain received samples;
determining a second frequency-domain correlation between the improved frequency-domain received samples and the noiseless samples; and
generating the further improved estimate of the starting position of the sequence of desired samples in the received signal sequence based on an argument of the second frequency-domain correlation between the frequency-domain received samples and the noiseless samples.

26. The method of claim 25, further comprising the step of using the further improved estimate of the starting position of the sequence of desired samples in the received signal sequence to adjust a measurement of frequency offset associated with the sequence of desired samples in the received signal sequence.

27. The method of claim 22, wherein the noiseless samples are generated by demodulating symbols contained in the received signal sequence.

28. The method of claim 27, wherein the noiseless samples are generated by demodulating symbols contained in the sequence of desired samples.

29. The method of claim 22, wherein the noiseless samples are generated from pilot symbols that have been multiplexed into the sequence of received samples.

30. The method of claim 22, further comprising the step of using the improved estimate of the starting position of the sequence of desired samples in the received signal sequence to adjust a measurement of frequency offset associated with the sequence of desired samples in the received signal sequence.

31. The method of claim 22, further comprising the steps of:
iteratively generating a final improved estimate of the starting position of the sequence of desired samples in the received signal sequence by performing a sequence of iterative steps for a number of times, each sequence of iterative steps comprising:
using a previously generated estimate of the starting position of the sequence of desired samples in the received signal sequence to generate current frequency-domain received samples;
determining a current frequency-domain correlation between the current frequency-domain received samples and the noiseless samples; and
generating a next estimate of the starting position of the sequence of desired samples in the received signal sequence based on an argument of the current frequency-domain correlation between the frequency-domain received samples and the noiseless samples.

32. The method of claim 31, further comprising the step of using the final improved estimate of the starting position of the sequence of desired samples in the received signal sequence to adjust a measurement of frequency offset associated with the sequence of desired samples in the received signal sequence.

33. An apparatus for transmitting a sequence of data samples, comprising:
means for initially transmitting a first preamble comprising a sequence of preamble samples;
means for transmitting the sequence of data samples; and
means for subsequently transmitting a second preamble comprising the sequence of preamble samples,
wherein the first preamble comprises a first guard region and a symbol sequence, the first guard region comprises a first subset of the symbol sequence, the second preamble comprises a second guard region and the symbol sequence, and the second guard region comprises a second subset of the symbol sequence, and the sequence of data samples is transmitted after the step of initially transmitting the first preamble, and before the step of subsequently transmitting the second preamble.

34. The apparatus of claim 33, wherein the first subset of the symbol sequence is a larger subset of the symbol sequence than the second subset of the symbol sequence.

35. The apparatus of claim 33, wherein the second subset of the symbol sequence is a larger subset of the symbol sequence than the first subset of the symbol sequence.

36. An apparatus for receiving a sequence of desired data samples, comprising:
means for receiving a signal sequence that includes a first preamble followed by the sequence of desired data samples followed by a second preamble, wherein the first preamble comprises a symbol sequence, and the second preamble comprises the symbol sequence;
means for hypothesizing a plurality of locations of the first preamble in the received plurality of data samples;
means for determining a hypothesized first preamble and a corresponding hypothesized second preamble for each of the hypothesized locations;
means for determining a correlation between the hypothesized first preamble and the corresponding hypothesized second preamble for each of the hypothesized locations; and
means for using the correlations to determine locations of a most likely hypothesized first preamble and of a most likely second preamble.

37. The apparatus of claim 36, further comprising:
means for using the locations of the most likely hypothesized first and second preambles to estimate a first frequency offset of the received signal sequence.

38. The apparatus of claim 37, wherein:
the first preamble comprises a first guard region and a symbol sequence;
the first guard region comprises a first subset of the symbol sequence and a second subset of the symbol sequence;
the second preamble comprises a second guard region and the symbol sequence; and
the apparatus further comprises:
means for using the first frequency offset to make a first frequency correction of the received signal sequence;
means for determining a frequency corrected first guard region in the first frequency corrected received signal sequence;

means for determining a frequency corrected first preamble in the first frequency corrected received signal sequence;

means for correlating the second subset of the symbol sequence from the frequency corrected first guard region with the second subset of the symbol sequence from the frequency corrected first preamble, thereby generating a correlation result; and means for using the correlation result to detect a second frequency offset.

39. The apparatus of claim 38, wherein the means for using the correlation result to detect the second frequency offset comprises means for using a priori knowledge of probabilities of possible frequency offset intervals to detect the second frequency offset.

40. The apparatus of claim 38, wherein:

the first preamble comprises a first guard region and a symbol sequence;

the first guard region comprises a first subset of the symbol sequence and a second subset of the symbol sequence;

the second preamble comprises a second guard region and the symbol sequence; and the apparatus further comprises:

means for correlating the second subset of the symbol sequence from the first guard region with the second subset of the symbol sequence from the first preamble, thereby generating a correlation result;

means for using the first frequency offset to correct the correlation result; and means for using the corrected correlation result to estimate a second frequency offset.

41. The apparatus of claim 37, wherein;

the first preamble comprises a first guard region and a symbol sequence;

the first guard region comprises a first subset of the symbol sequence and a second subset of the symbol sequence;

the second preamble comprises a second guard region and the symbol sequence; and the apparatus further comprises:

means for using the first frequency offset to make a first frequency correction of the received signal sequence;

means for determining a frequency corrected first guard region in the first frequency corrected received signal sequence;

means for determining a frequency corrected second preamble in the first frequency corrected received signal sequence;

means for correlating the second subset of the symbol sequence from the frequency corrected first guard region with the second subset of the symbol sequence from the frequency corrected second preamble, thereby generating a correlation result; and means for using the correlation result to detect a second frequency offset.

42. The apparatus of claim 41, wherein the means for using the correlation result to detect the second frequency offset comprises means for using a priori knowledge of probabilities of possible frequency offset intervals to detect the second frequency offset.

43. The apparatus of claim 37, wherein:

the first preamble comprises a first guard region and a symbol sequence;

the first guard region comprises a first subset of the symbol sequence and a second subset of the symbol sequence;

the second preamble comprises a second guard region and the symbol sequence; and the apparatus further comprises:

means for correlating the second subset of the symbol sequence from the first guard region with the second subset of the symbol sequence from the second preamble, thereby generating a correlation result;

means for using the first frequency offset to correct the correlation result; and means for using the corrected correlation result to estimate a second frequency offset.

44. The apparatus of claim 37, wherein:

the first preamble comprises a first guard region and a symbol sequence;

the first guard region comprises a first subset of the symbol sequence and a second subset of the symbol sequence;

the second preamble comprises a second guard region and the symbol sequence; and the apparatus further comprises:

means for using the first frequency offset to make a first frequency correction of the received signal sequence;

means for determining a frequency corrected first guard region in the first frequency corrected received signal sequence;

means for determining a frequency corrected first preamble in the first frequency corrected received signal sequence;

means for determining a corrected second preamble in the first frequency corrected received signal sequence;

means for correlating the second subset of the symbol sequence from the frequency corrected first guard region with the second subset of the symbol sequence from the frequency corrected first preamble, thereby generating a first correlation result;

means for correlating the second subset of the symbol sequence from the frequency corrected first guard region with the second subset of the symbol sequence from the frequency corrected second preamble, thereby generating a second correlation result;

means for combining the first and second correlation results, thereby generating a combined correlation result; and means for using the combined correlation result to detect a second frequency offset.

45. The apparatus of claim 44, wherein the means for using the combined correlation result to detect the second frequency offset comprises means for using a priori knowledge of probabilities of possible frequency offset intervals to detect the second frequency offset.

46. The apparatus of claim 37, wherein:

the first preamble comprises a first guard region and a symbol sequence;

the first guard region comprises a first subset of the symbol sequence and a second subset of the symbol sequence;

the second preamble comprises a second guard region and the symbol sequence; and the apparatus further comprises:

means for correlating the second subset of the symbol sequence from the first guard region with the second subset of the symbol sequence from the first preamble, thereby generating a first correlation result;

means for correlating the second subset of the symbol sequence from the first guard region with the second subset of the symbol sequence from the second preamble, thereby generating a second correlation result;

means for using the first frequency offset to correct the first correlation result;

means for using the first frequency offset to correct the second correlation result;

means for combining the first and second corrected correlation results, thereby generating a combined corrected correlation result; and means for using the combined corrected correlation result to estimate a second frequency offset.

47. The apparatus of claim 36, wherein:

the received signal sequence includes the first preamble, followed by a cyclic prefix guard interval, followed by the sequence of desired data samples, followed by a cyclic postfix guard interval, followed by a second preamble, and the apparatus further comprises:
means for using the location of the most likely hypothesized first preamble to determine a coarse estimate of a starting position of the sequence of desired samples in the received signal sequence; and means for generating an improved estimate of the starting position of the sequence of desired samples in the received signal sequence by:
using a time domain to frequency domain transformation technique and the coarse estimate of the starting position of the sequence of desired samples in the received signal sequence to generate frequency-domain received samples;
determining a frequency-domain correlation between the frequency-domain received samples and noiseless samples; and
generating the improved estimate of the starting position of the sequence of desired samples in the received signal sequence based on an argument of the frequency-domain correlation between the frequency-domain received samples and the noiseless samples.

48. The apparatus of claim 47, wherein:

the cyclic prefix guard interval comprises an ending subset of the sequence of desired data samples; and the cyclic postfix guard interval comprises a beginning subset of the sequence of desired data samples.

49. The apparatus of claim 47, wherein the number of samples in the cyclic prefix guard interval and the number of samples in the cyclic postfix guard interval are optimally adapted to an expected channel power delay profile.

50. The apparatus of claim 47, further comprising:
means for generating a further improved estimate of the starting position of the sequence of desired samples in the received signal sequence by:
using the improved estimate of the starting position of the sequence of desired samples in the received signal sequence to generate improved frequency-domain received samples;
determining a second frequency-domain correlation between the improved frequency-domain received samples and the noiseless samples; and
generating the further improved estimate of the starting position of the sequence of desired samples in the received signal sequence based on an argument of the second frequency-domain correlation between the frequency-domain received samples and the noiseless samples.

51. The apparatus of claim 47, further comprising means for generating the noiseless samples by demodulating symbols contained in the received signal sequence.

52. The apparatus of claim 51, further comprising means for generating the noiseless samples by demodulating symbols contained in the sequence of desired samples.

53. The apparatus of claim 47, further comprising means for generating the noiseless samples from pilot symbols that have been multiplexed into the sequence of received samples.

54. An apparatus for receiving a sequence of desired data samples, comprising:

means for receiving a signal sequence that includes a cyclic prefix guard interval followed by the sequence of desired data samples, followed by a cyclic postfix guard interval;

means for determining a coarse estimate of a starting position of the sequence of desired samples in the received signal sequence; and means for generating an improved estimate of the starting position of the sequence of desired samples in the received signal sequence by:
using the coarse estimate of the starting position of the sequence of desired samples in the received signal sequence to generate frequency-domain received samples;
determining a frequency-domain correlation between the frequency-domain received samples and noiseless samples; and
generating the improved estimate of the starting position of the sequence of desired samples in the received signal sequence based on an argument of the frequency-domain correlation between the frequency-domain received samples and the noiseless samples.

55. The apparatus of claim 54, wherein:

the cyclic prefix guard interval comprises an ending subset of the sequence of desired data samples; and the cyclic postfix guard interval comprises a beginning subset of the sequence of desired data samples.

56. The apparatus of claim 54, wherein the number of samples in the cyclic prefix guard interval and the number of samples in the cyclic postfix guard interval are optimally adapted to an expected channel power delay profile.

57. The apparatus of claim 54, further comprising:
means for generating a further improved estimate of the starting position of the sequence of desired samples in the received signal sequence by:
using the improved estimate of the starting position of the sequence of desired samples in the received signal sequence to generate improved frequency-domain received samples;
determining a second frequency-domain correlation between the improved frequency-domain received samples and the noiseless samples; and
generating the further improved estimate of the starting position of the sequence of desired samples in the received signal sequence based on an argument of the second frequency-domain correlation between the frequency-domain received samples and the noiseless samples.

58. The apparatus of claim 57, further comprising means for using the further improved estimate of the starting position of the sequence of desired samples in the received signal sequence to adjust a measurement of frequency offset associated with the sequence of desired samples in the received signal sequence.

59. The apparatus of claim 54, further comprising means for generating the noiseless samples by demodulating symbols contained in the received signal sequence.

60. The apparatus of claim 59, further comprising means for generating the noiseless samples by demodulating symbols contained in the sequence of desired samples.

61. The apparatus of claim 54, further comprising means for generating the noiseless samples from pilot symbols that have been multiplexed into the sequence of received samples.

62. The apparatus of claim 54, further comprising means for using the improved estimate of the starting position of the sequence of desired samples in the received signal sequence to adjust a measurement of frequency offset associated with the sequence of desired samples in the received signal sequence.

63. The apparatus of claim 54, further comprising:
 means for iteratively generating a final improved estimate of the starting position of the sequence of desired samples in the received signal sequence by performing a sequence of iterative steps for a number of times, each sequence of iterative steps comprising:
  using a previously generated estimate of the starting position of the sequence of desired samples in the received signal sequence to generate current frequency-domain received samples;
  determining a current frequency-domain correlation between the current frequency-domain received samples and the noiseless samples; and
  generating a next estimate of the starting position of the sequence of desired samples in the received signal sequence based on an argument of the current frequency-domain correlation between the frequency-domain received samples and the noiseless samples.

64. The apparatus of claim 63, further comprising means for using the final improved estimate of the starting position of the sequence of desired samples in the received signal sequence to adjust a measurement of frequency offset associated with the sequence of desired samples in the received signal sequence.

* * * * *